US010670091B2

(12) United States Patent
Fricke et al.

(10) Patent No.: US 10,670,091 B2
(45) Date of Patent: Jun. 2, 2020

(54) DISC BRAKE FOR A COMMERCIAL VEHICLE AND BRAKE PAD SET

(71) Applicant: KNORR-BREMSE Systeme fuer Nutzfahrzeuge GmbH, Munich (DE)

(72) Inventors: Jens Fricke, Vilshofen (DE); Abdelaziz Rguichi, Olching (DE); Thomas Eichler, Munich (DE); Oliver Krause, Wolfratshausen (DE); Matthias Klinger, Moorenweis (DE); Michael Peschel, Shoengeising (DE); Tobias Schoefberger, Mainburg (DE); Philipp Adamczyk, Stoettwang (DE); Markus Molnar, Fuerstenzell (DE); Maximilian Hauser, Fuerstenzell (DE); Igor Nesmjanowitsch, Hengersberg (DE); Martin Heindl, Eging am See (DE); Christian Brandl, Plattling (DE); Martin Pleintinger, Eichendorf (DE); Natalie Roth, Vilshofen (DE); Kerstin Sakel, Munich (DE); Franz Gasslbauer, Johanniskirchen (DE); Martin Tropp, Bad Birnbach (DE); Alexander Asen, Eichendorf (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/844,186

(22) Filed: Dec. 15, 2017

(65) Prior Publication Data

US 2018/0106308 A1      Apr. 19, 2018

Related U.S. Application Data

(63) Continuation of application No. PCT/EP2016/063612, filed on Jun. 14, 2016.

(30) Foreign Application Priority Data

Jun. 15, 2015  (DE) .................. 10 2015 109 540
Oct. 9, 2015   (DE) .................. 10 2015 117 285
Mar. 17, 2016  (DE) .................. 10 2016 104 970

(51) Int. Cl.
  *F16D 55/226*      (2006.01)
  *F16D 65/18*       (2006.01)
  (Continued)

(52) U.S. Cl.
  CPC ....... *F16D 55/226* (2013.01); *F16D 65/0068* (2013.01); *F16D 65/097* (2013.01);
  (Continued)

(58) Field of Classification Search
  CPC .......... F16D 55/226; F16D 2055/0029; F16D 65/0068; F16D 65/0977; F16D 65/0975;
  (Continued)

(56) References Cited

U.S. PATENT DOCUMENTS 4,491,204 A    1/1985  Dirauf et al.
4,775,033 A   10/1988  Heibel
(Continued)

FOREIGN PATENT DOCUMENTS

CN    1232529 A    10/1999
CN  101498346 A     8/2009
(Continued)

OTHER PUBLICATIONS

Russian-language Office Action issued in counterpart Russian Application No. 2018100418/11(000532) dated Sep. 28, 2018 with English translation (18 pages).
(Continued)

*Primary Examiner* — Xuan Lan Nguyen
(74) *Attorney, Agent, or Firm* — Crowell & Moring LLP

(57) ABSTRACT

A disc brake includes a brake caliper that engages over a brake disc, the caliper having a central opening over the
(Continued)

brake disc. The disc brake has two brake pads which are located in the brake caliper, can be moved in opposite directions and each of which has a pad backing plate with a friction lining secured thereon. An action-side or application-side brake pad of the two brake pads can be pressed against the brake disc by a brake application device with the aid of at least one brake plunger. The brake also has at least one restoring device, by which the brake caliper can be returned. The restoring device has a spreading device which engages on the brake pads lying opposite one another and which acts with an identical force in opposition to the respective application direction. The spreading device has spring-loaded spreading elements, each engaging on its respective pad backing plate. The spreading device is located in the central opening and the spreading elements engage directly or indirectly, outside the friction linings, on at least two contact regions of the brake pads. These regions face each other at a distance from the center. The spreading device has spring-loaded arms which are interconnected in the central region of the opening and connected to a retaining bracket which is attached to the brake support plate.

35 Claims, 58 Drawing Sheets

(51) Int. Cl.
  *F16D 65/097* (2006.01)
  *F16D 65/16* (2006.01)
  *F16D 65/54* (2006.01)
  *F16D 65/00* (2006.01)
  *F16D 55/00* (2006.01)

(52) U.S. Cl.
  CPC ......... *F16D 65/0977* (2013.01); *F16D 65/16* (2013.01); *F16D 65/183* (2013.01); *F16D 65/54* (2013.01); *F16D 2055/0029* (2013.01)

(58) Field of Classification Search
  CPC ...... F16D 65/097; F16D 65/183; F16D 65/16; F16D 65/54
  See application file for complete search history.

(56) References Cited

U.S. PATENT DOCUMENTS

| | | | |
|---|---|---|---|
| 5,538,103 A | 7/1996 | Rueckert et al. | |
| 5,549,181 A | 8/1996 | Evans | |
| 6,179,095 B1 * | 1/2001 | Weiler | F16D 55/226 188/72.3 |
| 6,283,256 B1 | 9/2001 | Dahlheimer et al. | |
| 8,485,323 B2 | 7/2013 | Narayanan V | |
| 2010/0000828 A1 | 1/2010 | Pericevic et al. | |
| 2012/0085597 A1 | 4/2012 | Narayanan V | |
| 2013/0256068 A1 * | 10/2013 | Hazeki | F16D 55/226 188/72.4 |
| 2014/0339026 A1 | 11/2014 | Gutelius et al. | |
| 2015/0008078 A1 | 1/2015 | Asen et al. | |
| 2015/0184710 A1 | 7/2015 | Peschel et al. | |
| 2016/0160946 A1 | 6/2016 | Graaf et al. | |
| 2016/0169305 A1 | 6/2016 | Halfmann | |

FOREIGN PATENT DOCUMENTS

| | | | | |
|---|---|---|---|---|
| DE | 2544370 A1 * | 4/1977 | ........... | F16D 65/095 |
| DE | 3023333 A1 * | 1/1982 | ......... | F16D 65/0975 |
| DE | 43 01 621 A1 | 8/1993 | | |
| DE | 10 2007 001 213 A1 | 7/2008 | | |
| DE | 10 2009 009 567 A1 | 9/2009 | | |
| DE | 102008051236 A1 * | 4/2010 | ........... | F16D 55/228 |
| DE | 10 2012 006 111 A1 | 9/2013 | | |
| GB | 574035 A | 12/1945 | | |
| GB | 1491903 A * | 11/1977 | ......... | F16D 55/2265 |
| JP | 57-179435 A | 11/1982 | | |
| JP | 3-43133 U | 4/1991 | | |
| JP | 7-280004 A | 10/1995 | | |
| JP | 2010-270799 A | 12/2010 | | |
| JP | 2013-204742 A | 10/2013 | | |
| KR | 10-2015-0056836 A | 5/2015 | | |
| WO | WO 96/08663 A1 | 3/1996 | | |
| WO | WO 2015/014418 A1 | 2/2015 | | |
| WO | WO 2015/022080 A1 | 2/2015 | | |

OTHER PUBLICATIONS

Chinese-language Office Action issued in counterpart Chinese Application No. 201680042230.1 dated Nov. 30, 2018 with English translation (15 pages).

International Search Report (PCT/ISA/210) issued in PCT Application No. PCT/EP2016/063612 dated Oct. 27, 2016 with English translation (8 pages).

German-language Written Opinion (PCT/ISA/237) issued in PCT Application No. PCT/EP2016/063612 dated Oct. 27, 2016 with English translation (17 pages).

Japanese-language Office Action issued in counterpart Japanese Application No. 2017-564441 dated Jun. 26, 2019 with English translation (15 pages).

Hindi-language Office Action issued in counterpart Indian Application No. 201737045111 dated Nov. 25, 2019 with English translation (seven (7) pages).

* cited by examiner

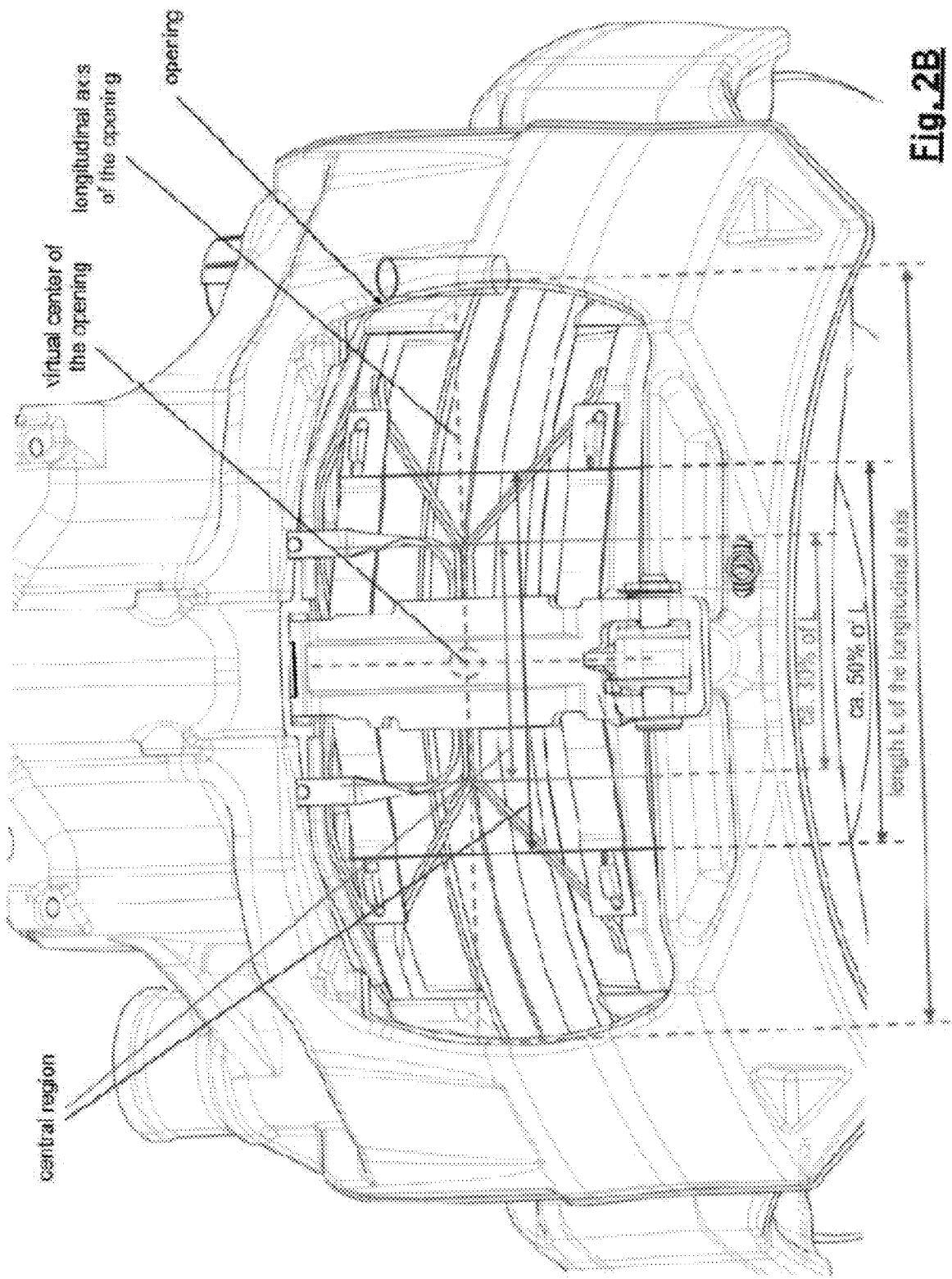

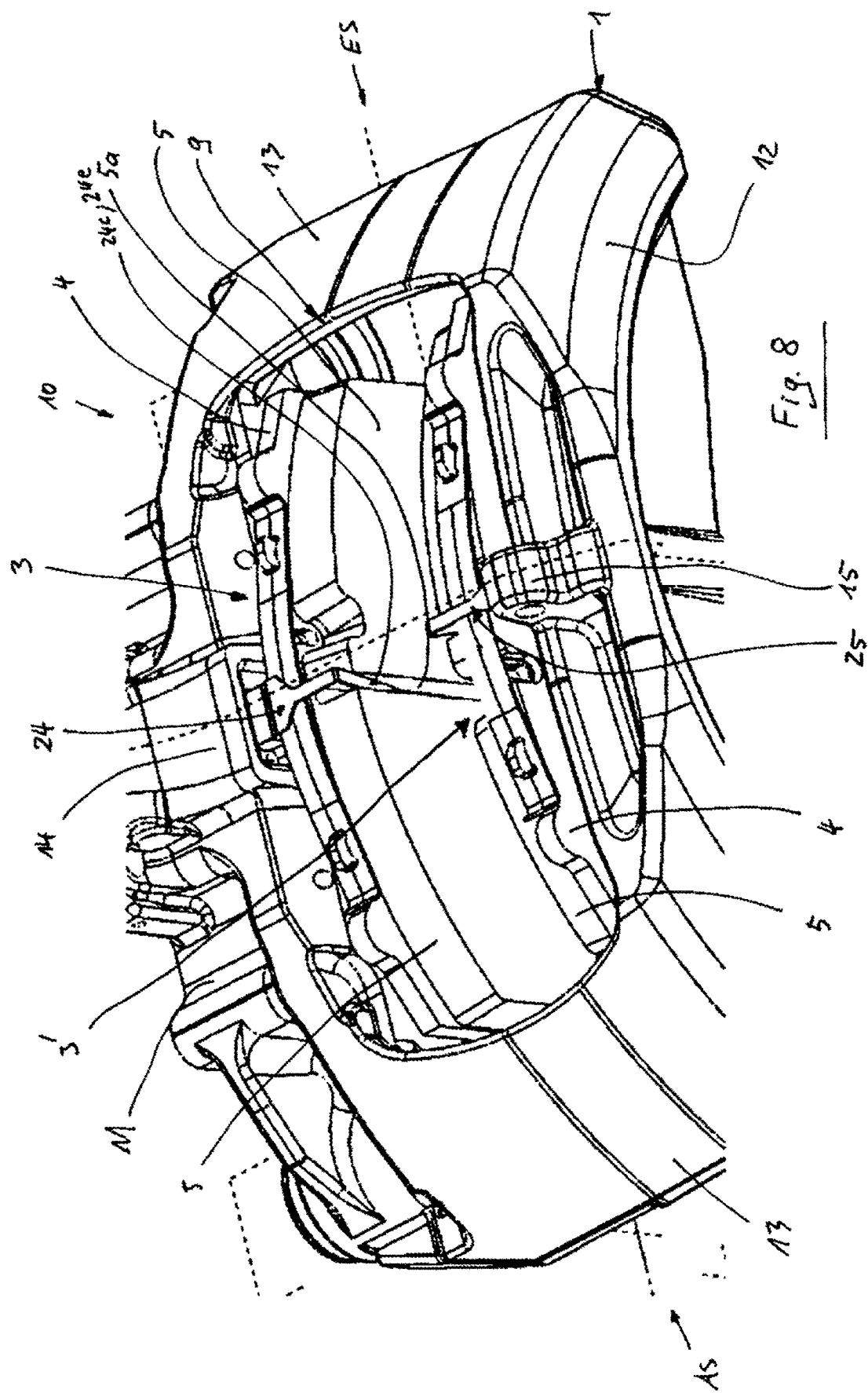

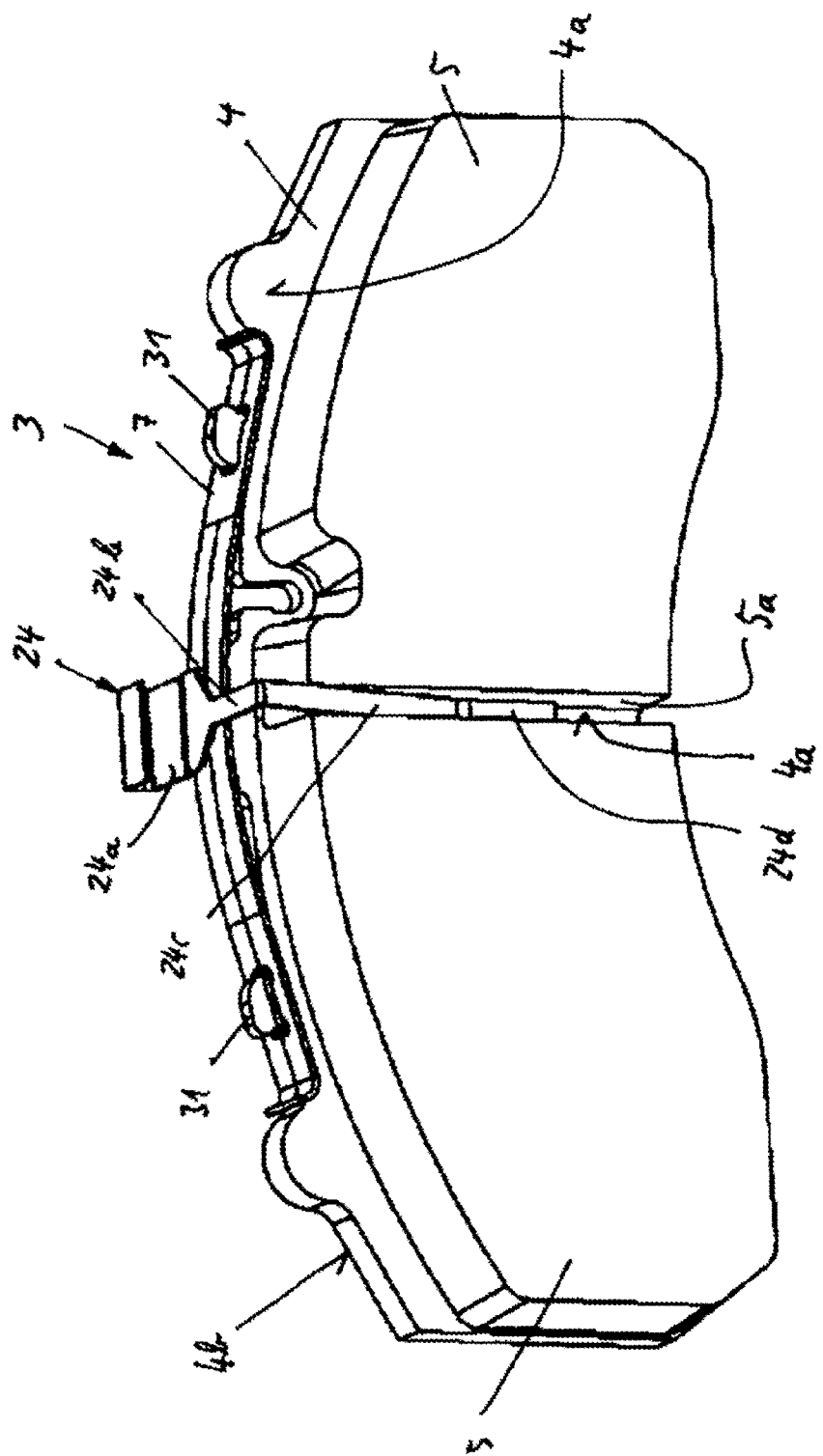

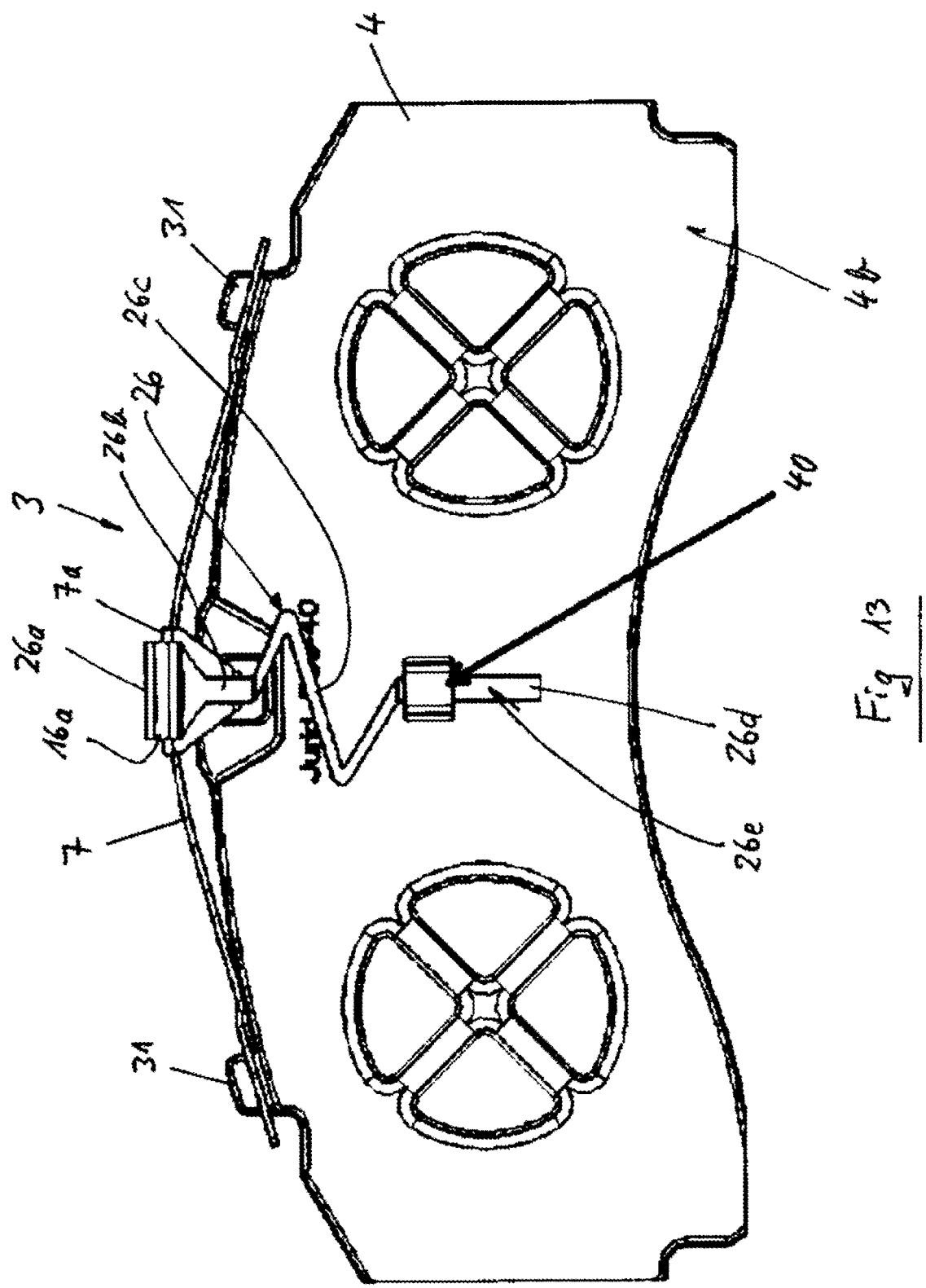

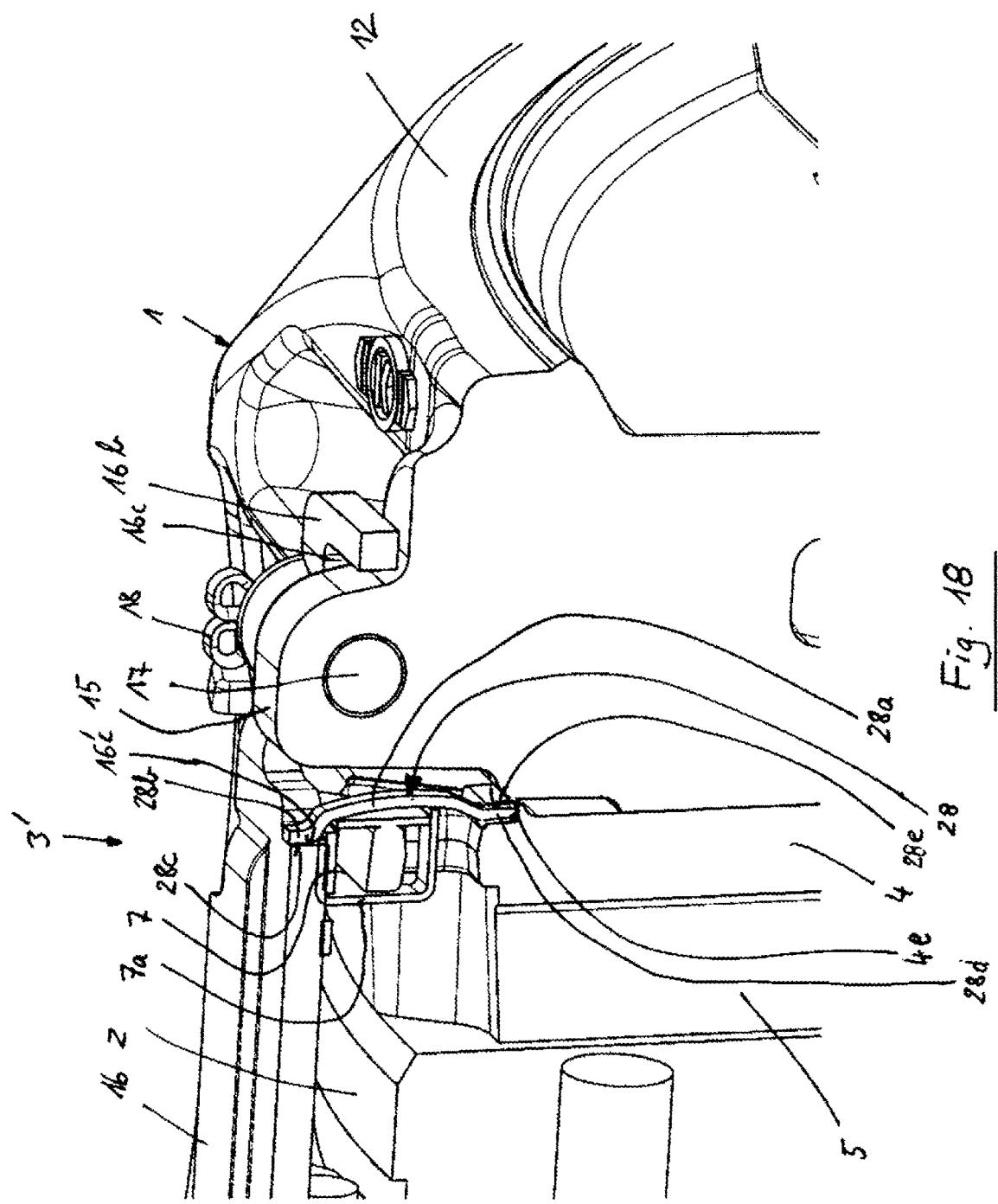

DISC BRAKE FOR A COMMERCIAL VEHICLE AND BRAKE PAD SET

CROSS REFERENCE TO RELATED APPLICATIONS

This application is a continuation of PCT International Application No. PCT/EP2016/063612, filed Jun. 14, 2016, which claims priority under 35 U.S.C. § 119 from German Patent Applications Nos. 10 2015 109 540.8, filed Jun. 15, 2015, 10 2015 117 285.2, filed Oct. 9, 2015, and 10 2016 104 970.0, filed Mar. 17, 2016, the entire disclosures of which are herein expressly incorporated by reference.

BACKGROUND AND SUMMARY OF THE INVENTION

The invention relates to a disc brake for a commercial vehicle. The invention also relates to a brake pad set.

In the case of a generic disc brake, also known as a sliding-caliper brake, in a braking situation, an action-side brake pad is pressed against a vehicle-side brake disc by way of an application device, which is actuable pneumatically or by electric motor. During the further course of the braking process, the brake caliper is, relative to the brake disc, displaced counter to the application direction of the action-side brake pad, causing the opposite, reaction-side brake pad to be driven along and pressed against the other side of the brake disc.

In the case of the known disc brake, after a release of the brake, the brake caliper remains in said position, in which the brake pads, or at least the reaction-side brake pad, lies against the brake disc duly without pressure but with a rubbing action. The residual rubbing torques of the brake pads that thereby arise during driving operation have a disadvantageous effect because they lead to increased fuel consumption and to a reduction of the service life of the components involved, specifically of the brake disc and of the brake pads.

It is duly the case that the brake pads are released slightly during driving operation for example as a result of a wobbling movement of the brake disc and as a result of vibrations and lateral accelerations during cornering. These effects are however not sufficient to prevent said residual rubbing torques in an effective manner.

To counteract this problem, the generic DE 10 2007 001 213 discloses a disc brake having a resetting device which is arranged in one of the guide beams by way of which the brake caliper is displaceably held on the brake carrier, which resetting device has a resilient resetting element by means of which the brake caliper is displaced into an initial position.

This construction has proven successful in principle. However, the use of said known resetting device can lead to problems in the case of compressed-air-actuated disc brakes of heavy commercial vehicles, because here, there are wide-ranging influences resulting from component tolerances and component deformations, which have the effect that reliable functioning of said resetting device is not permitted in all situations.

Similar problems arise in the case of a disc brake such as that to which DE 10 2012 006 111 A1 relates. Here, a resetting device is arranged on the side which is situated opposite the application device and which faces toward the reaction-side brake pad, whereby effective, in particular automatic resetting of the brake caliper is realized, with a simultaneously minimal effect on the system rigidity In any case, the resetting device acts on the brake caliper, wherein the brake carrier functions as a counterbearing.

DE 43 01 621 A1 describes a floating-caliper disc brake having a positionally static brake carrier which has two carrier arms which project over the outer edge of a brake disc, having brake shoes which are arranged on both sides of the brake disc and which have in each case one friction pad and one rear plate and which are supported displaceably on the carrier arms, having a floating caliper which is guided axially displaceably on the brake carrier and which engages around the brake shoes and has an actuating device designed for pressing the brake shoes against the brake disc, having a spring arrangement which acts axially on the brake shoes in a brake release direction and which, after the braking operation, assists in the setting of an air gap between the brake shoes and the brake disc. The spring arrangement has at least one spreading spring which is fastened in altogether non-displaceable fashion in an axial direction to a carrier arm of the brake carrier, in that the fastening is performed to a section of the carrier arm situated over the outer edge of the brake disc, and in that the spreading spring has at least two spring arms which lie resiliently in an axial direction against the rear plates of the brake shoes.

US2014/0339026 A1 describes a spreading spring comprising a locking arm which connects the spreading spring to a brake component, a retraction arm; and a preload device which is arranged between the locking arm and the retraction arm, wherein the preload device comprises six or more spiral-shaped loops which store energy during a braking activation and which retract the brake components (brake pad) as soon as the braking process has ended. A brake caliper in the form of a floating caliper, which is not a sliding caliper, is specified. This is suitable for a passenger vehicle but not for a commercial vehicle.

The invention is based on the object of further developing a disc brake of the generic type such that, with the simplest structural means, the service life in particular of the brake pads and of the brake disc is lengthened, and the operating costs are altogether lowered.

A further object consists in providing a corresponding brake pad set.

Said object is achieved by way of a disc brake according to embodiments of the invention.

The further object is achieved by way of a brake pad set according to embodiments of the invention.

A disc brake according to the invention for a commercial vehicle, having a brake caliper which engages over a brake disc and which is in the form of a sliding caliper and which is fastened to a positionally static brake carrier and which has a central opening over the brake disc, comprises two brake pads which are arranged in the brake caliper and which are movable in opposite directions and which have in each case one pad carrier plate and one friction pad fastened thereto and of which an action-side or application-side brake pad can be pressed against the brake disc by way of an application device via at least one brake plunger, and comprises at least one resetting device by means of which the brake caliper can be reset after a braking-induced displacement and release of the brake, wherein the resetting device has a spreading device which engages on the opposite brake pads and which acts equally counter to the respective application direction and which has resilient spreading elements which engage on the respective pad carrier plate. The spreading device is arranged in the central opening, wherein the spreading elements engage, outside the friction pads, directly or indirectly on at least two abutment regions arranged spaced apart from one another relative to the center, of the brake pads, wherein the spreading device has spring arms which, in the central region of the opening, are connected to one another and to a retaining bow which is attached to the brake carrier.

By means of the design of the disc brake according to the invention, synchronous resetting of both brake pads and resetting of the brake caliper when the brake is released are realized, wherein the synchronous resetting relates both to the resetting forces and to the resetting travels. Here, the resetting force acts counter to the respective application direction of the two brake pads, that is to say, in the case of the reaction-side brake pad, toward the caliper rear section, and in the case of the action-side brake pad, toward the caliper head, with gaps with respect to the brake disc being formed.

The spreading device expediently engages on the two brake pads at the pad carrier plates, specifically on the side facing toward the friction pad fastened thereto or on the opposite rear side. To prevent jamming of the respective brake pad during the resetting movement, the spreading element engages either centrally on an upper exposed edge region of the pad carrier plate or symmetrically on two abutment regions to the right and to the left.

The attachment of the retaining bow to the brake carrier permits retrofitting of the resetting device without modification to the brake caliper or to the brake carrier of the disc brake.

A brake pad set according to the invention for the disc brake according to the invention has at least two brake pads with in each case one pad carrier plate and with a friction pad attached to the pad carrier plate, and has the spreading device as indicated above. A retaining section of a pad carrier plate of a brake pad is produced on a thrust side of the pad carrier plate, in the manner of a stirrup, without undercuts with an opening and with a recess on a pad side of the pad carrier plate for a plate, in one piece with the pad carrier plate as a cast part. This is inexpensive, because no cores are required for the casting process, and no retroactive machining operations are necessary.

In one embodiment, the spreading elements extend, proceeding from a central region in the center of the opening, from the inside to the outside to the abutment regions which are arranged spaced apart from one another uniformly relative to the center. A compact construction is thus possible.

In this way, the spreading device is arranged in the center in the brake caliper, wherein said spreading device is likewise arranged within an envelope of a wheel rim of an associated wheel.

The two spreading elements are connected to one another in the center (in relation to the carrier horns). It is thus possible to ensure a spring force which is identical—in a small tolerance range—both on the run-in side and on the run-out side. Different spring forces between run-out side and run-in side, which can lead to oblique wear, are minimized by way of the unilateral engagement of in each case one spring per pad.

A further embodiment provides that the central region of the opening extends to both sides of a virtual center of the opening approximately parallel to the plane of the brake disc over a length in a range from 30 to 50% of a longitudinal axis of the opening. This yields an advantageous adaptation of the spring forces.

In another embodiment, the spreading device has spring arms, of which in each case two lie against an associated pad carrier plate, wherein the spring arms are connected to one another in the central region of the opening, which simplifies installation during assembly and maintenance work.

According to a further concept of the invention, the spreading device has oppositely acting spreading elements, preferably with elastic action, in particular in the form of spring elements.

According to one concept of the invention, the spreading device is operatively connected to the brake carrier, which forms a counterbearing and in which the brake pads are mounted so as to be displaceable coaxially with respect to the brake disc.

For this purpose, the retaining bow is preferably provided, which extends across the brake disc in the circumferential region as far as brake carrier horns, which delimit a pad slot at both sides, of the brake carrier. The retaining bow is not a pad retaining stirrup, but is an additional component.

In one embodiment, the retaining bow may be attached to two mutually oppositely situated stirrups which are connected to the brake carrier, which permits simple attachment.

Alternatively, the retaining bow may be arranged in the region of an application-side edge of the opening, whereas the spreading elements, which engage on the two brake pads, are connected to the retaining bow. Said retaining bow thus forms a centering device which, in correspondence with the brake carrier as a fixed bearing, may also be realized in some other way in terms of construction.

The retaining bow is preferably attached in a positionally static manner between the brake carrier and bearing beams of the brake caliper. For this purpose, the retaining bow may have at least one fastening section with an opening which is arranged coaxially with respect to a bearing receptacle of the brake carrier, to which the brake caliper is fastened by means of a bearing beam. This yields the advantage that, for the attachment of the retaining bow, no modifications need to be made to the brake caliper or to the brake carrier.

By way of the retaining bow to which, in one embodiment, the spreading device is fastened by way of its spring arms by means of a retaining stirrup, automatic centering of the brake caliper after a release of the brake, that is to say after the ending of a braking process, is realized, wherein, by way of the thus fixed positioning of the spreading device, the brake pads are reset such that the brake caliper is centered relative to the brake disc.

For this purpose, the spring arms are connected by means of a retaining stirrup to the retaining bow, wherein the retaining stirrup has two retaining arms, each of which extends beyond the retaining bow and is fixedly connected to the latter. A simple and stable construction can be realized in this way.

Furthermore, the spreading device is designed so as to act over the entire range of wear of the brake pads.

Since the points of force engagement on the brake pads change with progressive wear, those functional parts of the spreading device which make contact with the brake pads are designed so as to be supported in sliding fashion on the pad carrier plate of the respective brake pads.

To ensure secure retention of the spring limbs, or, in the case of a different design variant, of the spring arms, even under the action of vibrations during driving operation, the spring arms are supported on the upper edge of the pad carrier plate in relation to the base of the pad slot, likewise in sliding fashion as described above.

The structural realization of the spreading device according to the invention may differ in terms of construction, wherein a major advantage emerges from the fact that it is possible to substantially dispense with moving components, self-evidently with the exception of the resilient spreading elements which, for their function, perform a resilient deflection.

The omission of moving parts that is now possible self-evidently has the effect of lengthening the service life of the spreading device, as does the low number of components required, resulting, moreover, in extremely inexpensive production and assembly.

In a further embodiment, the spring arms may be formed as two pairs of spring arms, wherein the pairs are arranged opposite one another in a longitudinal direction of the opening such that they are fastened by way of inner ends, which are in each case connected by means of a connecting section, in the center of the opening to the retaining stirrup, wherein their outer free ends interact with the pad carrier plate of the brake pads. This yields a compact and effective construction.

In one embodiment, the retaining arms of the retaining stirrup may have elongated holes at fastening points to the retaining bow. This yields the advantage that centering and alignment relative to the brake disc center is easily possible by means of the elongated holes. The actual assembly and setting process is performed for the first time by the customer. Here, as a result of an application process, the air gap between disc and pads is set to 0 mm, and the spring assembly is braced between the pads. By means of the elongated hole in the retaining stirrup, the spring assembly can perform a centering movement, and is thus aligned exactly relative to the disc center. The elongated hole connection is subsequently fixed, and the air gap is set again.

In a further refinement, each spring arm may be formed, at the end, with a thrust section which, in its longitudinal direction, is formed with an elongated hole which is a guide section of the spring arm of the spreading device. In this way, a further relative movement capability can be achieved.

Furthermore, here, each thrust section may lie in each case on a bearing surface of a respective pad carrier plate, wherein the elongated holes of each thrust section interact in each case with a projection of the pad rear plate. This yields advantageous guidance in a radial direction.

The spreading device comprises two spreading elements, wherein a first spreading element acts on a first pad and a second spreading element acts on a second pad. The two spreading elements are connected to one another in the center (in relation to the carrier horns). It is thus possible to ensure a spring force which is identical—in a small tolerance range—both on the run-in side and on the run-out side. Different spring forces between run-out side and run-in side, which can lead to oblique wear, are minimized by way of the unilateral engagement of in each case one spring per pad.

A uniform application of force by the springs on the action side and on the reaction side, or on the thrust-piece side and on the caliper side, can be realized by way of a flexible adjustment of the center web. Furthermore, it is possible for slight incorrect geometrical positioning of disc, pad and carrier to be compensated by way of the flexible center web.

By way of the center web, it is possible for the active resetting device to be easily positioned and held down by the pad retaining stirrup. It is advantageously possible, during a pad change, for the resetting device to be easily removed and also exchanged.

Through the utilization of the entire pad slot between the carrier horns, it is possible for use to be made of spreading elements or springs with a very low spring rate in order to impart relatively constant forces in the event of pad wear. Owing to the long spring travels, the spring elements can be tolerant with regard to spring forces. The spring travels lead to a constant spring rate with low tolerances.

In a preferred design variant, only two springs are used.

The spreading elements may be formed from inexpensive and geometrically flexible metal sheets.

As a result of the offset with different centers of rotation, it is possible to replicate a relatively low spring rate. There is advantageously no need for a large number of windings (expensive, bulky).

Further advantages are:
Adjustability (of the centering)
Spring constants adaptable for each pad side, hence different for inside/outside and better adaptable to surroundings—within limits
Installation by way of center centering stirrup—compensates uneven force build-up
Possible "active" caliper centering
Active pad suspension by way of "fork" on the end of the spider A further embodiment provides that the spreading device has at least one additional resetting element which, in addition to the engagement point/the engagement points of the spring arms, engages at a further engagement point on the respective pad carrier plate of a brake pad. This is advantageous because, in this way, an assisted resetting of the brake pads can be effected. A residual rubbing torque can thereby be prevented.

The at least one resetting element may, in one embodiment, be fastened by means of the retaining stirrup to the retaining bow. This yields a compact construction and a time saving during the installation process.

Alternatively, the at least one additional resetting element may be attached to a pad retaining stirrup, onto which it may be merely pushed, plugged or clipped. This yields a simple assembly process.

In one embodiment, the at least one resetting element is arranged with an upper retaining end in an opening of the pad retaining stirrup on an application-side wall of the opening, and makes contact, by way of a lower thrust section, with a thrust side of the pad carrier plate of a rear-side brake pad. This yields a compact and space-saving construction.

It is also possible for the at least one resetting element to have a spring arm, the upper end of which is attached via a spring coil with a fastening section to an application-side retaining end of the pad retaining stirrup, and a lower end of the spring arm, which is connected via a further spring coil with a clamping end, wherein the clamping end engages with a retaining section on the thrust side of the pad carrier plate of the application-side brake pad. A simple adaptation to resetting travels is thereby possible.

Here, the spring coils are formed as spiral springs with parallel longitudinal axes which run tangentially with respect to the brake disc, whereby a compact construction is made possible.

In another embodiment, the at least one resetting element may be attached to an application-side retaining end of the pad retaining stirrup and have a spring arm which is connected to a spring unit which in turn engages with a retaining section on the thrust side of the pad carrier plate of the application-side brake pad. An adaptation to greater resetting travels can also be easily achieved in this way.

It may alternatively be provided that the at least one resetting element is a spring unit which is attached to a base plate of an application section and which engages with a retaining section on the thrust side of the pad carrier plate of the application-side brake pad, whereby greater resetting travels can be achieved.

The spring unit may be formed as an evolute spring.

In a further embodiment, the at least one resetting element is formed from at least two spring units, of which both spring units engage, by way of in each case one spring end, with a retaining section on the thrust side of the pad carrier plate of the application-side brake pad, and wherein the at least two spring units are arranged in a plane.

Alternatively, the other spring ends of the at least two spring units may be in each case attached to a base plate of an application section of the brake caliper.

It is also possible for the other spring end of one spring unit of the at least two spring units to be attached to a pad retaining stirrup, wherein the other spring end of the other spring unit of the at least two spring units is attached to a base plate of an application section of the brake caliper. These above solutions with two springs yield the advantage that large resetting travels are possible in a small structural space.

A yet further embodiment provides that the at least one resetting element is at least one tension spring which is received in a bore in the application section of the brake caliper and which is fixed with one spring end in the bore, wherein the other spring end engages with a retaining section on the thrust side of the pad carrier plate of an application-side brake pad. Here, existing bores for fastening screws of the base plate may be used, whereby a compact construction is made possible.

In a yet further embodiment, it is advantageously possible for long resetting travels to be overcome by means of a self-adjusting resetting element. Here, it is provided that the at least one resetting element attached to the pad retaining stirrup is provided as a self-adjusting resetting element with a detent device which interacts with a detent section of the pad retaining stirrup.

Another embodiment provides that the at least one resetting element attached to the pad retaining stirrup is attached at both sides, by way of in each case one clamping end, to a rear-side retaining end of the pad retaining stirrup, wherein the clamping ends are connected in each case to a spring arm extending tangentially with respect to the brake disc, the other respective end of which spring arm, in the region of the sides of the pad carrier plate, is bent downwardly through 90° and is formed as a vertical spring arm and engages in each case by way of an outwardly bent spring end in each case with a lateral retaining section on the thrust side of a pad carrier plate of a rear-side brake pad. This construction, in the case of the spring elements being in wire form, is compact and simple.

If the at least one fastening section of the retaining bow is equipped with a fold section which makes contact with a collar of a corrugated bellows of a guide beam of the brake caliper such that the collar is fixed in a groove of the guide beam of the brake caliper, a conventional securing ring can be omitted, whereby a number of parts is reduced.

In one embodiment of the brake pad set, it is provided that a connection for a resetting element to the pad carrier plate of a brake pad has a retaining plate with an eyelet, wherein the retaining plate is arranged between a friction pad and a pad side of the pad carrier plate, and wherein the eyelet extends through a passage opening through the pad carrier plate and protrudes from a thrust side of the pad carrier plate. This is a simple alternative to production of the pad carrier plate by casting with cores and possible finish machining, whereby the costs required for this purpose can be omitted.

One embodiment of the brake pads provides that in each case elongate one intermediate space is arranged between a friction pad and a pad side of the respective pad carrier plate, whereby simple contacting for the spring arms of further resetting elements is realized.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2B shows an annotated view of FIG. 2.

FIGS. 3B-6 show schematic views of the first function group as per FIG. 3 with a second function group;

FIGS. 7-13 show schematic views of a variant of the second function group as per FIGS. 3b-6;

FIGS. 14-18 show perspective views of resetting elements of the second function group of the resetting device as per FIGS. 7-13;

FIGS. 19-28 show perspective views of further resetting elements of the second function group of the resetting device as per FIGS. 7-13;

The expressions "top", "bottom", "left", "right" relate to the respective arrangements in the figures.

A "top side" and a "bottom side" of a brake pad 3, 3' or of a pad carrier plate 4 always relate to the installation situation of the respective brake pad 3, 3'. Here, the bottom side of the respective brake pad 3, 3' is situated closer in a radial direction to a brake disc axis of rotation 2a than the top side of said brake pad 3, 3', as can be clearly seen for example from FIG. 1.

DETAILED DESCRIPTION OF THE DRAWINGS

Figure 1:
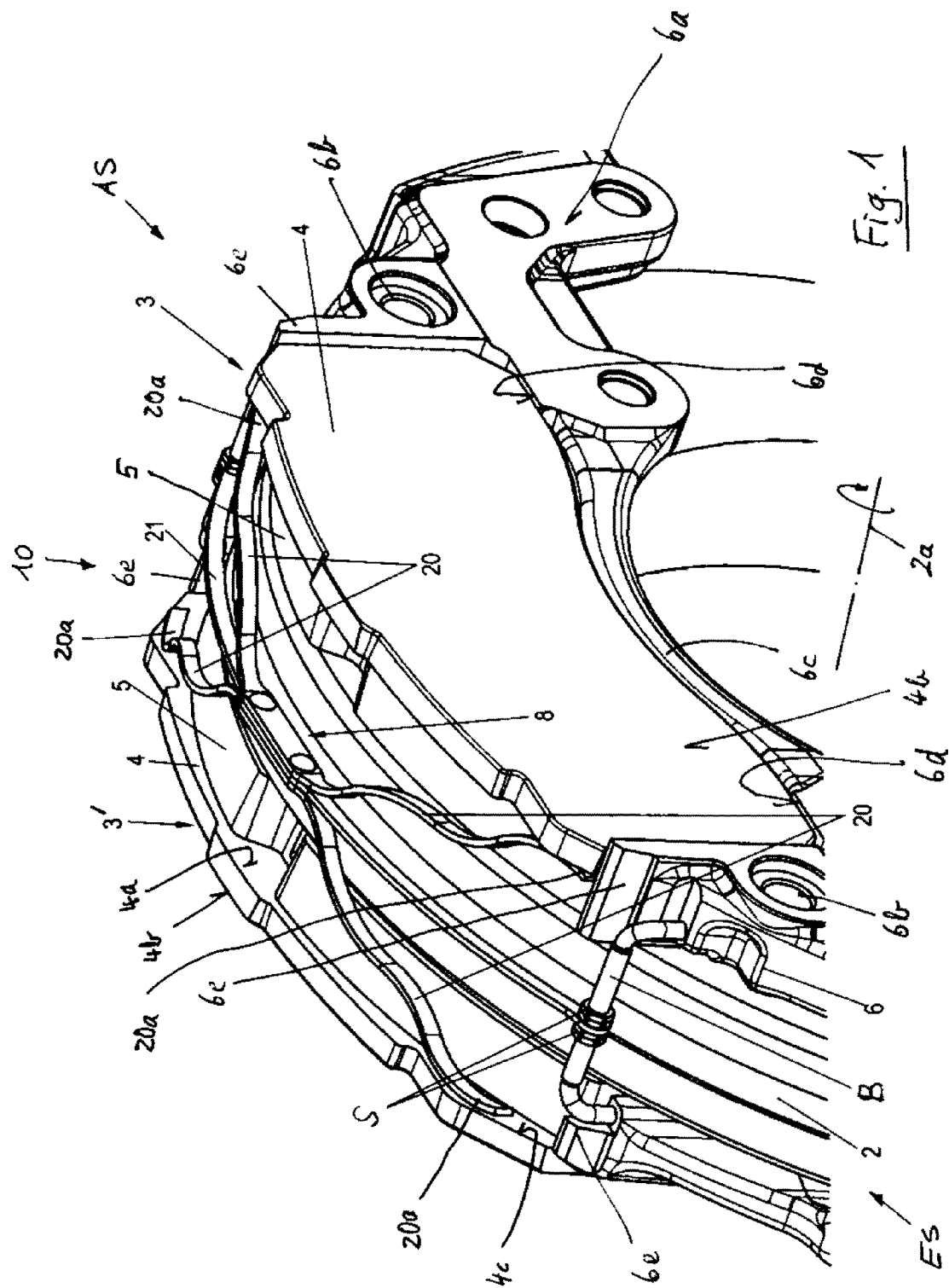
FIGS. 1-2 show perspective views of exemplary embodiments of a disc brake according to the invention with a resetting device.
Figure 2:
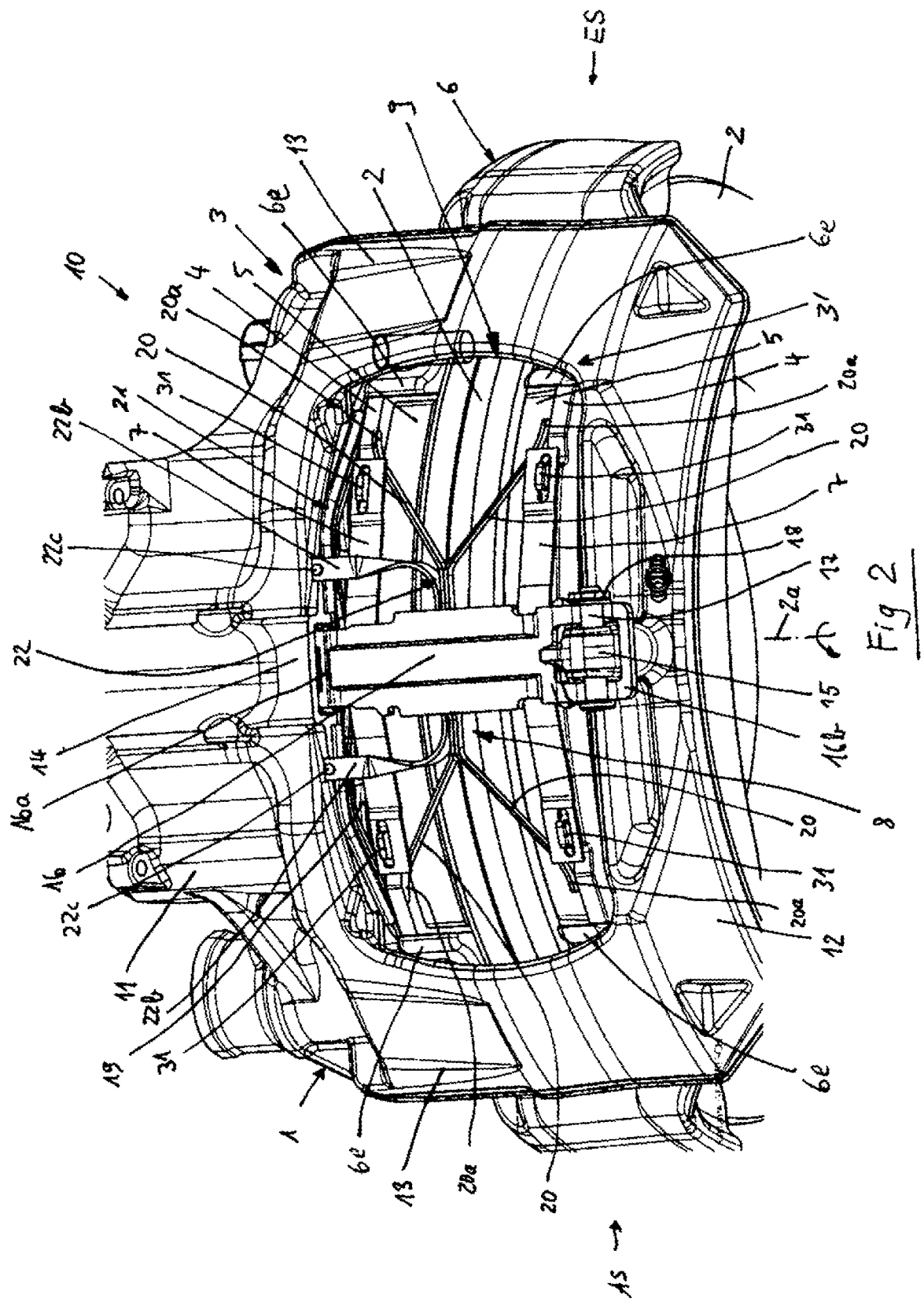

FIGS. 1 and 2 show perspective views of exemplary embodiments of a disc brake 10 according to the invention with a resetting device, from different viewing angles from above.

A brake caliper 1 engages over a brake disc 2 with a brake disc axis of rotation 2a. The brake caliper 1 is attached, displaceably relative to the brake disc 2 axially in the direction of the brake disc axis of rotation 2a, to a brake carrier 6, for which purpose the brake caliper 1 is mounted on bearing beams 45 (see FIGS. 49 and 51) which are connected to the brake carrier 6 which is held in positionally static fashion on the vehicle.

FIG. 1 shows the brake carrier 6, with the brake disc 2, the brake disc axis of rotation 2a of said brake disc and brake pads 3, 3', in a view from an application side. A fastening side 6a of the brake carrier 6 is connected to a positionally static component (not shown) of an associated vehicle. Furthermore, the brake carrier 6 has bearing receptacles 6b for the bearing beams 45 (FIGS. 49 and 51) for the mounting of the brake caliper 1 and has an application-side, curved bridge connector 6c.

Also illustrated in FIG. 1 is a spreading device 8 with four spring arms 20 and with a retaining bow 21. Here, the spreading device 8 is composed of two identical spring arms 20, which are connected to one another in the central region, and to a retaining bow 21, which is fastened by means of stirrups B to the brake carrier 6, specifically to the brake carrier horns 6e. For the axial securing of the retaining bow 21, securing means S are provided on the stirrup B so as to clamp the respective end of the retaining bow 21 between them.

Here, the spring arms 20 lie against two mutually oppositely situated end regions of the pad carrier plate 4, specifically in an edge region that protrudes at the top side, which edge region is referred to here as bearing surface 4c. The ends of the spring arms 20 are likewise bent to form thrust sections 20a, such that sliding on the pad carrier plate surface during the application and release of the brake is possible without problems. Here, spreading of the brake pads 3, 3' after a release of the brake is possible by way of the preload that is generated during the application movement.

The spreading device 8 will be discussed in detail below in a further embodiment.

The brake caliper 1 comprises an application section 11, a caliper rear section 12 and two tension struts 13. The application section 11 runs with one side parallel to the plane of the brake disc 2 on one side of the brake disc 2. The caliper rear section 12 is arranged on the other side of the brake disc 2, likewise so as to run parallel to the brake disc 2. The caliper rear section 12 is connected to the application section 11 at in each case one end by way of in each case one tension strut 13. Here, the tension struts 13 run substantially at right angles to the application section 11 and to the caliper rear section 12.

The application section 11 has an interior space in which an application device (not shown) of the disc brake 10 is arranged. An opening of the interior space points toward the brake disc 2 and is closed off by means of a plate, which is referred to as base plate 19 (see FIG. 2 and for example FIG. 21).

In this arrangement, the application section 11, the caliper rear section 12 and the tension struts 13 define, between them, a central opening 9 which extends over the brake disc 2. The opening 9 has an imaginary longitudinal central line which lies in the plane of the brake disc 2 and which connects the imaginary centers of the tension struts 13. Furthermore, the opening 9 has a further imaginary transverse central line which connects an imaginary center of the application section 11 to an imaginary center of the caliper rear section 12. The longitudinal central line and the transverse central line intersect at an imaginary center point, which in this case is referred to as the virtual center of the opening 9 (see FIG. 2B).

In the brake carrier 6, brake pads 3, 3' are arranged in the so-called pad slots between the respective two brake carrier horns 6e and lie with sections of the bottom sides thereof on a respective pad slot base 6d. This can be clearly seen in FIG. 1. The brake pads 3, 3' can, during a braking operation, be pressed against the brake disc 2 at both sides. Here, each brake pad 3, 3' has a pad carrier plate 4 and, on the side facing toward the brake disc 2, a friction pad 5 fastened to said pad carrier plate on a pad side 4a (see FIG. 4), which friction pad is, during the functional operation thereof, that is to say during a braking operation, pressed against the brake disc 2. The other side of the pad carrier plate 4 will hereinafter be referred to as thrust side 4b.

The brake pads 3, 3' are accessible, for an exchange and for maintenance, through the central opening 9. Said brake pads can, through said central opening 9, be inserted into their associated pad slots and removed from said pad slots again. The pad slots are defined in each case laterally by brake carrier horns 6e, wherein the brake pads 3, 3' stand in each case with partial sections of their bottom sides on a pad slot base 6d.

A rotation arrow about the brake disc axis of rotation 2a indicates a main direction of rotation for forward travel of a vehicle to which the disc brake 10 is assigned. A run-in side ES and, opposite, a run-out side AS, of the disc brake 10 are defined in relation to the main direction of rotation of the brake disc 2. Accordingly, the brake carrier horns 6e on the run-in side ES are referred to as run-in-side brake carrier horns 6e, and those on the run-out side AS are referred to as run-out-side brake carrier horns 6e.

A pad retaining stirrup 16 is arranged over the brake pads 3, 3' in a transverse direction of the opening 9 and, in the direction of the brake disc axis of rotation 2a, between the application section 11 and the caliper rear section 12. An application-side retaining end 16a of the pad retaining stirrup 16 is fastened, in a retaining section 14, to the application section 11 of the brake caliper 1, wherein an oppositely situated, rear-side retaining end 16b of the pad retaining stirrup 16 is fixed to a retaining section 15 of the caliper rear section 12. The rear-side retaining end 16b of the pad retaining stirrup 16 is in this case fastened to the retaining section 15 by means of a bolt-like securing element 17, which is secured against release by means of a clip element 18 (not described in any more detail).

Here, the pad retaining stirrup 16 presses, by way of sections of its bottom side, against clip elements 7a of the two brake pads 3, 3' and thus also against their pad retaining springs 7, whereby the brake pads 3, 3' are held in their pad slots. The pad retaining springs 7 are in each case retained on the pad carrier plates 4 on projections 31.

Braking is performed by way of the application device arranged in a receiving space in the application section 11 of the brake caliper 1, which application device has, for example, a brake lever which is positioned in a dome of the brake caliper 1. The associated brake pad 3, referred to as action-side or application-side brake pad, is the first to make contact with the brake disc 2 during a braking operation. During the further course of the braking operation, reaction forces that occur cause the brake caliper 1 to be displaced in the opposite direction, driving the reaction-side brake pad 3', along until the latter likewise comes into frictional contact with the brake disc 2. The reaction-side brake pad 3' is also referred to as rear-side brake pad, and will hereinafter be distinguished from the application-side brake pad 3 by the reference designation 3'.

After a release of the brake, the two mutually oppositely situated brake pads 3, 3' are, by way of the resetting device, released from the brake disc 2 to such an extent that said brake disc runs freely relative to the brake pads 3, 3'.

Here, the resetting device is composed of two function groups. The first function group comprises the at least one spreading device 8, wherein the second function group has at least one resetting element. Here, the two function groups are provided jointly and assist one another. It is however also possible for only one of the two function groups to be used.

The first function group engages with the spreading device 8 in the upper region of the pad carrier plates 4 of the mutually oppositely situated brake pads 3, 3', so as to act equally counter to the application direction. The second function group exerts in each case thrust and/or pulling forces on the brake pads 3, 3', likewise counter to the application direction, by means of the resetting element(s) in the middle and/or lower region of the pad carrier plates 4 of the mutually oppositely situated brake pads 3, 3'. In this way, the brake pads 3, 3' are acted on by the resetting device with resetting forces simultaneously both in their upper regions and in their middle and/or lower regions.

Here, the spreading device 8 comprises two identical pairs of spring arms 20, a retaining bow 21, and a retaining stirrup 22. The retaining bow 21 is in this case attached in a positionally static manner between brake carrier 6 and bearing beams 45 (see FIGS. 49 and 51), and together with the retaining stirrup 22 forms a retainer for the pairs of spring arms 20.

In each case one pair of spring arms 20 interacts with a brake pad 3, 3'. Each pair of spring arms 20 has a central connecting section 20b (see FIG. 3), to which, at both ends in the longitudinal direction, in each case one spring arm 20 is attached and bent from the center toward the respective brake pad 3, 3'. The two pairs of spring arms 20 are fixedly connected to their central connecting sections 20b and to a connecting section 22a of the retaining stirrup 22 in the center of the opening. The connecting sections 20a, 22a lie parallel to one another and in planes of the brake disc 2.

The retaining stirrup 22 has two retaining arms 22b, of which in each case one is attached to each end of the connecting section 22a and is bent toward the application section 11. The retaining arms 22b extend as far as beyond the retaining bow 21, which is arranged in the region of an application-side edge of the opening 9, and are fixedly connected to said retaining bow by means of fastening elements 22c, for example rivets. This will be discussed in more detail further below.

Figure 2A:
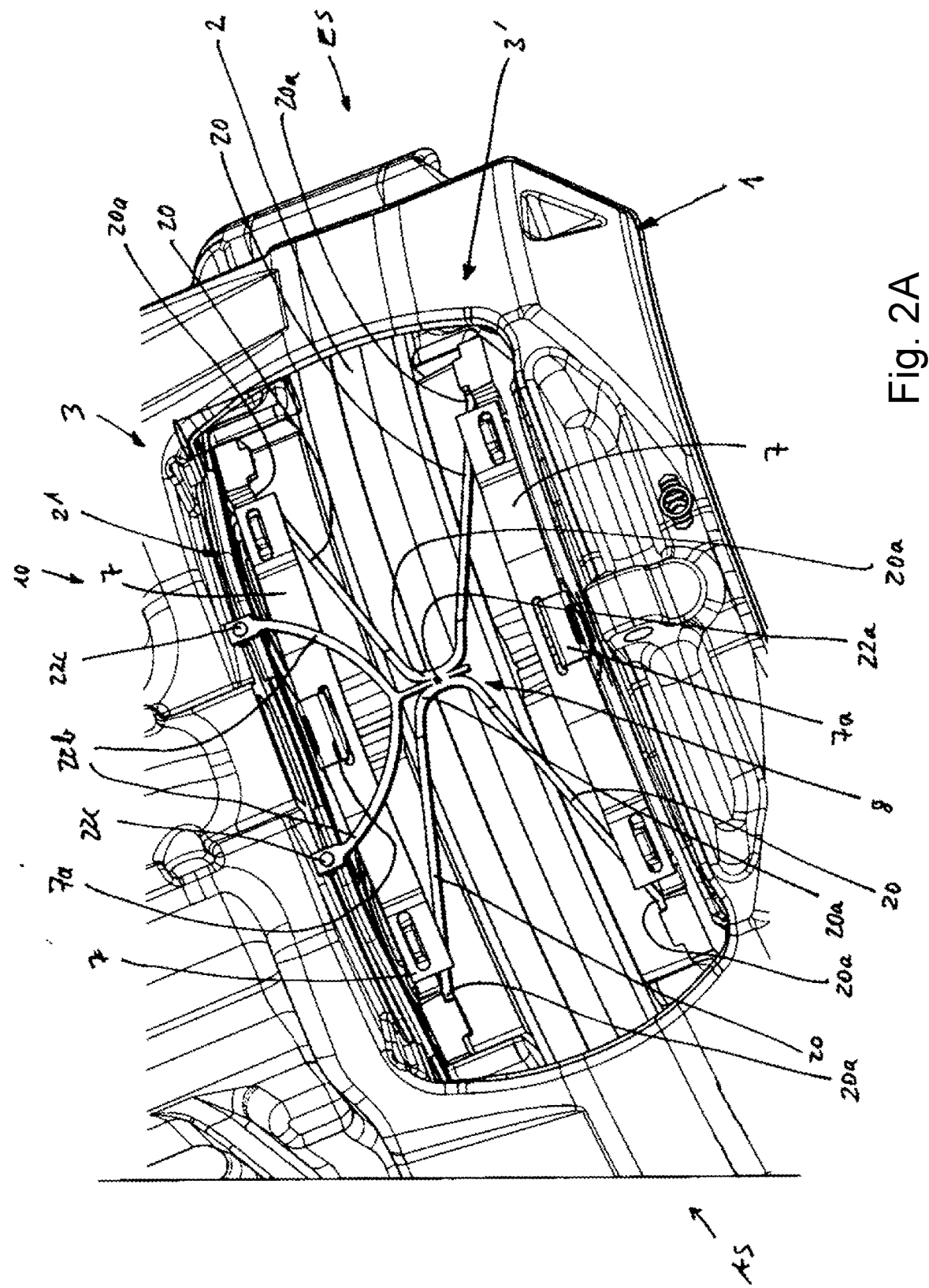
FIG. 2A shows a perspective view of a variant of the resetting device as per FIG. 2.

FIG. 2A shows a perspective view of a variant of the resetting device as per FIG. 2. Here, the pairs of spring arms 20 are arranged not longitudinally but transversely in the opening, wherein the connecting section 22a of the retaining stirrup 22 runs transversely with respect to the opening 9, that is to say in the direction of the brake disc axis of rotation 2a, and is connected centrally to the two spring arm pairs. The retaining arms 22b of the retaining stirrup 22 run in each case in an arc relative to the retaining bow 21.

Figure 3:
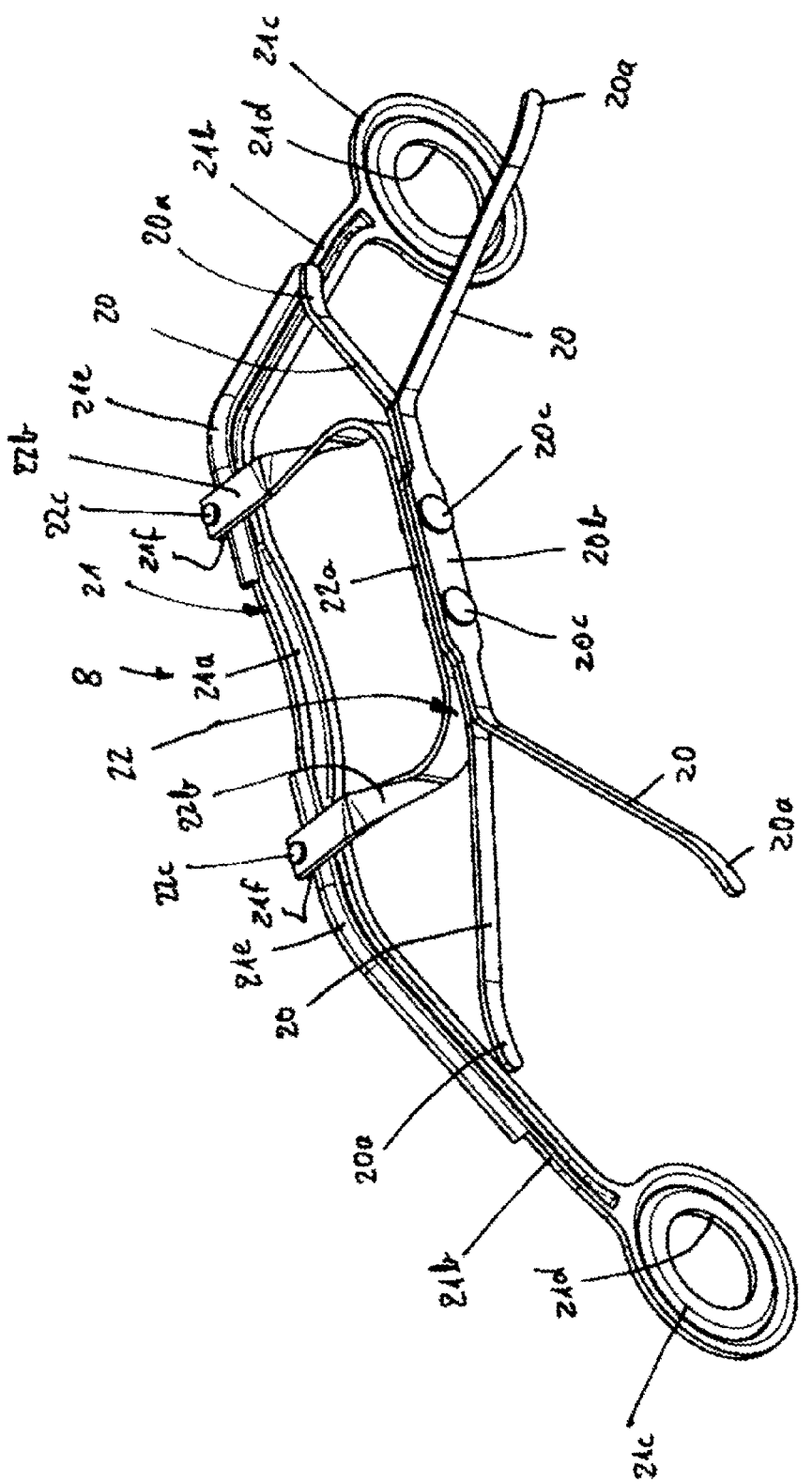
FIGS. 3-3A show perspective views of a first function group of the resetting device of the exemplary embodiment of the disc brake as per FIG. 2.
Figure 3A:
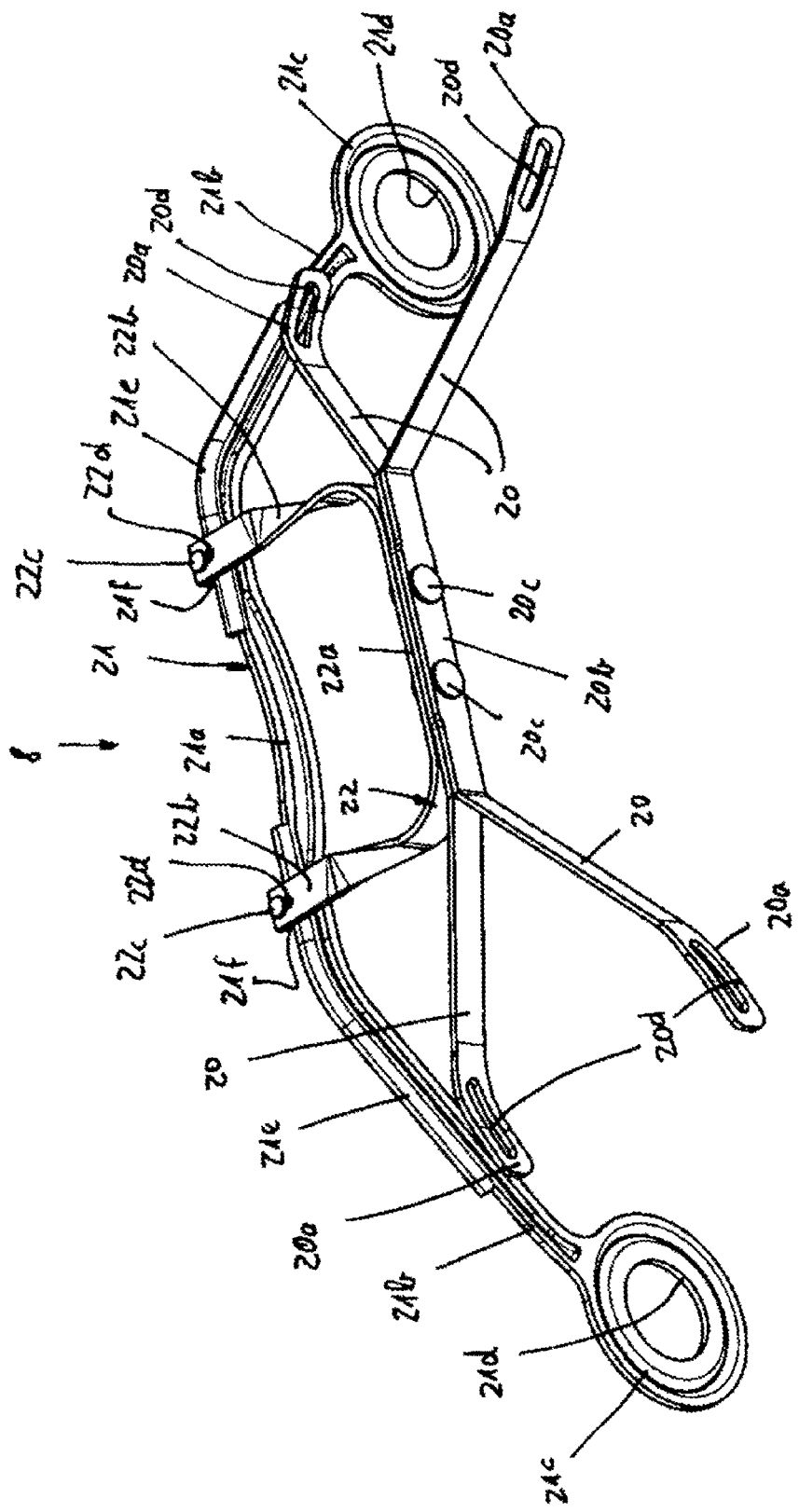

FIGS. 3 to 3A show perspective views of the first function group of the resetting device of the exemplary embodiment of the disc brake 10 as per FIG. 2. FIGS. 3b-6 show schematic views of the first function group as per FIG. 3 with a second function group.

The retaining bow 21 comprises a slightly curved central section 21a. The central section 21a is adjoined on each side by a stirrup arm 21b which runs downward at approximately 45°. To the free end of said two stirrup arms 21b there is attached in each case one circular fastening section 21c with an opening 21d. Accordingly, in the installed state (FIG. 2), the retaining bow 21 extends with its stirrup arms 21b on both sides in each case as far as the bearing receptacles 6b of the brake carrier 6 on the fastening side 6a thereof (see FIG. 1). In the installed state, the fastening sections 21c are arranged with the openings 21d coaxially with respect to the respective bearing receptacles 6b of the brake carrier 6.

In the embodiment as per FIG. 3, the upper edges of the stirrup arms 21b are, as far as over their connecting sections to the central section 21a, equipped with a reinforcement 21, in the end regions of which over the ends of the central section 21a there is attached in each case one horizontal bearing 21f, for example in the form of an angled lug. Said bearings 21f serve for the connection to the ends, lying thereon, of each retaining arm 22b of the retaining stirrup 22.

The retaining bow 21 thus forms a centering device for the brake caliper 1, as the brake carrier 6, to which the retaining bow 21 is fastened by means of the bearing beams 45 (FIGS. 49 and 51), forms a positionally static part which is mounted so as to be displaceable relative to the brake caliper 1, such that, after a release of the brake and a spreading movement of the spreading device 8, that is to say after the brake pads 3, 3' have been pushed apart, the brake caliper 1 is guided into a centered position.

The retaining bow 21 may be produced for example as a punched and bent part, wherein suitable measures may be provided for stiffening purposes, such as for example stiffening means and beads and the like.

The two spring arms 20 of each pair of spring arms 20 are in this case arranged mirror-symmetrically with respect to an imaginary longitudinal axis of the opening 9, which lies in a central plane of the brake disc 2 (see FIG. 2B).

Figure 38:
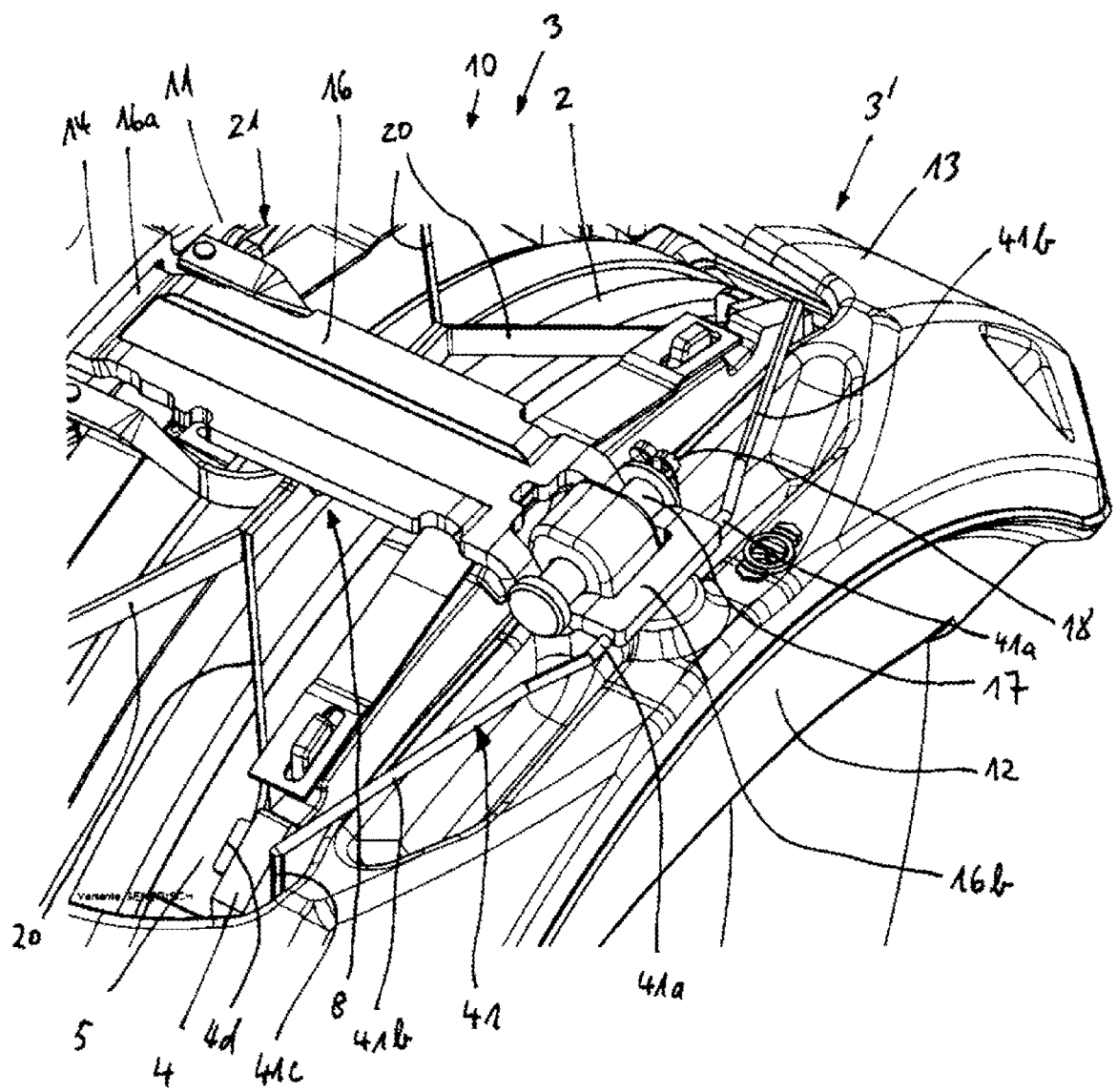
FIGS. 38-39 show perspective views of a further resetting element of the second function group.
Figure 39:
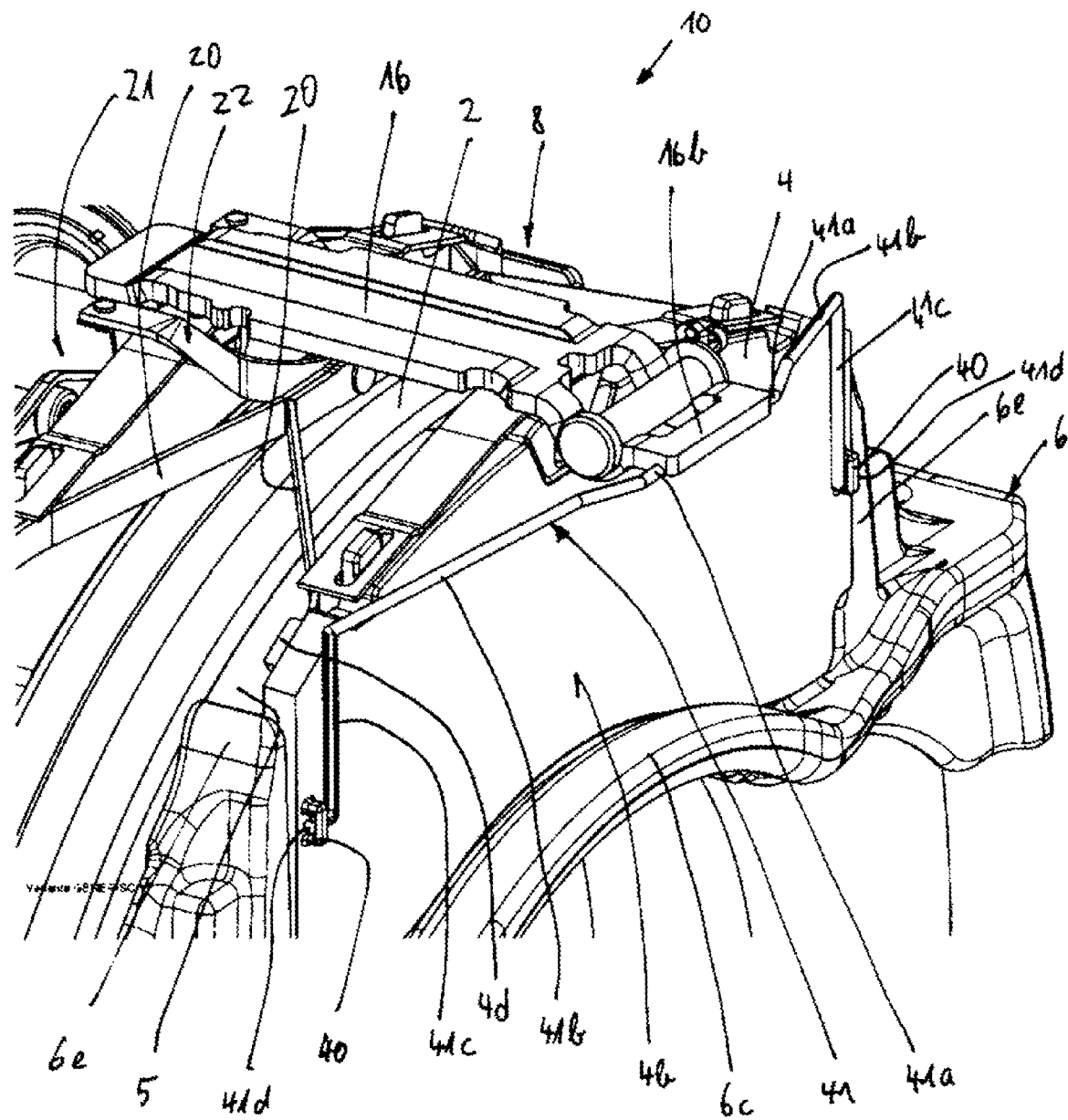

FIG. 3A shows a variant of the spring arms 20 with thrust sections 20a. Here, the thrust sections 20a have elongated holes 20d, which interact with projections of the pad carrier plates 4 for guidance purposes. This is shown for example in FIG. 6 (peg-like projection 4b) and FIG. 19 (prismatic projection 4d). It is also possible for the upper edges of the thrust sections 20a to be guided by a suitable projection on the top side of the pad carrier plate 4, as can be seen in FIGS. 38 and 39.

During the assembly of the disc brake 10, the retaining stirrup 22 is arranged or placed and screwed between the bearing beams 45 and the fastening side 6a of the brake carrier 6, as described above. The actual assembly and setting of the spreading device 8 is performed for the first time by the customer. Here, as a result of an application process, the air gap between brake disc 2 and the brake pads 3, 3' is set to 0 mm, and the spring assembly with the spring arms 20 and retaining stirrup 22 is braced between the brake pads 3, 3'. By means of an elongated hole 22d in the retaining stirrup 22, the spreading device 8 can perform a centering movement between the brake pads 3, 3', and is thus aligned exactly relative to the disc center. This is illustrated in a sectional view in a vertical plane through a retaining arm 22b of the retaining stirrup in FIG. 5 and in a plan view of the disc brake 10 in FIG. 6. The elongated hole connection is thereafter fixed by means of the fastening element 22c. Finally, the air gap is set again, and the spreading device is ready for operation.

FIGS. 3B-6 illustrate schematic views of the first function group as per FIG. 3 with a second function group.

Figure 3B:
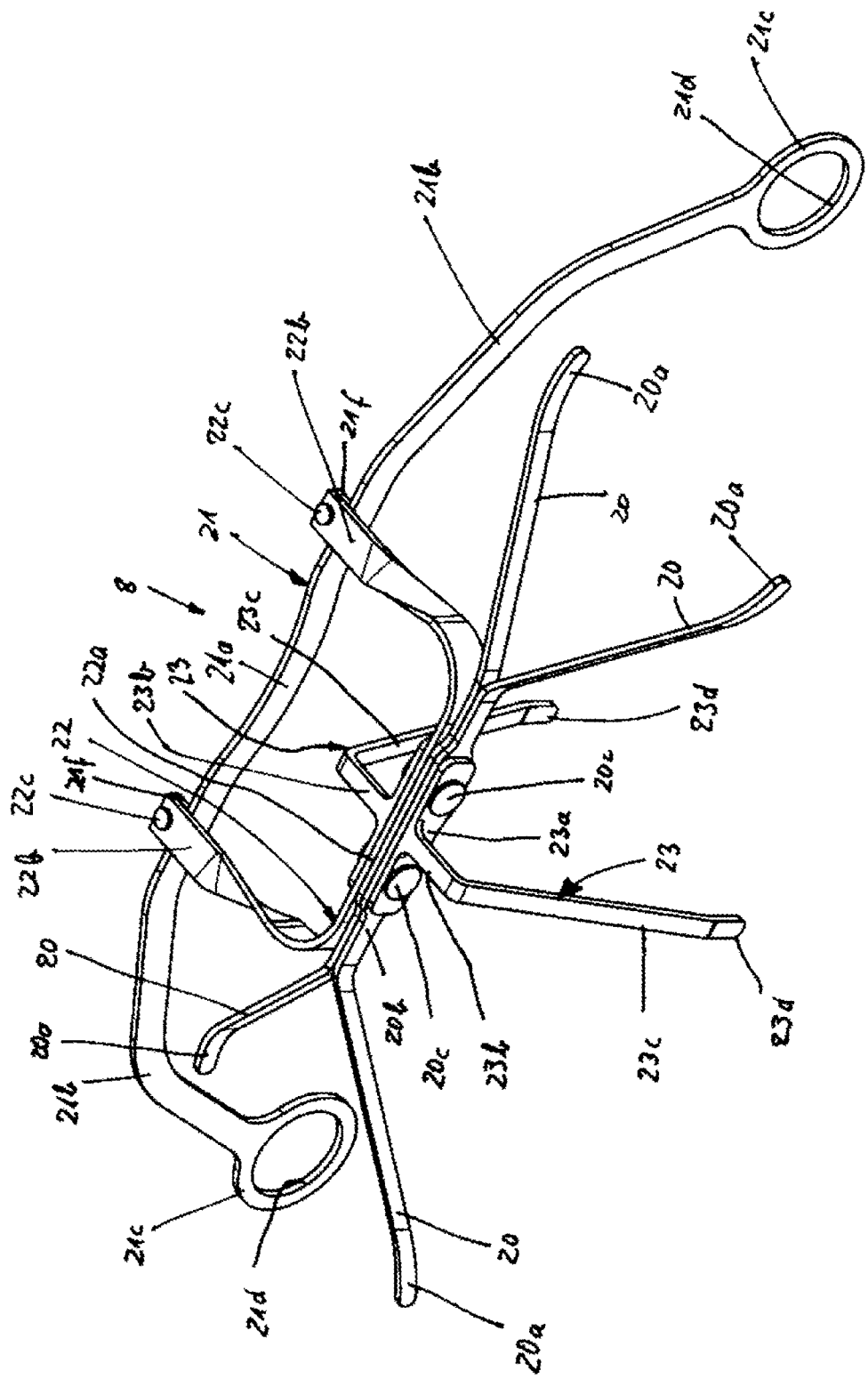

FIG. 3B shows two resetting elements 23 which are of mirror-symmetrical design and which are also fastened mirror-symmetrically to the spreading device 8.

Each resetting element 23 comprises a connecting section 23a, a retaining arm 23b, a spring arm 23c and a thrust section 23d. The connecting section 23a runs in a plane of the brake disc 2 and thus parallel to the connecting sections 20b of the spring arms 20 and of the connecting section 22a of the retaining stirrup 22. The retaining arm 23b is attached, at right angles thereto, to the connecting section 23a, and in this case runs horizontally outward, that is to say in the direction of the brake disc axis of rotation 2a (in the installed state of the spreading device 8). The spring arm 23*c* is attached in a downwardly angled manner to the free end of the retaining arm 23*b*. The spring arm 23*c* has, on its free end, the thrust section 23*d*, which may also be of angled form, as can be seen in FIG. 3*b*.

The resetting elements 23 are arranged with their connecting sections 23*a* in each case on a longitudinal side of a connecting section 20*b* and of the connecting section 22*a* of the retaining stirrup 22, and are jointly fixedly connected to one another by means of the fastening element 20*c*, for example rivets.

Figure 4:
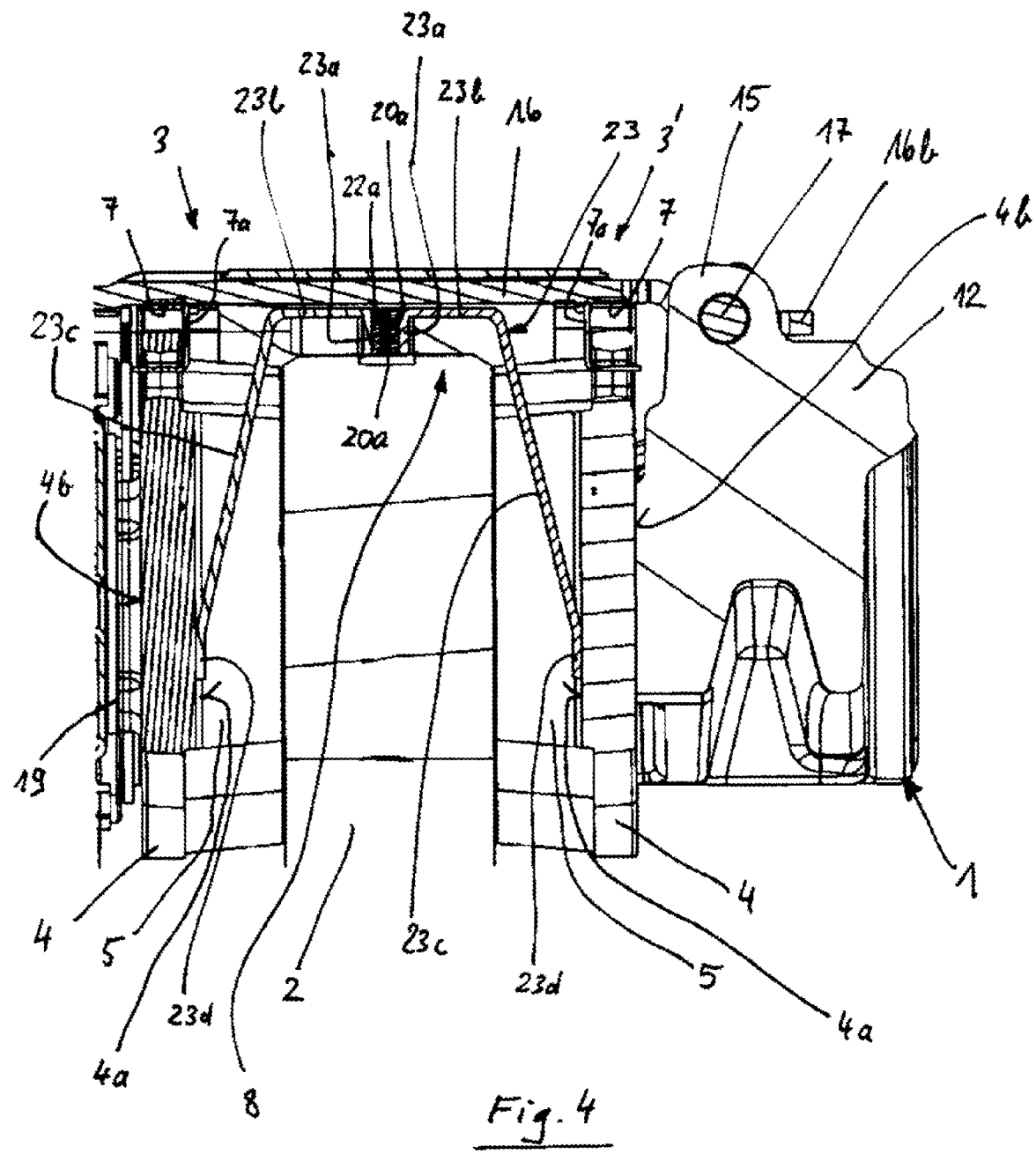
Figure 5:
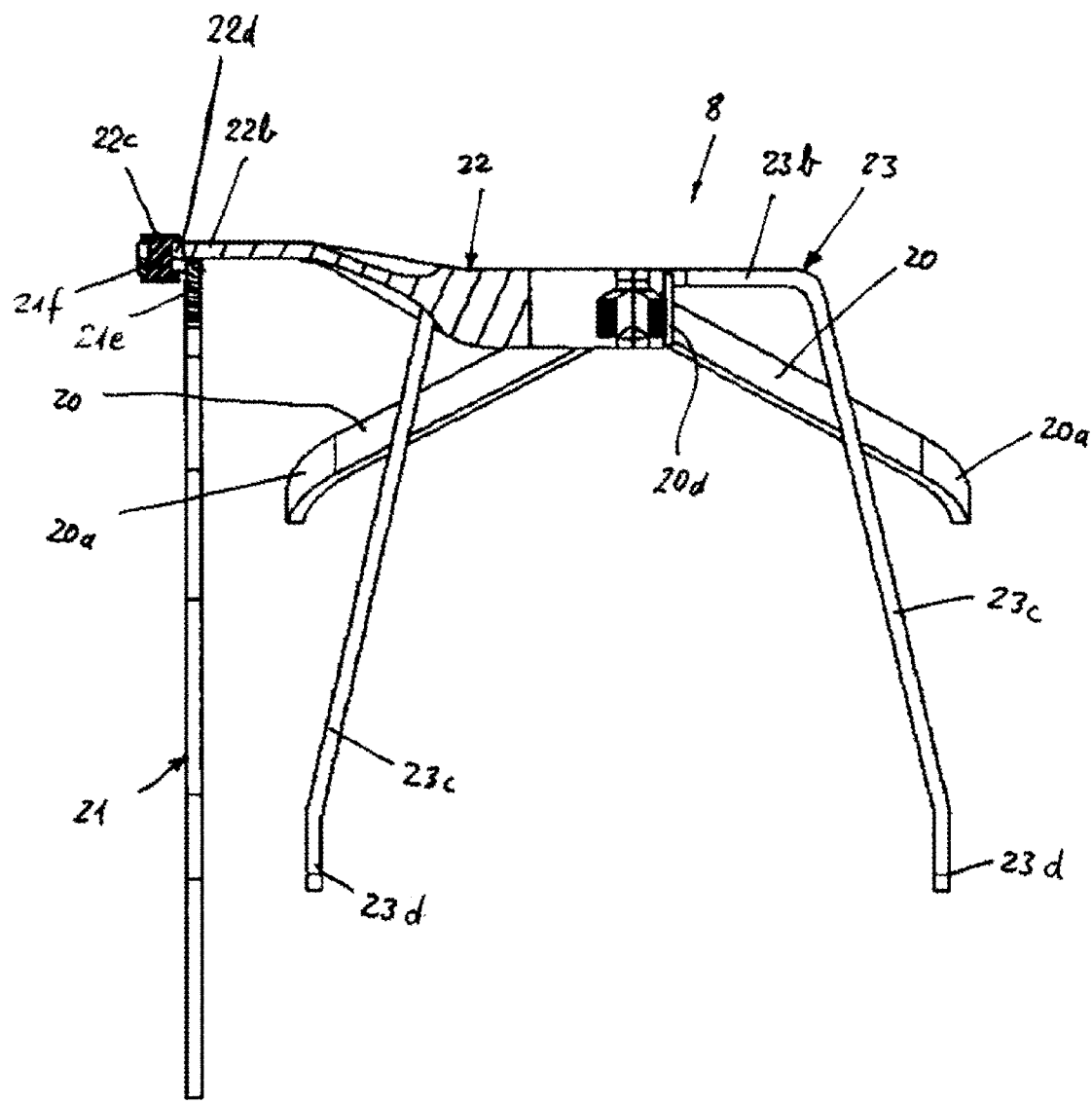

FIG. 4 shows a schematic sectional view in a vertical plane in the brake disc axis of rotation 2*a*. The resetting elements 23 are in contact, by way of their thrust sections 23*d*, in each case in the lower region of a pad side 4*a* of each pad carrier plate 4, wherein said resetting elements each exert a thrust force on the associated pad carrier plate 4 in the direction of the brake disc axis of rotation 2*a*. Said thrust force acts in each case such that associated brake pads 3, 3' are moved away from the brake disc 2.

Figure 6:
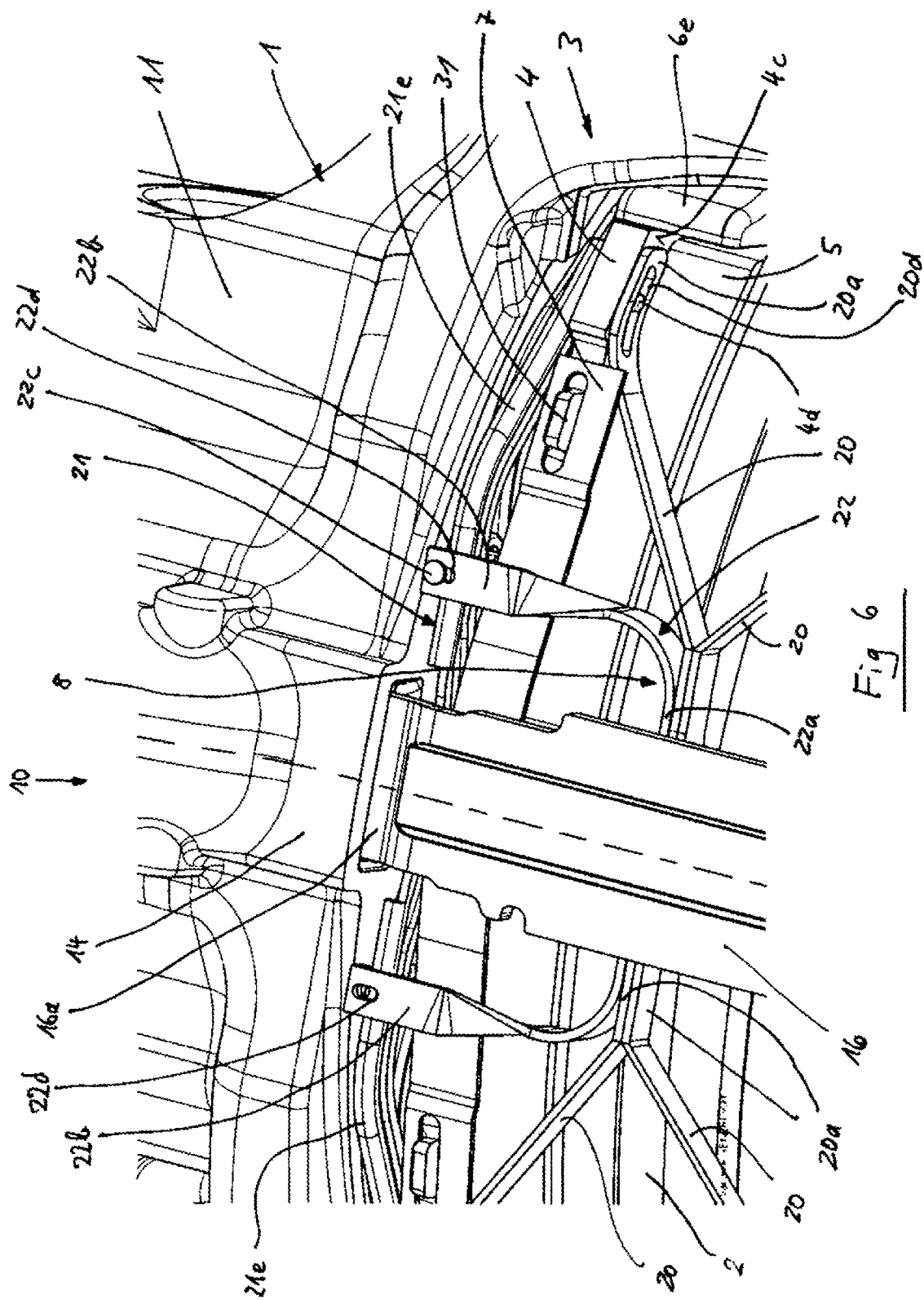

In FIG. 6, in the plan view of the disc brake 10 with the spreading device 8, the elongated holes 22*d* on the ends of the retaining arms 22*b* of the retaining stirrup 22 can be clearly seen. Furthermore, guidance of a thrust section 20*a* of a spring arm 20 by means of a peg-like projection 4*d* can be seen. The projection 4*d* is arranged in the elongated hole 20*d* of the thrust section 20*a* and thereby effects guidance of the spring arm 20, wherein slippage of the thrust section 20*a*, for example as a result of vibrations etc., can also be prevented. The thrust section 20*a* (and self-evidently also the other thrust sections 20*a* that are not illustrated here) lies in this case on the bearing surface 4*c* of the pad side 4*b* of the pad carrier plate 4.

The resetting elements 23 (and likewise the variants described further below) provide assistance for the resetting of the brake pads 3, 3' from the brake disc 2 after a braking process. Here, the resetting elements 23 engage by way of their thrust sections 23*d* in each case in a lower region on the associated pad carrier plate 4 in addition to the engagement point(s) at the top side of the spring arms 20, wherein the resetting elements 23 are, by way of their connecting sections 23*a*, connected via the retaining stirrup 22 and the retaining bow 21 to a section positionally static relative to said resetting elements, specifically to the brake carrier 6.

In a further variant, which is not illustrated but which is easily imaginable, of the spreading device 8, the spring arms 20 may be bent such that their thrust sections 20*a* are mounted with the elongated holes 20*d* over the projections 31 over the pad retaining springs 7. In other words, the projections 31 then extend through the elongated holes 20*d*, which are adapted correspondingly to the projections 31, of the respective thrust sections 20*a* of the spring arms 20. Thus, the thrust forces of the spreading device 8 are introduced via the projections 31 into the respective pad carrier plate 4.

FIGS. 7-13 illustrate schematic views of a variant of the second function group as per FIGS. 3B-6.

Figure 7:
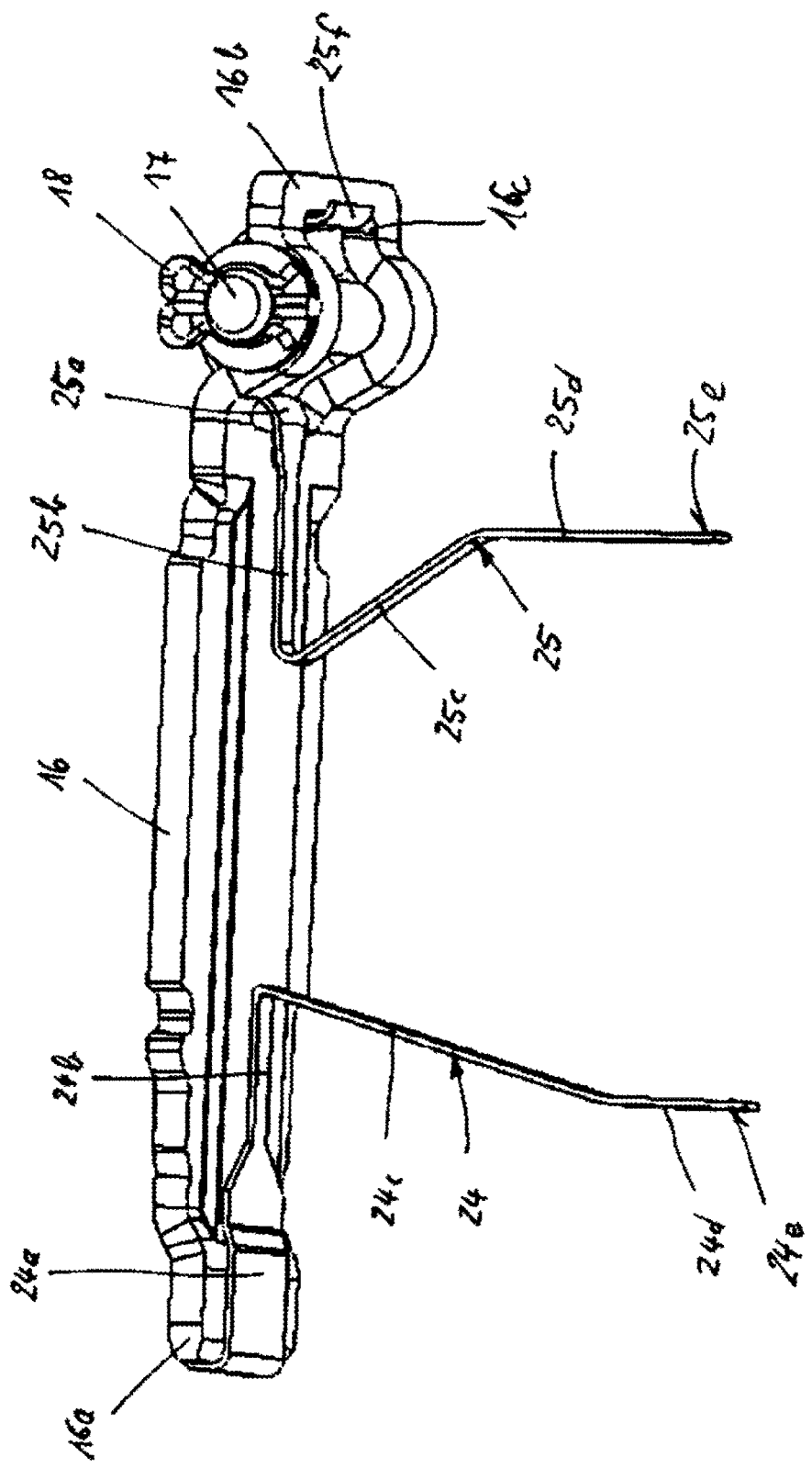
Figure 8B:
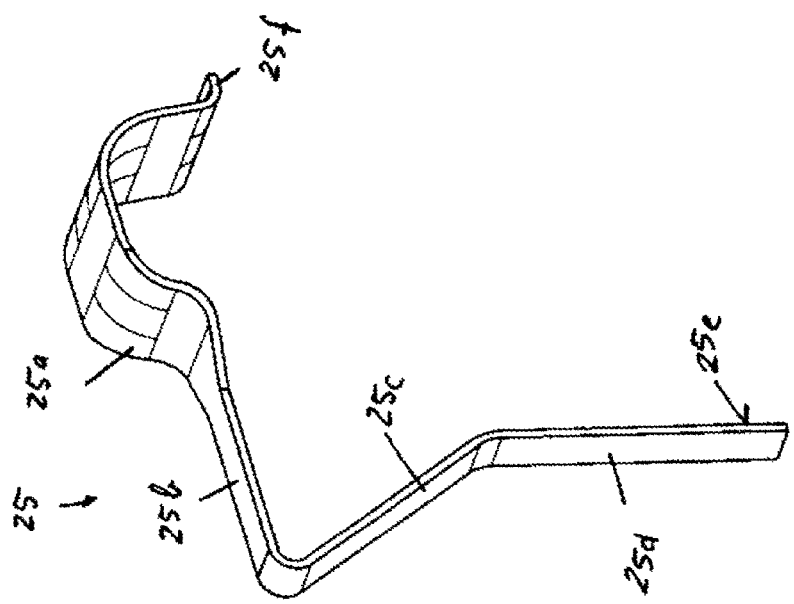
Figure 8A:
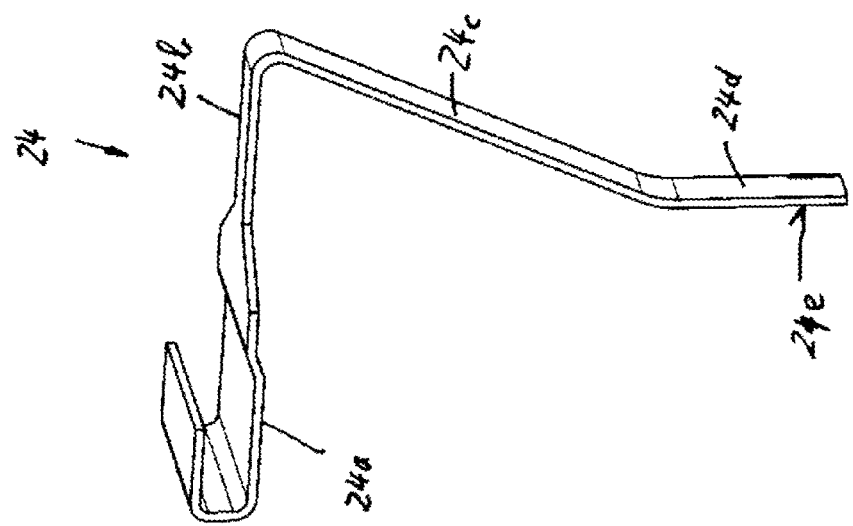
Figure 10:
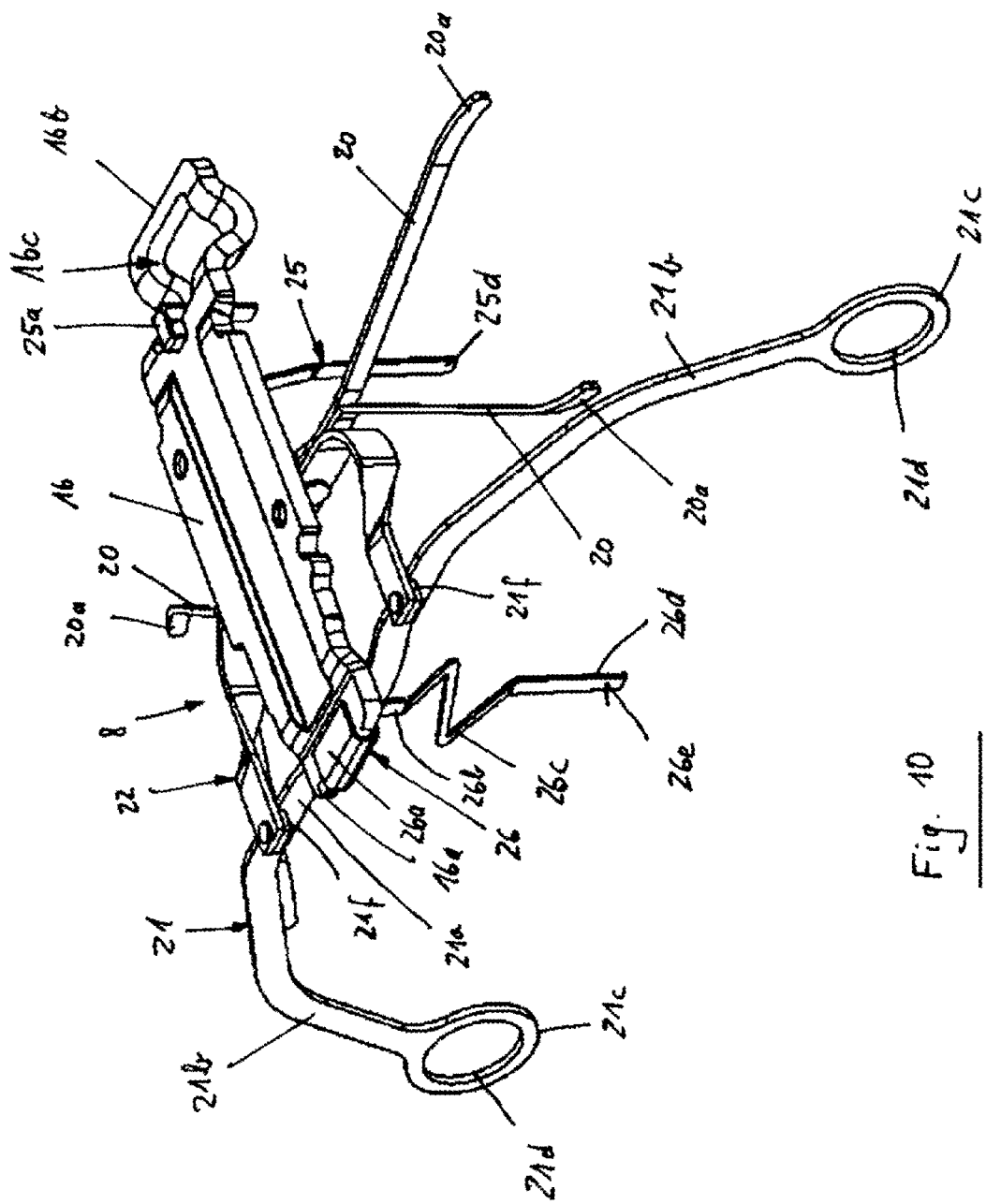
Figure 11:
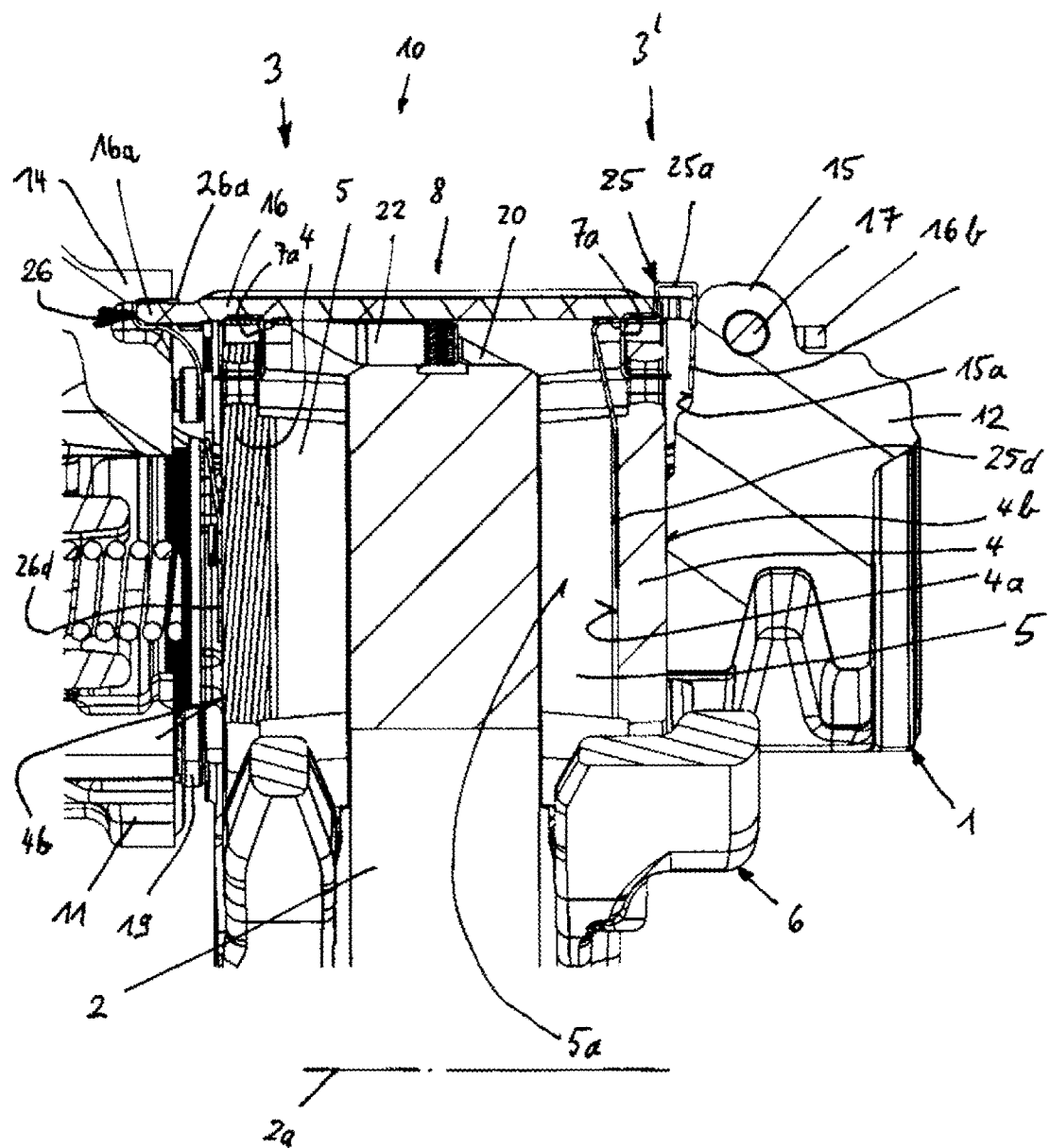
Figure 12:
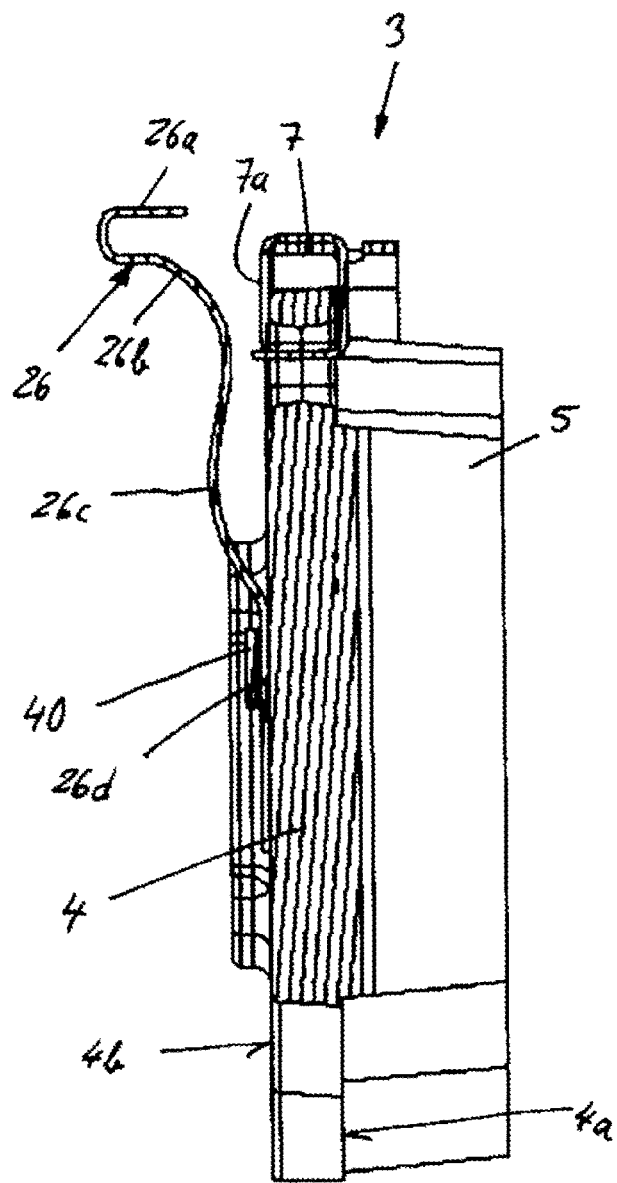
Figure 13:
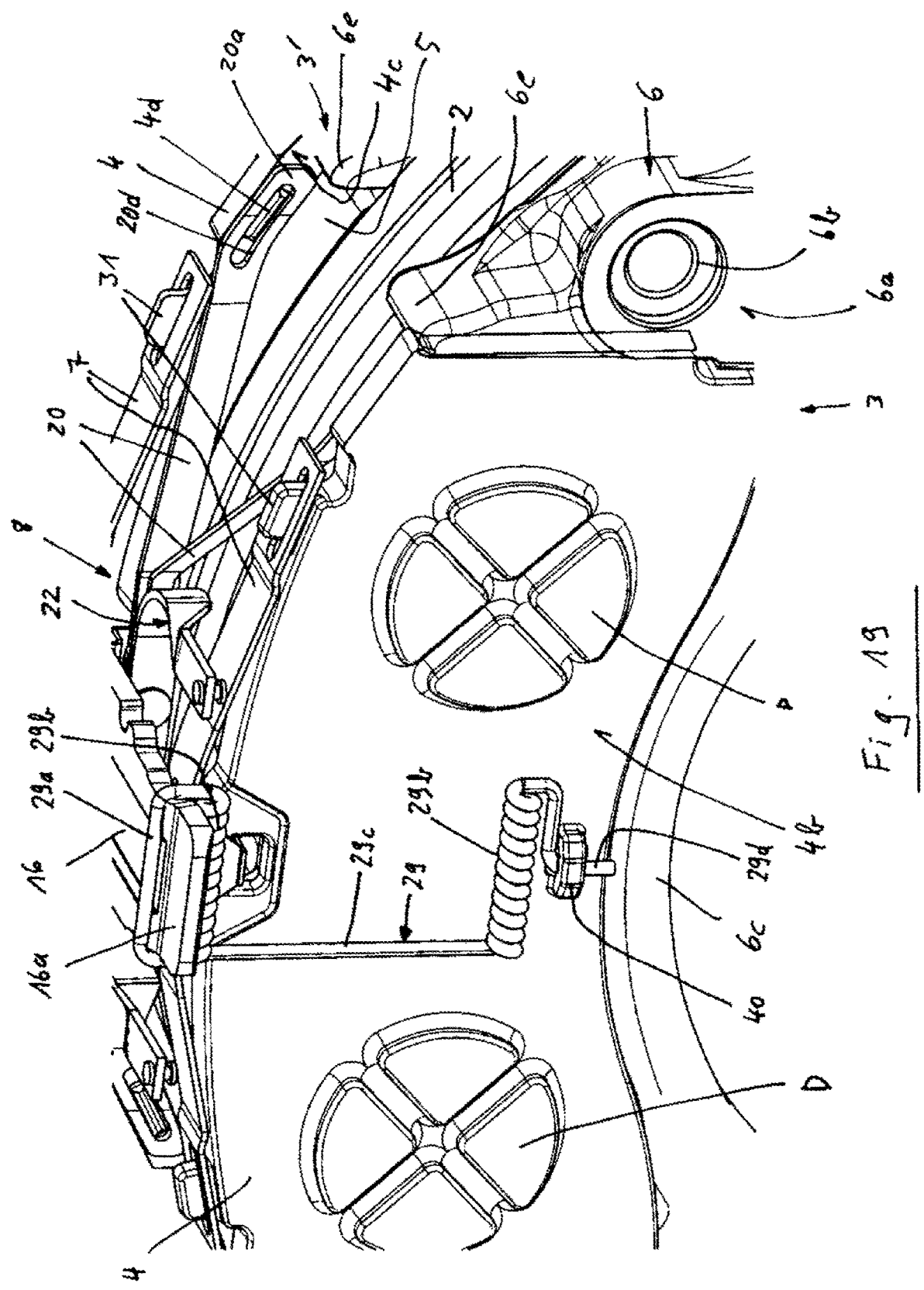

FIG. 7 shows a perspective view of a bottom side of the pad retaining stirrup 16 with resetting elements 24 and 25 attached thereto. FIG. 8 illustrates a plan view of a disc brake 10 in a partial view with the arrangement of the resetting elements 24 and 25. FIGS. 8*a* and 8*b* show perspective illustrations of the resetting elements as per FIG. 7. FIG. 9 shows the pad side of the application-side brake pad 3 as per FIG. 7. FIG. 10 shows a perspective view of the spreading device 8 with the pad retaining stirrup 16 and resetting elements fastened thereto. FIG. 11 shows a sectional illustration in this regard. FIG. 12 shows a sectional illustration of the application-side brake pad 3 as per FIG. 7, wherein FIG. 13 illustrates a view of the pressure side of the application-side brake pad 3.

Here, an application-side resetting element 24 is attached to the application-side retaining end 16*a* of the pad retaining stirrup 16 by means of a fastening section 24*a* in the form of a U-shaped hood. This is adjoined by an arm 24*b* which runs on the bottom side of the pad retaining stirrup 16 and then transitions into a spring arm 24*c* which is bent obliquely downward toward the application side, on the lower end of which spring arm there is provided a thrust section 24*d* with a thrust surface 24*e* pointing toward the application side.

To the rear-side retaining end 16*b* of the pad retaining stirrup 16 there is attached a rear-side resetting element 25, the fastening section 25*a* of which is bent in the manner of a hood and is equipped with a lug 25*f* which engages through an opening 16*c* in the retaining end 16*b* of the pad retaining stirrup 16 in order to fix the resetting element 25. Similarly to the application-side resetting element 24, the rear-side resetting element 25 also has an arm 25*b* and a spring arm 25*c* with a thrust section 25*d*, albeit mirror-inverted. The thrust section 25*d* is equipped with a thrust surface 25*e*, which points toward the caliper rear section 12.

The application-side resetting element 24 is gripped by means of its fastening section 24*a* to the pad retaining stirrup 16, and the rear-side resetting element 25 is clipped by means of its fastening section 25*a* and the lug 25*f* over the so-called pad retaining stirrup nose at the rear-side retaining end 16*b* of the pad retaining stirrup 16.

In FIG. 8, it can be seen that the resetting elements 24, 25 are in each case inserted with their spring arms 24*c*, 25*d* and the thrust sections 24*d*, 25*d* into slots 5*a* of the respective friction pads 5 of the associated brake pads 3, 3'. This is illustrated on an enlarged scale in FIG. 9. The thrust sections 24*d*, 25*d* are in contact with the respective pad side 4*b* of the associated pad carrier plate 4 and exert in each case a thrust force on the respective brake pad 3, 3' for the resetting away from the brake disc 2.

FIGS. 10, 11 and 13 show a variant of the rear-side resetting element 25 and of an application-side resetting element 26, which has a spring arm 24*c* with a spring form in a plane parallel to the brake disc 2.

FIG. 12 illustrates an embodiment of the application-side resetting element 26 which is articulated on the thrust side 4*b* of the associated pad carrier plate 4 by way of a retaining section 40, with a pulling force being exerted on the pad carrier plate 4. In this regard, FIG. 13 shows a plan view of said thrust side 4*b*. A thrust surface 26*e* of the thrust section 26*d* points toward the application section 11 of the brake caliper 1 (see also FIG. 2).

Figures 14, 14A:
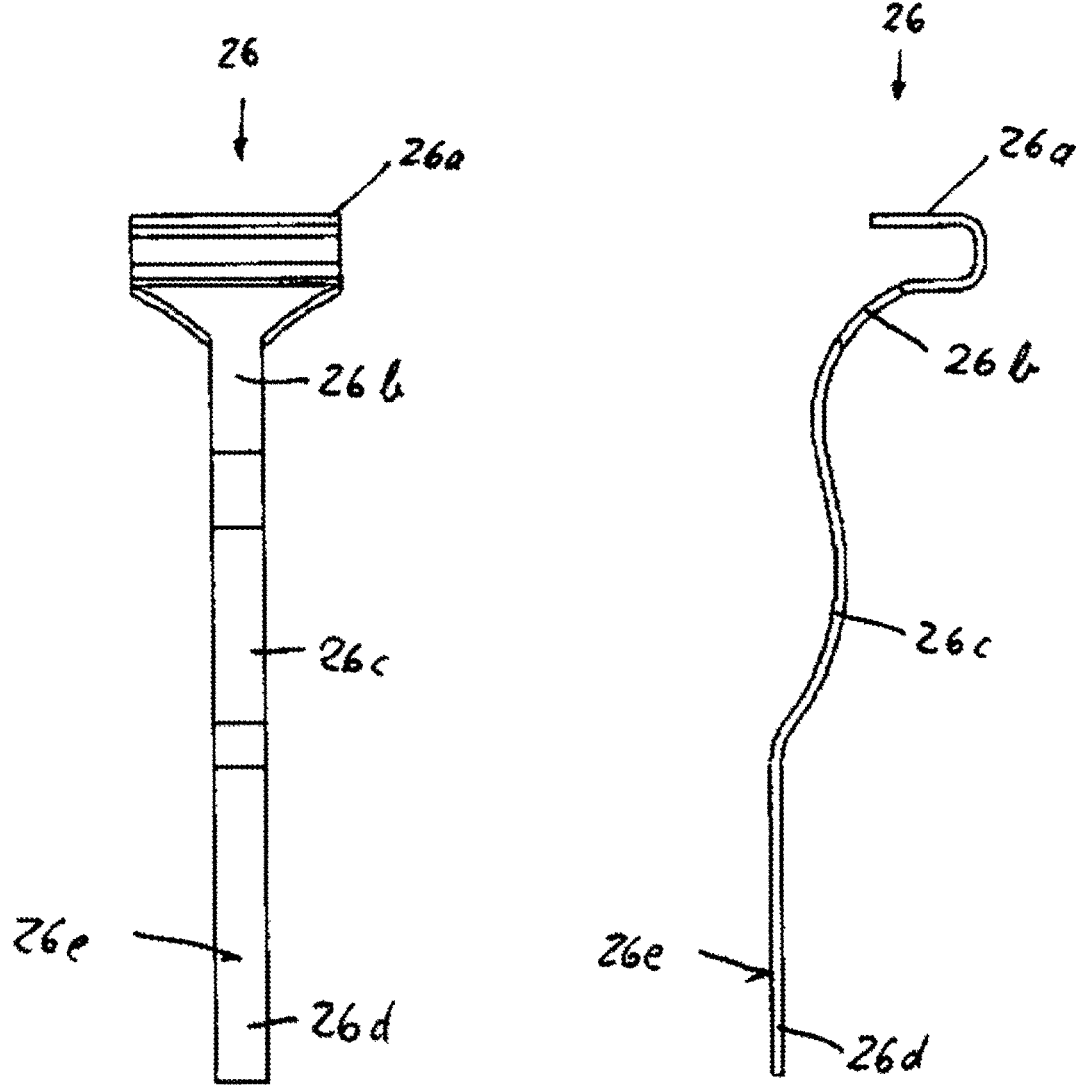

The application-side resetting element 26 in the variant as per FIG. 12 is illustrated in a plan view and in a side view in FIGS. 14 and 14*a*.

Figures 15, 15A:
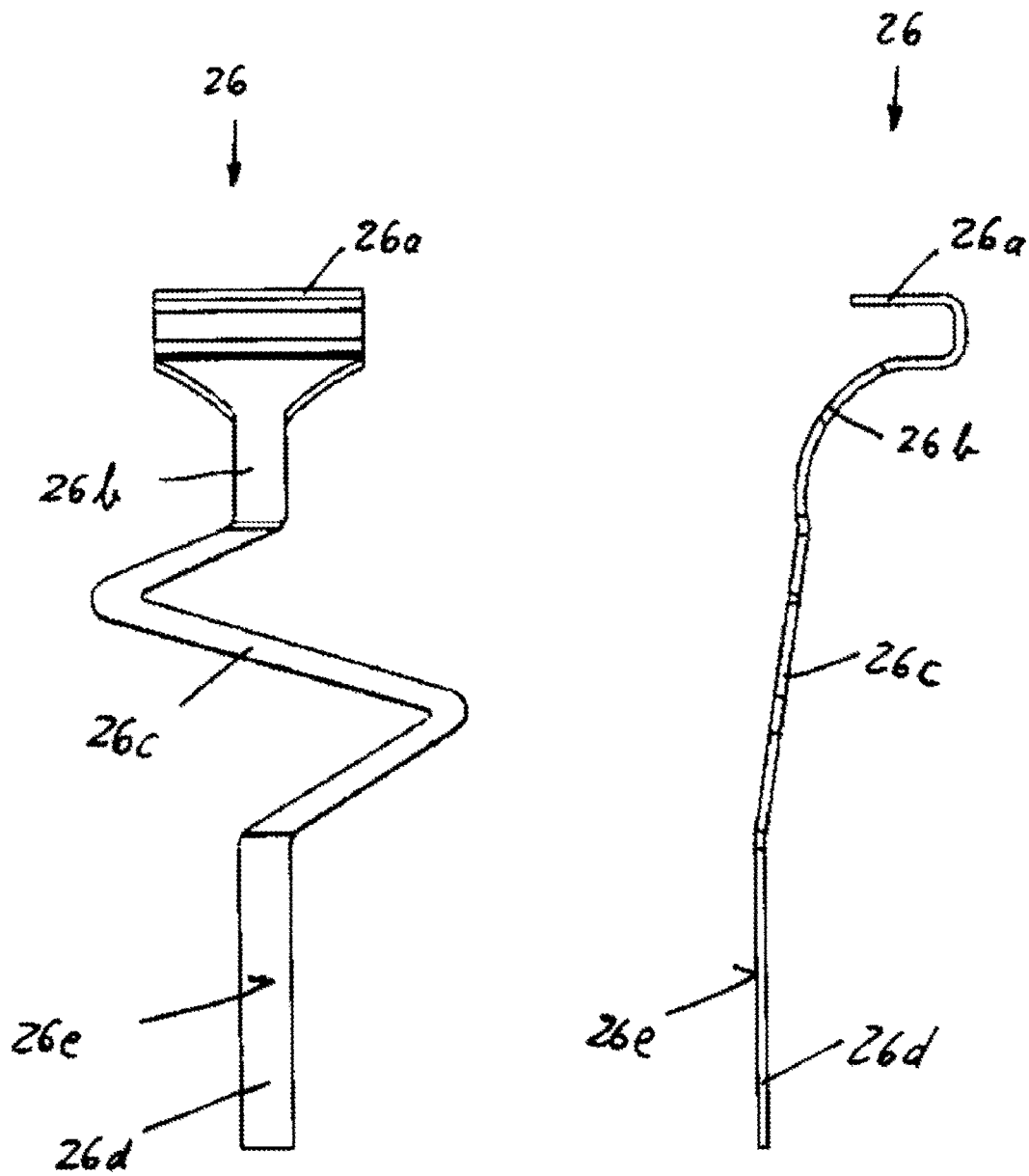

FIGS. 15 and 15*a* illustrate a plan view and a side view of the application-side resetting element 26 as per FIGS. 10 and 13.

Figure 15B:
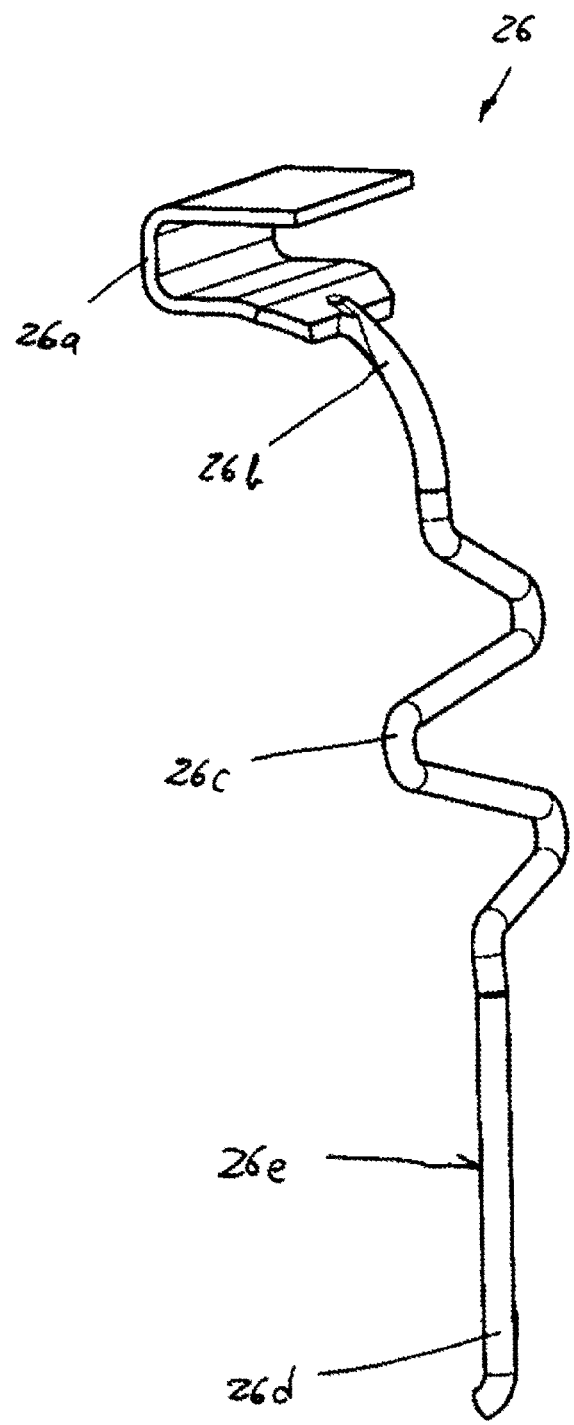

A variant of the resetting element 26 as per FIGS. 15 and 15*a* is shown in FIG. 15*b*. The spring arm 26*c* and the thrust section 26*d* are in this case produced from a spring wire, wherein the fastening section 26*a* has the U-shaped hood as per FIG. 8*a*.

Figure 16:
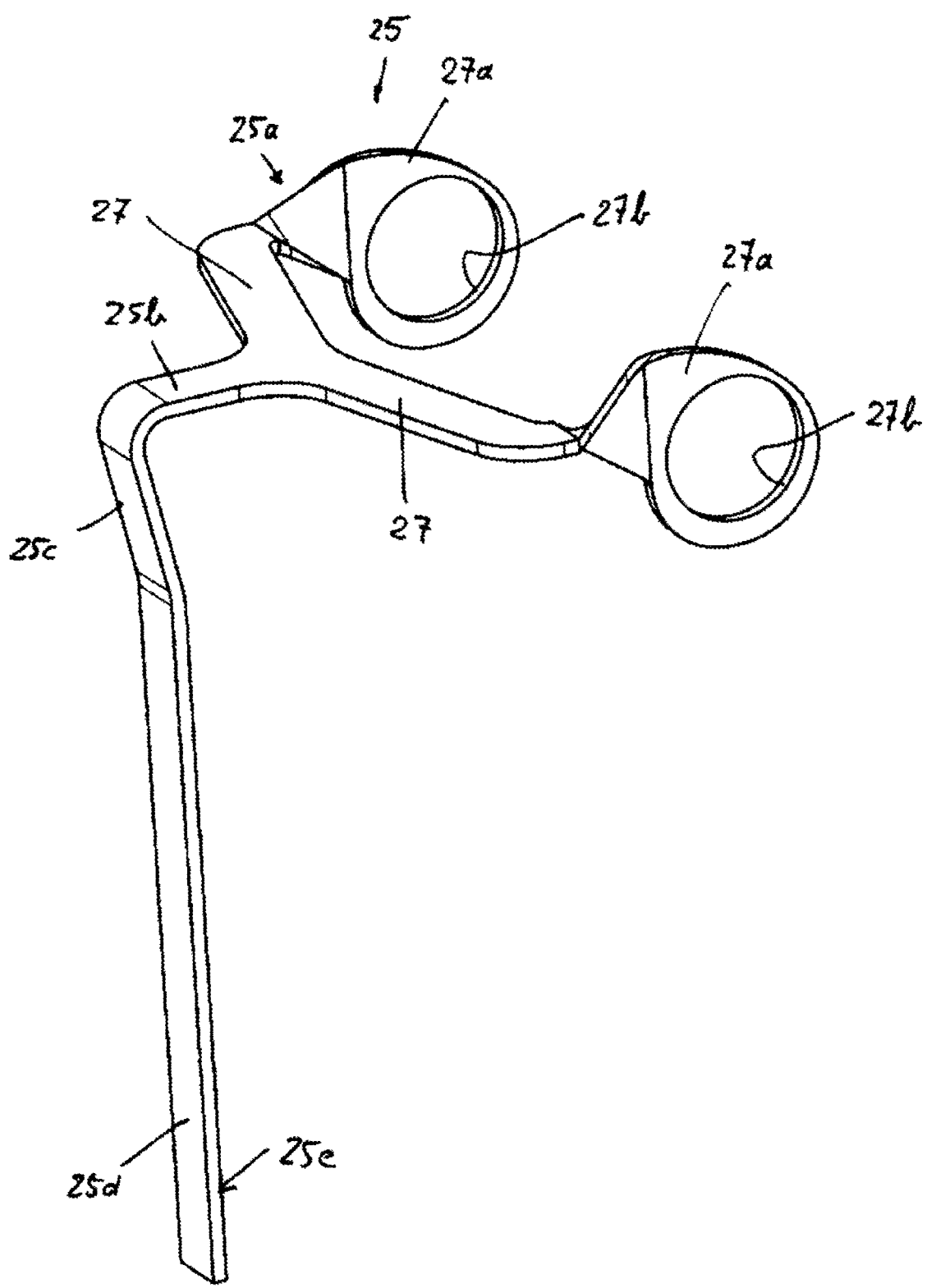

FIG. 16 shows a variant of the rear-side resetting element 25 with two fastening sections 25*a*, which are in each case formed with a ring-shaped fastening section 27*a* with an opening 27*b* and are in each case attached to an arm 27. The arms 27 are attached in a V shape to the arm 25*b* of the resetting element 25. The ring-shaped fastening sections 27*a* are attached and fixed on both sides of the rear-side retaining end 16*b* of the pad retaining stirrup 16 to the bolt-like securing element 17.

Figure 17:
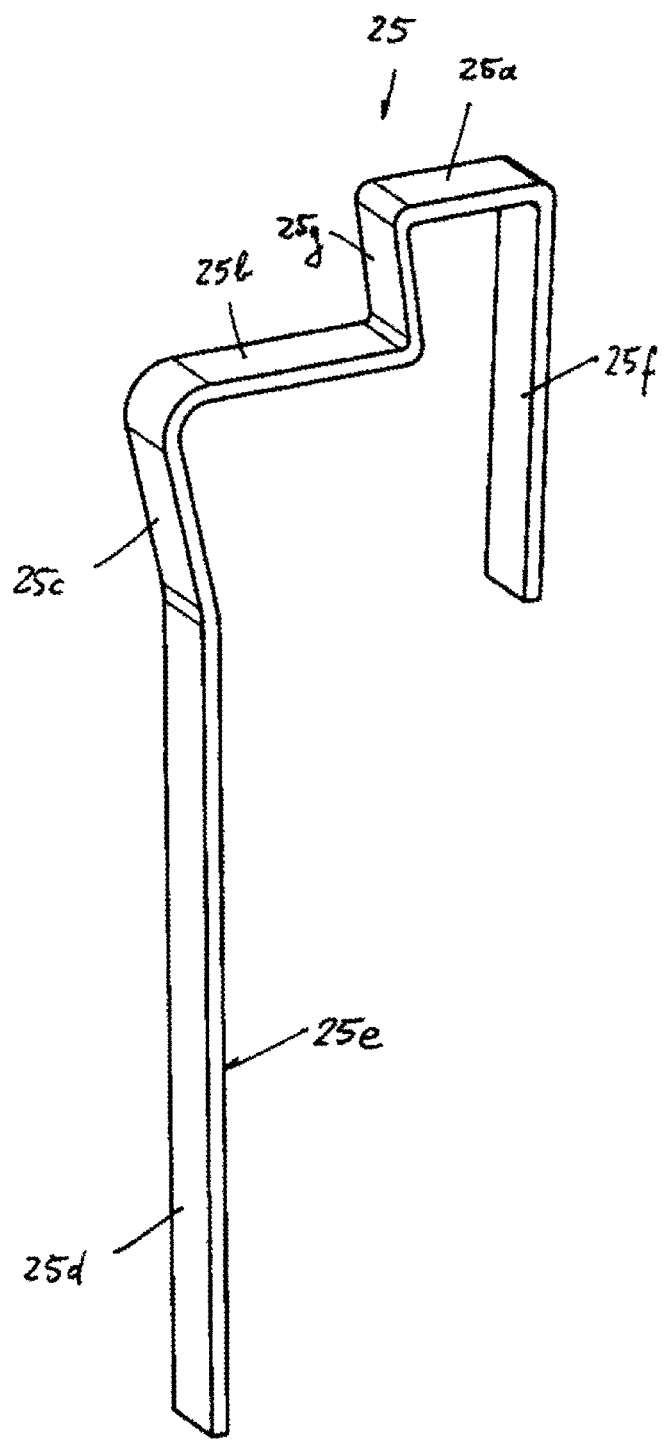

The variant of the resetting element 25 as per FIG. 17 can also be seen in the installed state in FIGS. 10 and 11. The arm 25*b* is adjoined by an upwardly angled connection 25*b*, which then transitions through approximately 90° into the horizontal again into the fastening section 25*a*, the end of which is in turn equipped with a lug 25*f* bent downwardly through 90°, which lug has a length approximately 1.5 times that of the connection 25*b*. FIG. 11 illustrates that the arm 25*b* runs below the pad retaining stirrup 16, between the latter and the clip element 7*a*, as far as the start of the opening 16*c* in the retaining end 16*b*, through which the connection 25*g* extends upward. The fastening section 25*a* runs above the pad retaining stirrup 16, wherein the lug 25*f* extends downward again through the opening 16*c* and bears against a wall 15*a* of the caliper rear section 15.

Figure 17A:
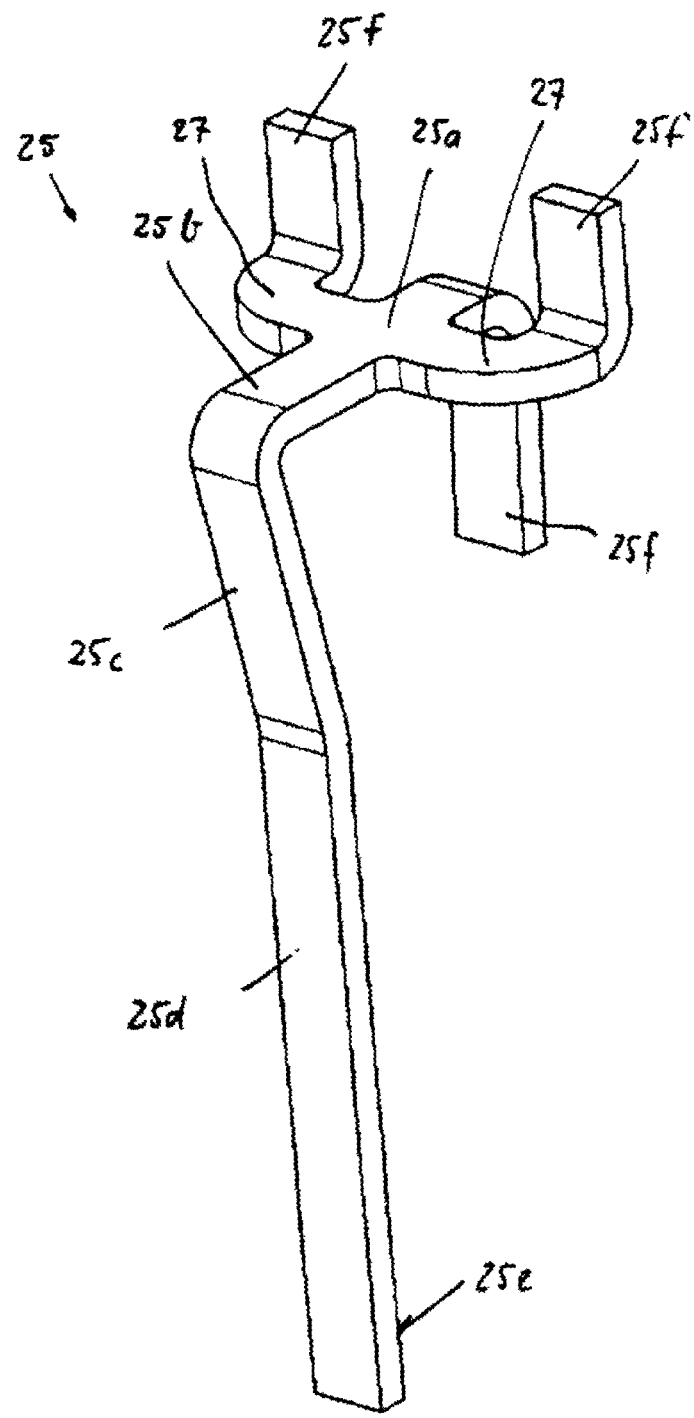

A variant of the resetting element 25 as per FIG. 17 is illustrated in FIG. 17*a*. Here, similarly to the variant as per FIG. 16, two arms 27 are provided. The arm 25*b* transitions, in the same plane, into the fastening section 25*a*, the end of which runs into a lug 25*f* bent downwardly through 90°. To both sides of the fastening section 25*a* there is attached in each case one of the arms 27, the free ends of which are equipped in each case with a lug 25*f* bent upwardly through 90°.

The resetting elements 23, 24, 25, 26 or springs are guided on the respective pad carrier plate 4 by way of a lug (spring arm 23*c*, 24*c*, 25*c*, 26*c*) and are fixed on/in the brake caliper 1 by means of the pad retaining stirrup 16. Owing to the curved form, the resetting elements 23, 24, 25, 26 act over the entire wear travel of the brake pad 3, 4'. By means of the resetting elements 23, 24, 25, 26 or springs, the brake pads 3, 3' are pushed away from the brake disc 2, in accordance with the bending beam principle, after every brake actuation. Thus, there is no contact between the two components, and no residual rubbing torque is generated.

FIG. 18 shows a yet further variant of a rear-side resetting element 28, which comprises a spring stirrup 28*a* with an upper retaining end 28*b* and with a lower thrust section 28*d*. The upper retaining end 28*b* is arranged in the opening 16*c* of the pad retaining stirrup 16 between retaining section 15 and opening 16*c* in the region of the clip element 7*a*, and presses with a bearing section 28*c* of the retaining end 28*b* against an application-side wall 16'*c* of the opening 16*c*. The lower thrust section 28*d* is received in a pocket 4*e* on the thrust side 4*b* of the pad carrier plate 4, and is in contact by way of its thrust surface 28*e* with an application-side wall of the pocket 4*e*.

FIGS. 19-28 illustrate perspective views of further resetting elements of the function group of the resetting device as per FIGS. 7-13.

FIG. 19 shows a resetting element 29 with a spring arm 29*c*, the upper end of which is attached via a spring coil 29*b* with a fastening section 29*a* to the application-side retaining end 16*a* of the pad retaining stirrup 16. The lower end of the spring arm 29*c* is connected via a further spring coil 29*b* to a clamping end 29*d*. The spring coils 29*b* are for example spiral springs with parallel longitudinal axes which run tangentially with respect to the brake disc 2. The clamping end 29*d* is arranged in an eyelet of the retaining section 40 on the thrust side 4*b* of the application-side pad carrier plate 4.

Figure 20:
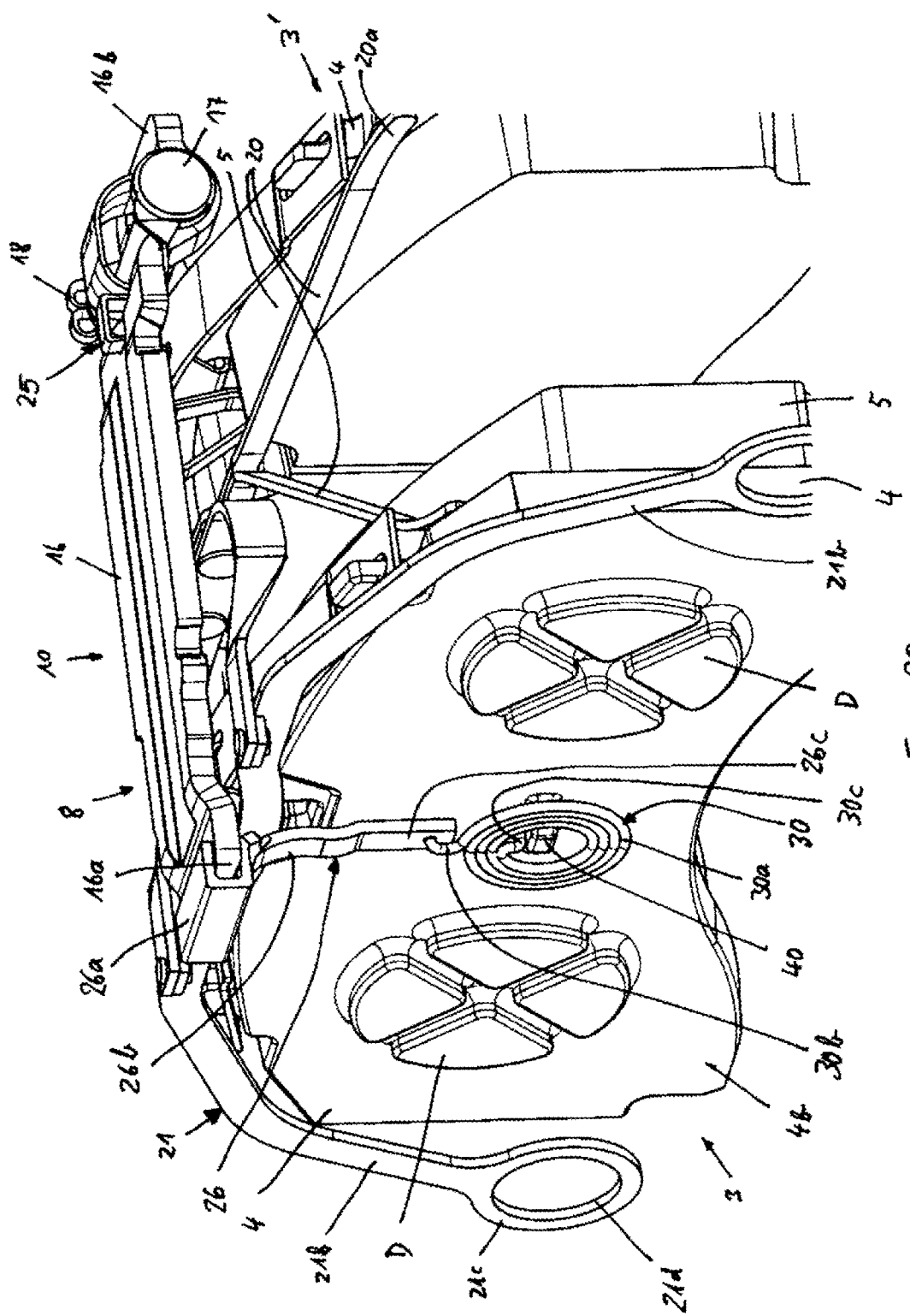
Figure 21:
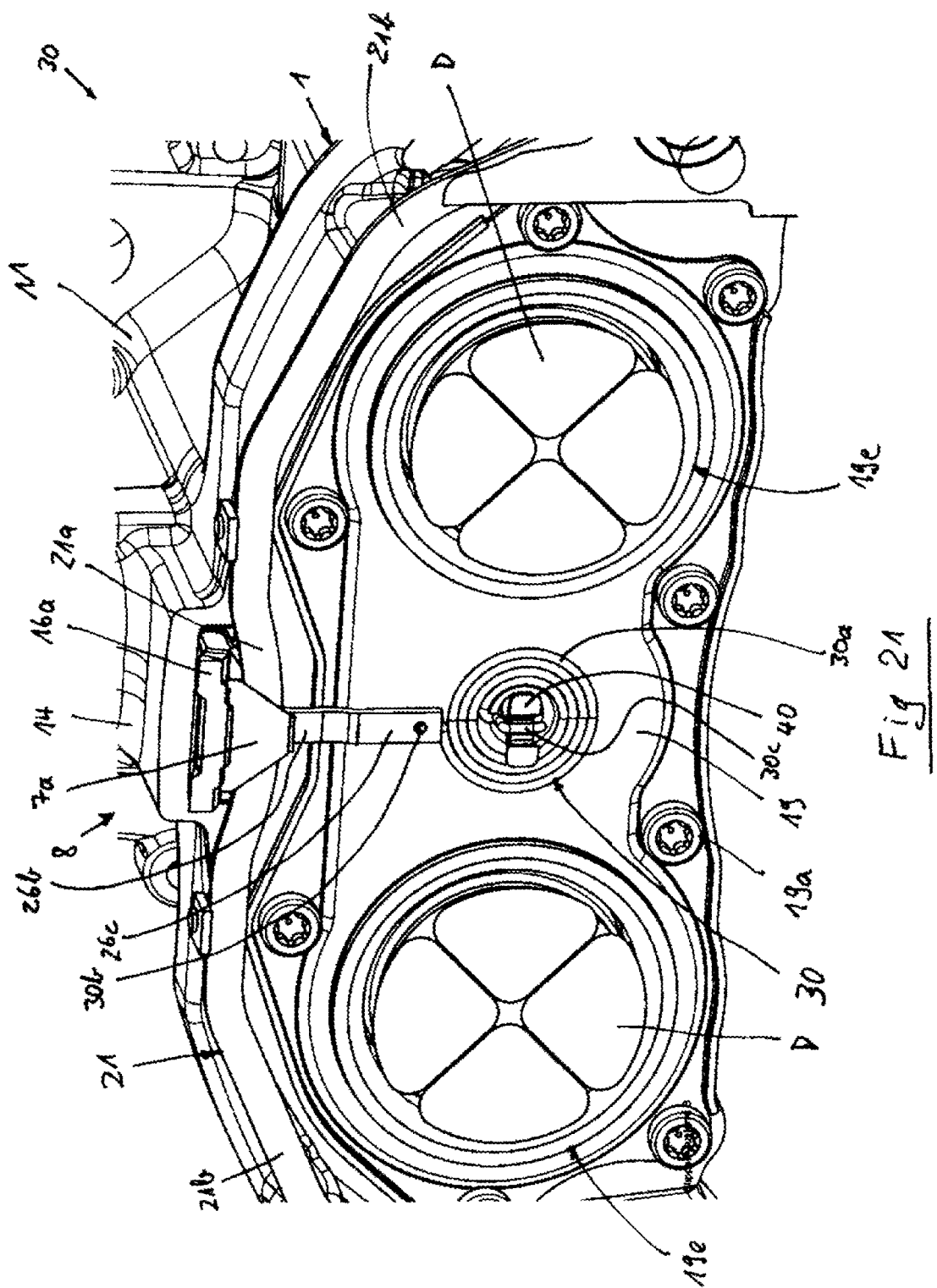

A resetting element 26 as per FIG. 20 has the fastening section 26*a* with the arm 26*b* as per FIG. 8*a*. FIG. 21 shows, in this regard, a view in the direction of the application section 11 with the base plate 19, wherein the retaining section 40 has been cut in stirrup form from the thrust side 4*b*. Said retaining section 40 however has a short spring arm 26*c*, to the lower end of which a spring element 30 is jointly attached. The spring element 30 comprises a spring coil 30*a*, the upper spring end 30*b* of which is hooked onto the spring arm 30, and the lower spring end 30*c* of which engages with the retaining section 40 on the thrust side 4*b* of the application-side pad carrier plate 4. The spring coil 30 is formed as a flat spiral spring, for example as a so-called evolute spring, arranged around the retaining section 40.

On the thrust side 4*b* of the application-side pad carrier plate 4 there are arranged thrust sections D which protrude on both sides and which interact with thrust plungers DS (see FIG. 24) of the application device. For this purpose, openings 19*e* are provided in the base plate 19 for the thrust plungers DS.

Figure 22:
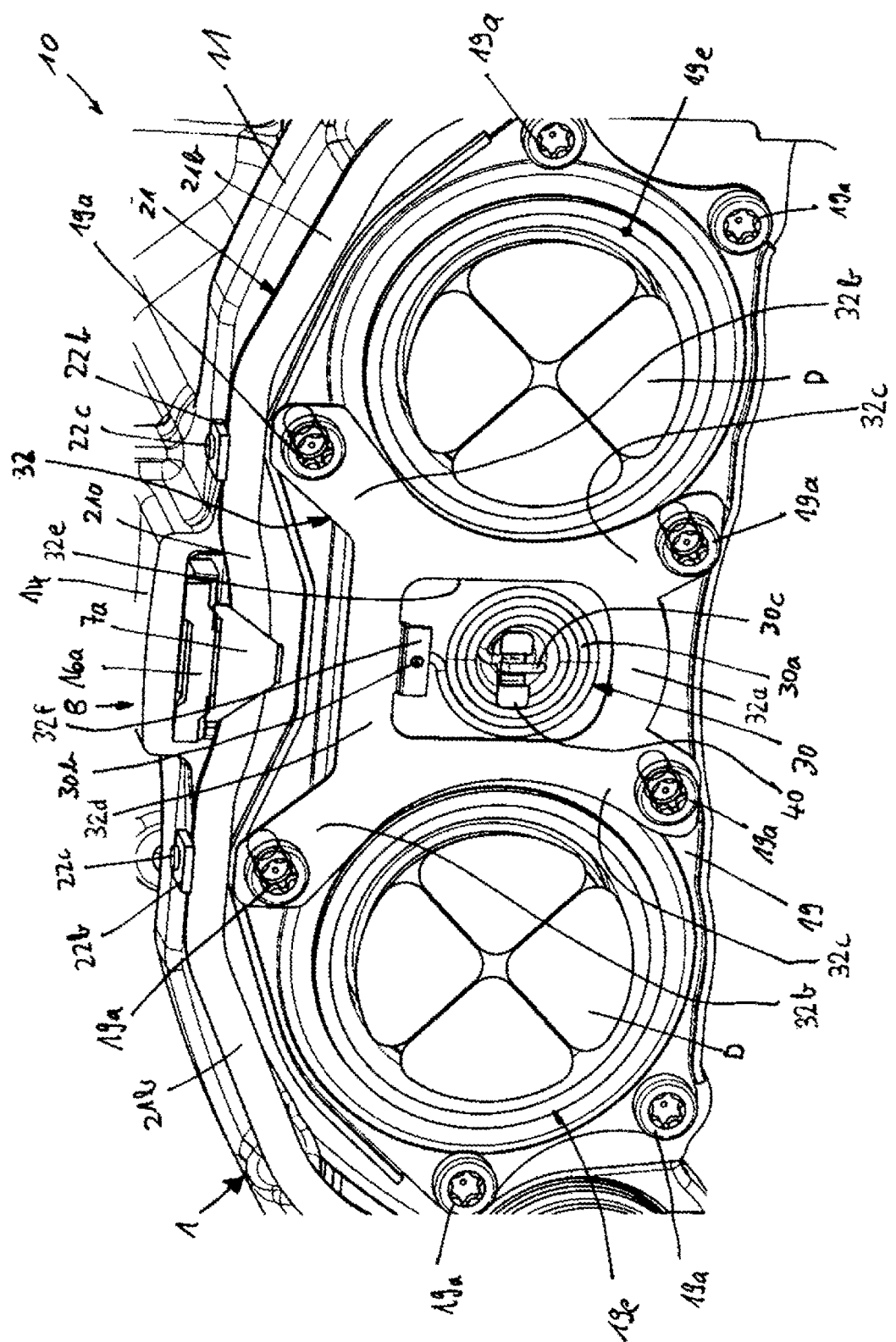
Figure 23:
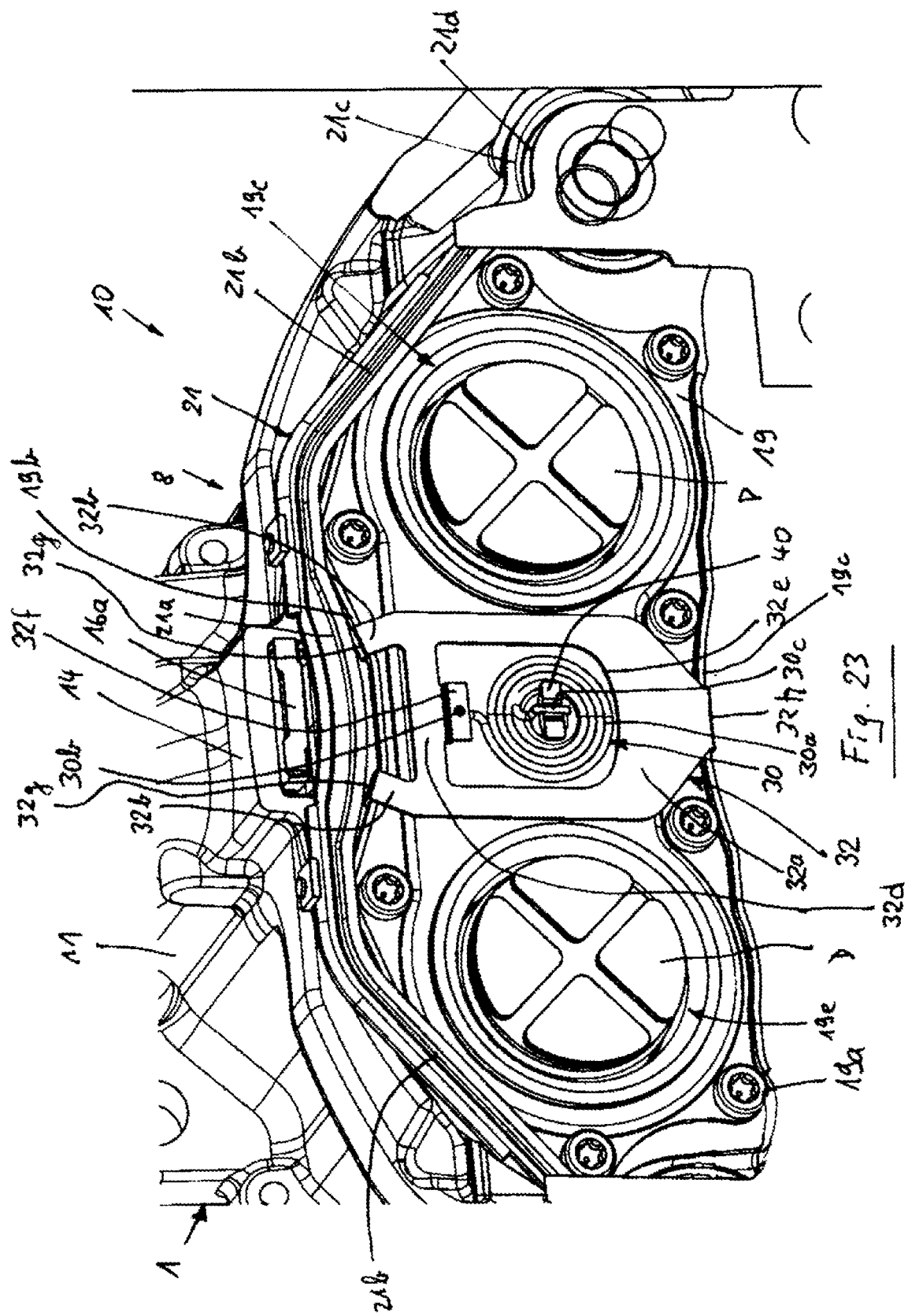

In another embodiment which is shown in FIGS. 22 and 23, the spring element 30 is hooked with its upper spring end 30*b* into a lug 32*f* of a connecting plate 32 fastened to the base plate 19. The connecting plate 32 is, as shown in the version in FIG. 22, attached by means of arms 32*b*, 32*c* of a body 32*a* of the connecting plate 32 to the base plate 19 by means of fastening elements 19*a* of the base plate 19. The spring element 30 with the retaining section 40 is arranged in an opening 32*e* in the body 32*a*. The upper arms 32*b* are connected by means of a lug section 32*d* of the body 32*a*. The lug 32*f* is arranged on the lug section 32 within the opening 32*e*.

By contrast to FIG. 22, the connecting plate 32 as per FIG. 23 fixedly grips onto the base plate 19. For this purpose, the upper arms 32*b* are equipped at their ends with in each case one gripping section 32*g*. The gripping sections 32*b* are attached to a top side 19*b* of the base plate 19. Furthermore, the connecting plate 32 has, on its bottom side, a further gripping section 32*h*, which engages with a bottom side 19*c* of the base plate 19. By means of the gripping sections 32*g*, 32*h*, the connecting plate 32 is fastened to the positionally static base plate 19.

Figure 24:
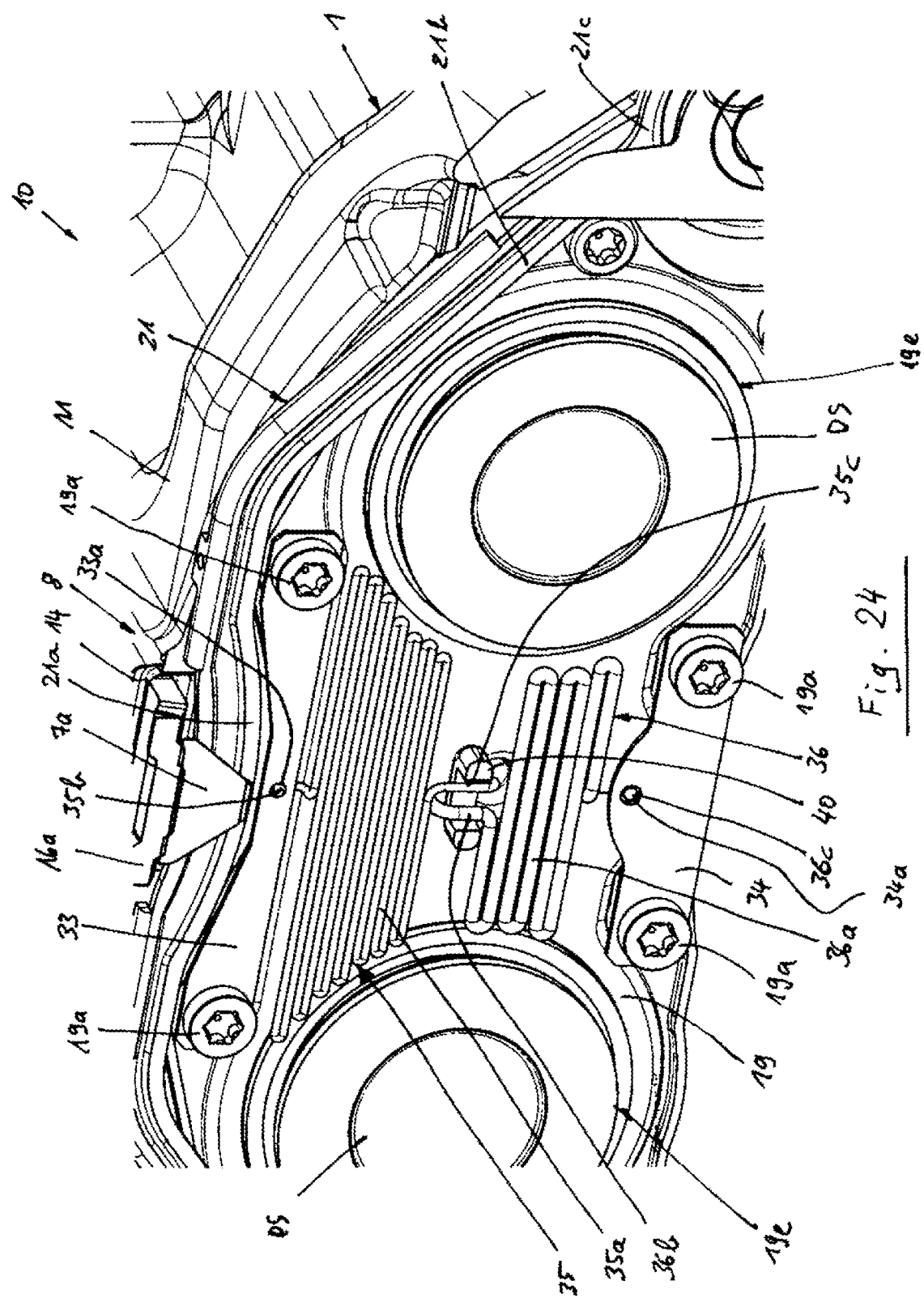

FIG. 24 shows an embodiment with two spring units 35 and 36 as resetting elements of the application-side brake pad 3. Each spring unit 35, 36 has a spring wire 35*a*, 36*a* which is formed into a flat spring and which has, in each case, spring ends 35*b*, 36*b* and 35*c*, 36*c*. The spring units 35, 36 are arranged one above the other in a vertical direction. The upper spring unit 35 is hooked with its upper spring end 35*b* into an opening 33*a* of an upper retaining plate 33 which is fastened to the base plate 19 by way of fastening elements 19*a*. The lower spring end 35*c* of the upper spring unit 35 is articulated, together with the upper spring end 36*b* of the lower spring unit 36, on the retaining section 40 of the pad carrier plate 4. The lower spring end 36*c* of the lower spring unit 36 is fastened in an opening 34*a* on a lower retaining plate 34. The lower retaining plate 34 is likewise fastened by way of the existing fastening elements 19*a* to the base plate 19. The wire diameters of the spring wires 35*a*, 36*a* of the spring units 35, 36 differ in order to allow for the different structural spaces for the spring units 35, 36.

Figure 25:
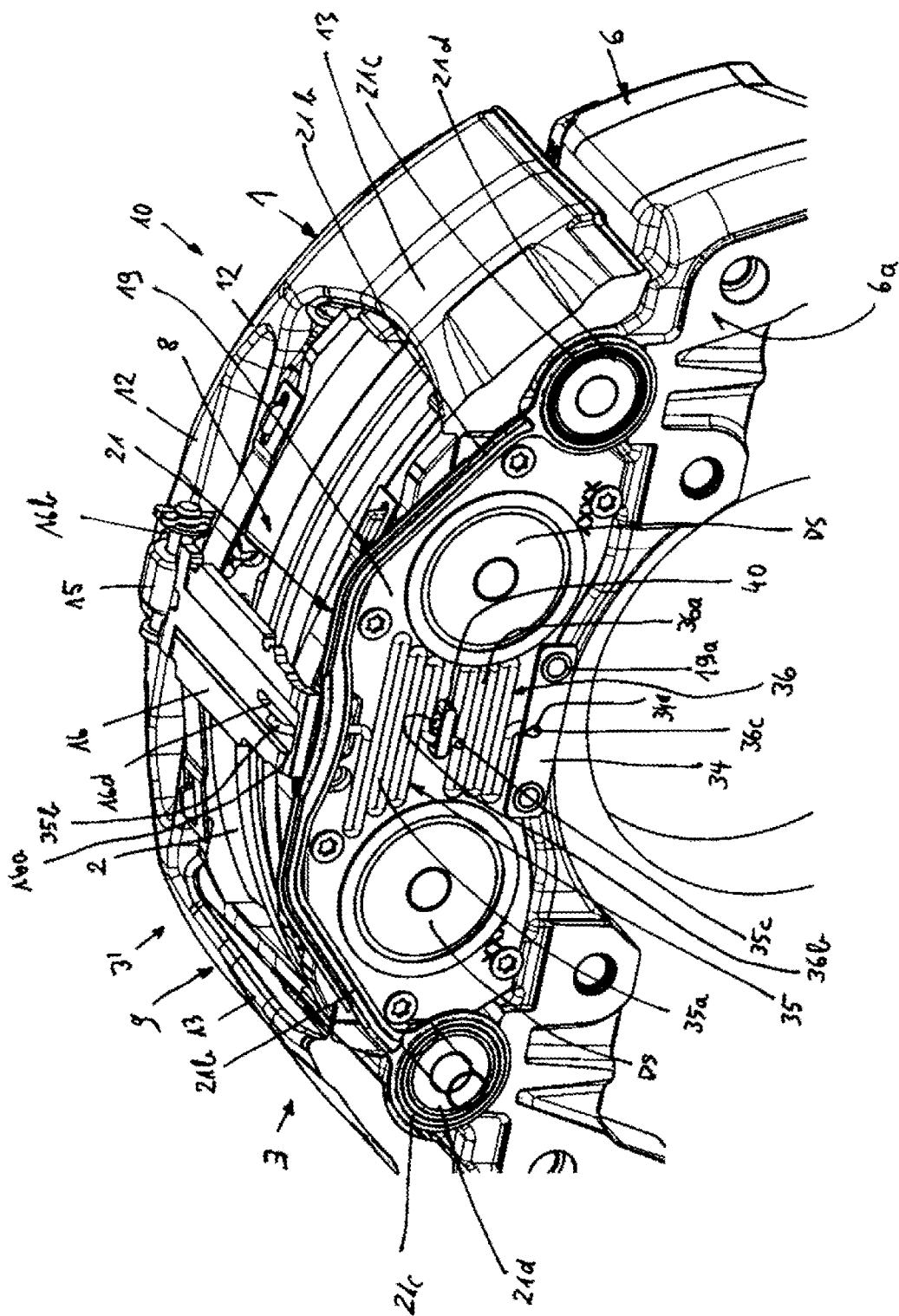
Figure 26:
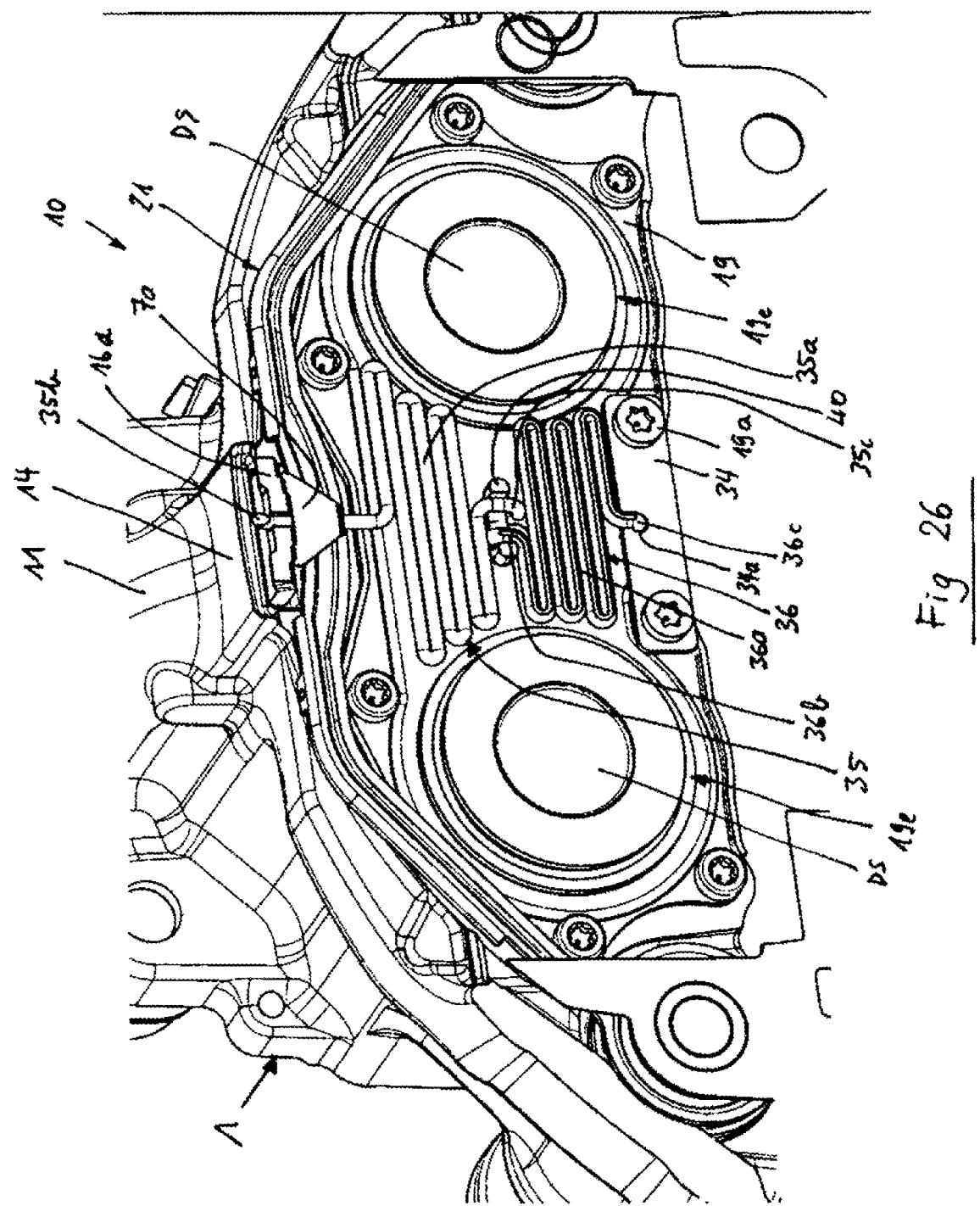

The version as per FIG. 25 corresponds to the embodiment as per FIG. 24, but with the difference that the upper spring end 35*b* of the upper spring unit 35 is hooked into a slot 16*d* of the pad retaining stirrup 16. The upper retaining plate 33 is therefore not present. This installation situation is shown on an enlarged scale in a further illustration in FIG. 26.

Figure 27:
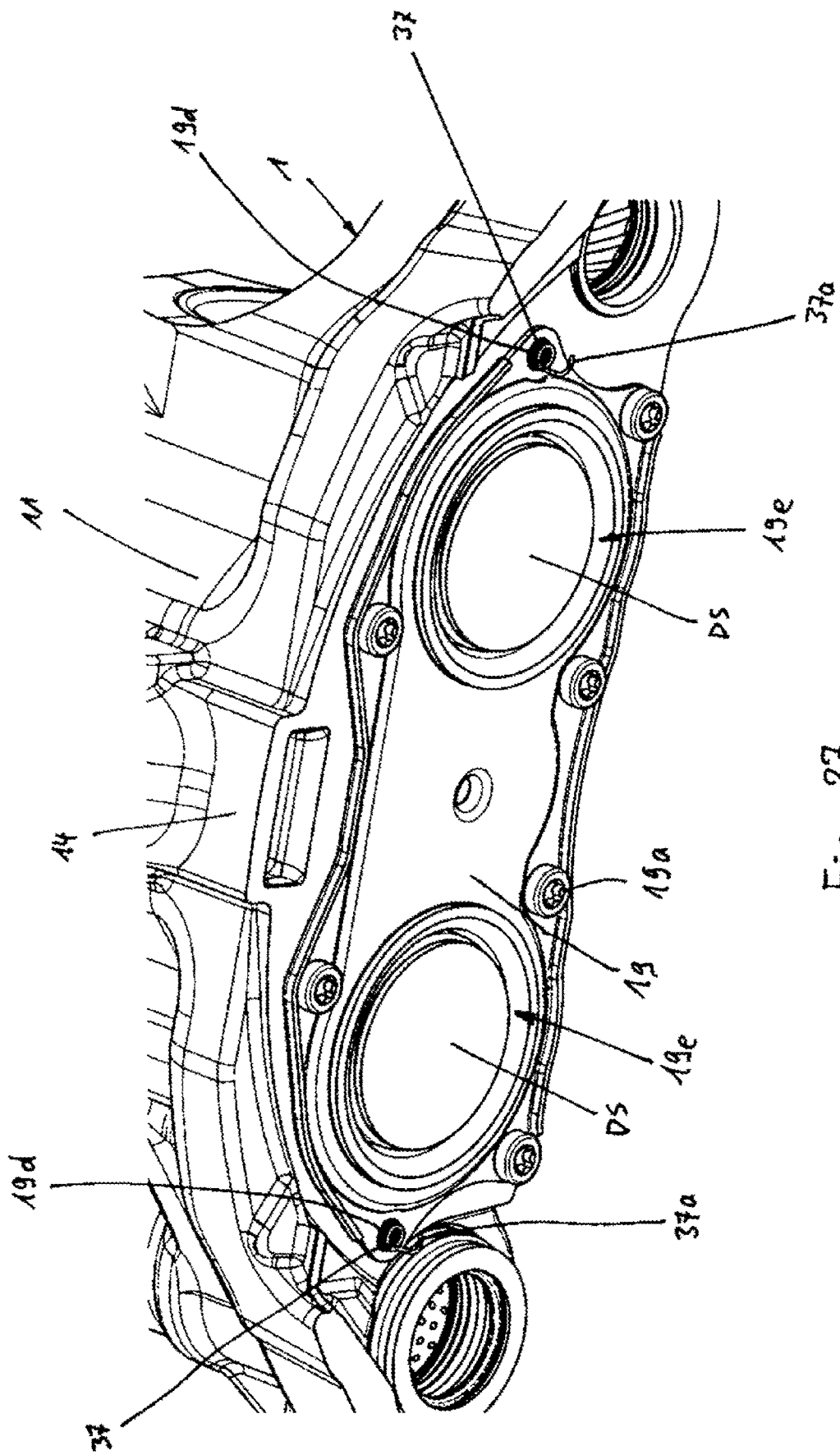
Figure 28:
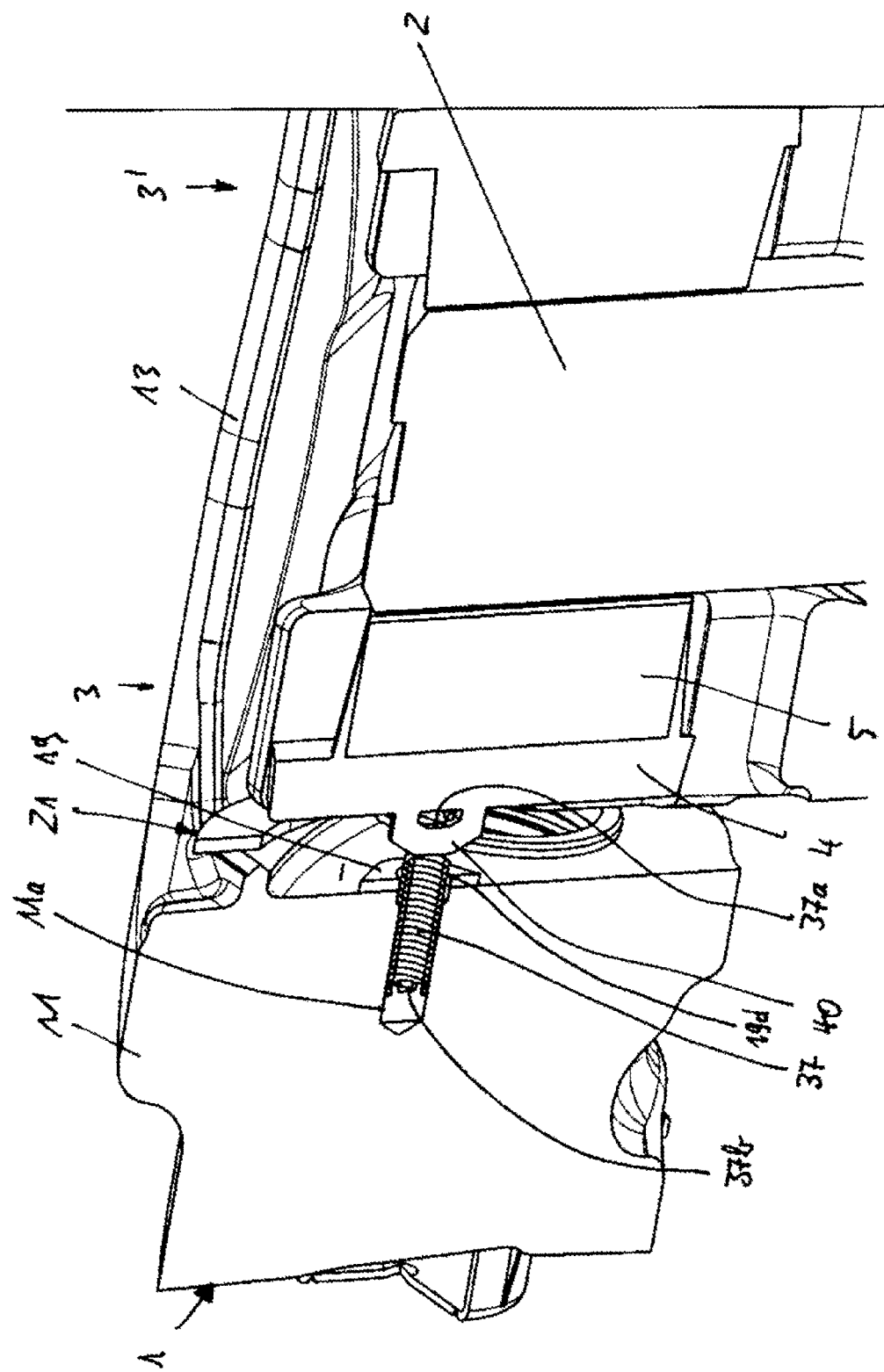

FIGS. 27 and 28 show a further variant of resetting elements 37 of the application-side brake pad 3 in the form of tension springs 37, wherein FIG. 27 shows a plan view of the base plate 19, and FIG. 28 illustrates a vertical section in the region of one of the tension springs 37.

The tension springs 37 are in each case received in a bore 11a in the application section 11 of the brake caliper 1 and fixed with one spring end 37b in the bore 11a. The other spring ends 37a protrude in each case out of the bores 11a through the base plate 19 and engage in retaining sections 40 arranged laterally on the thrust side 4b of the pad carrier plate 4. In the embodiment shown, the bores 11a are existing fastening bores for fastening elements 19a of the base plate 19.

Figure 29:
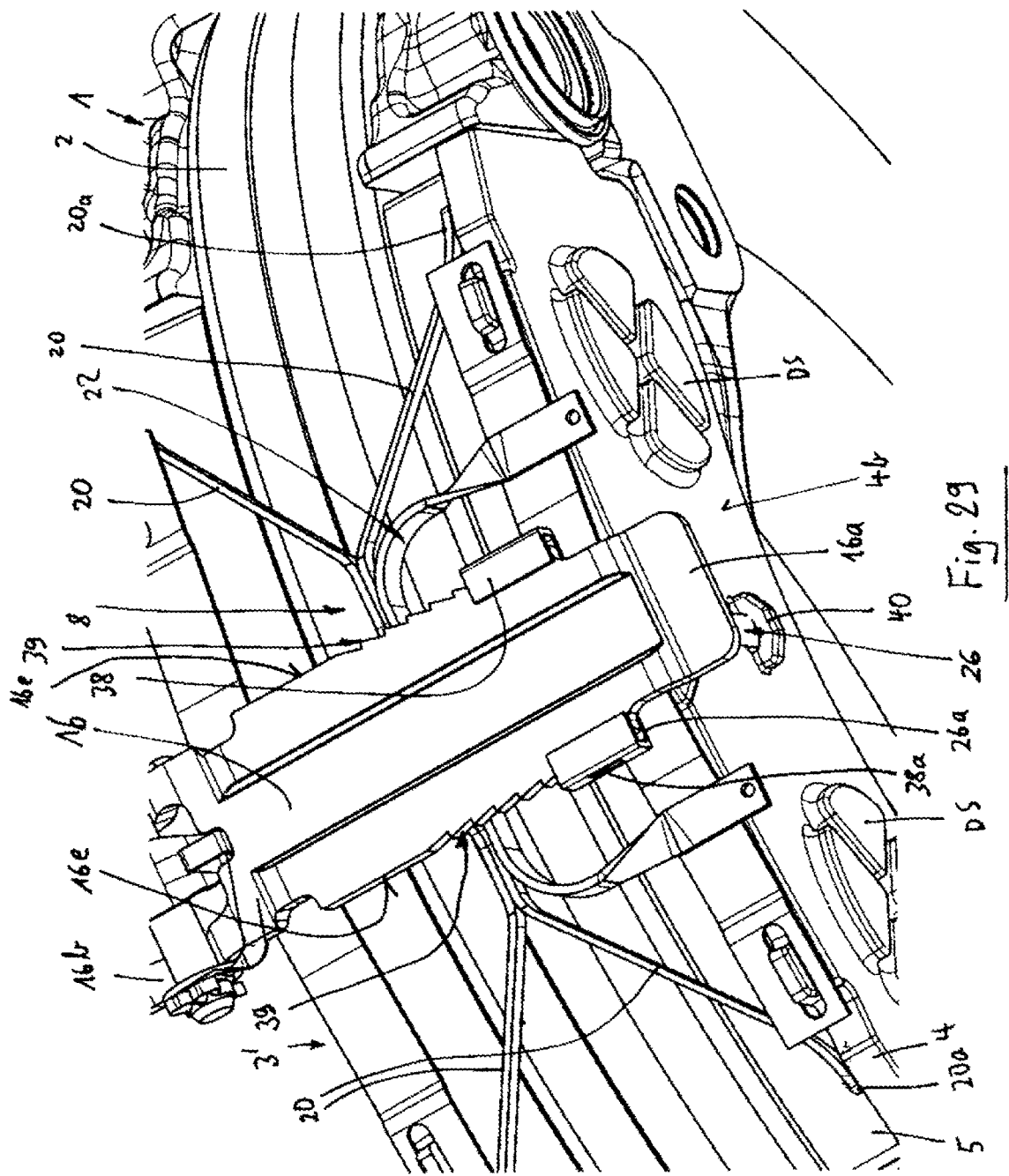
FIGS. 29-37 show perspective views of self-adjusting resetting elements of the second function group of the resetting device as per FIGS. 7-13.
Figure 30:
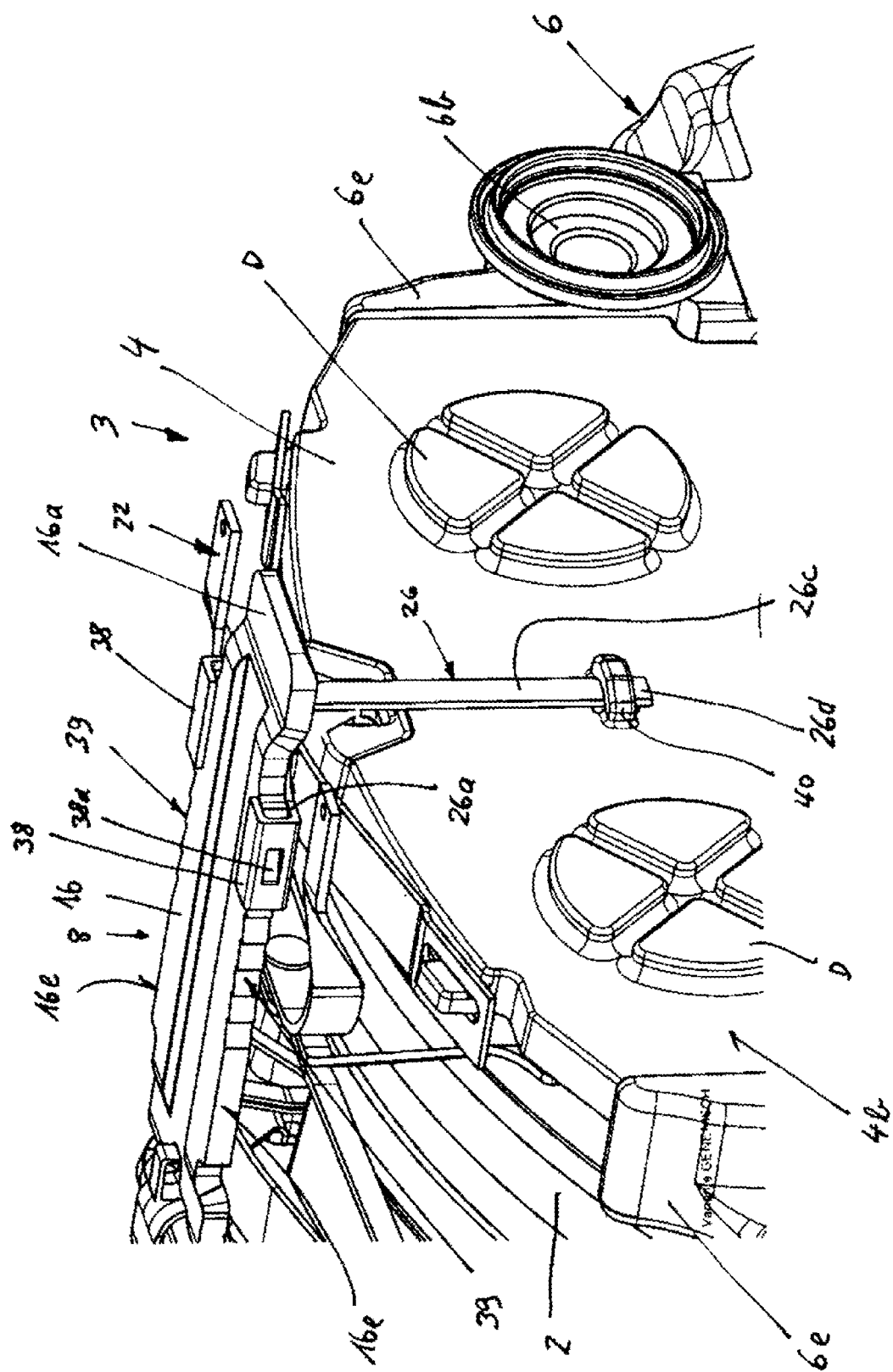
Figure 31:
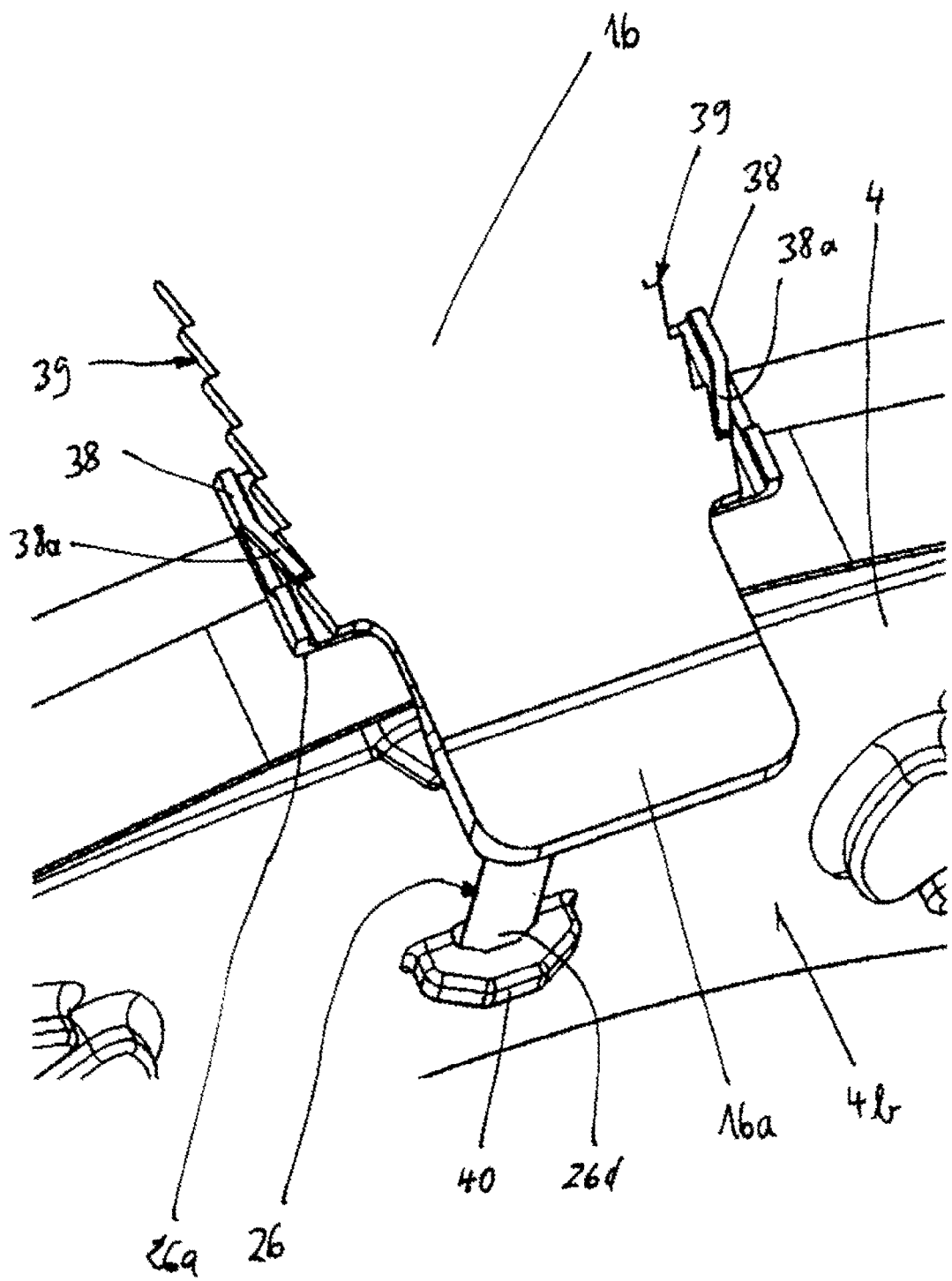
Figure 32:
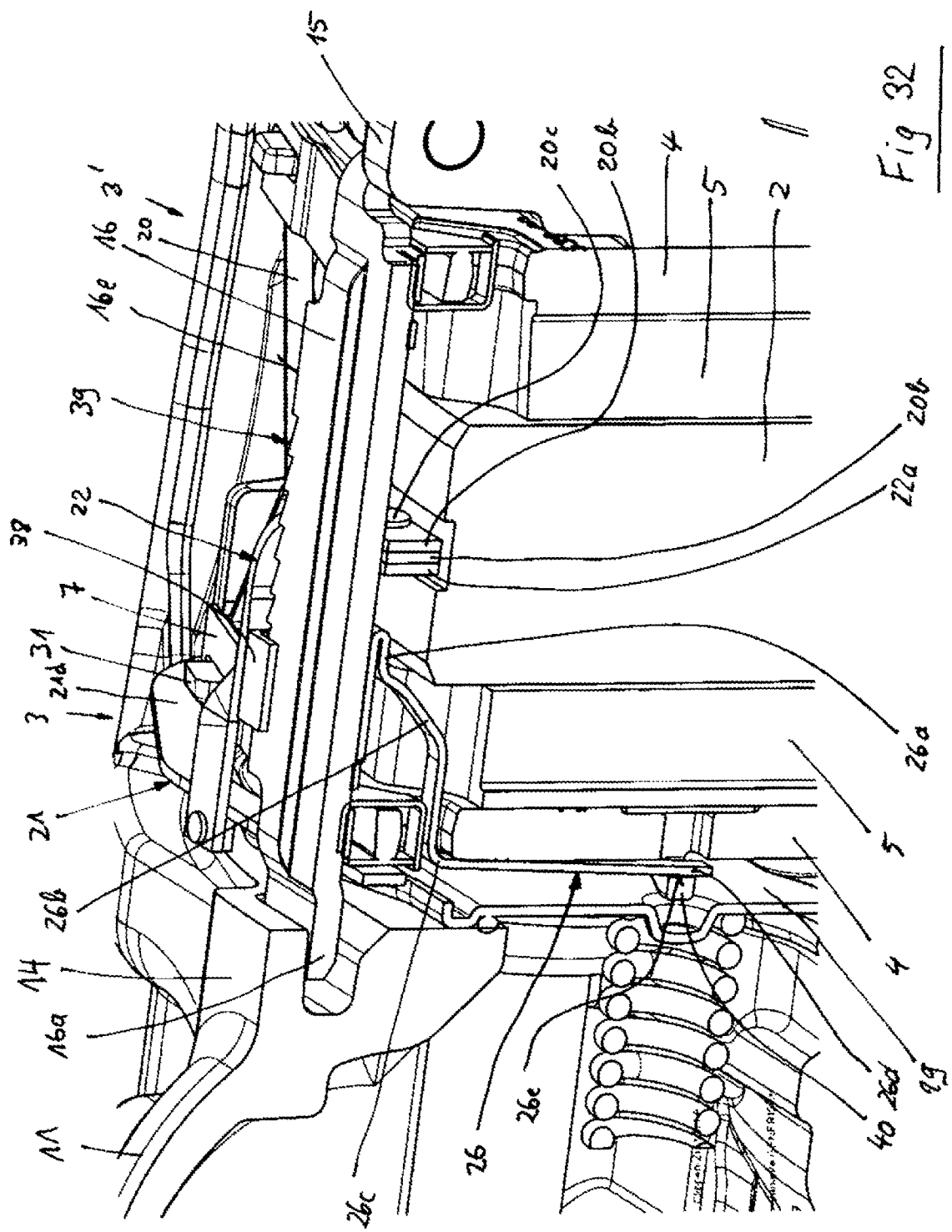
Figure 33:
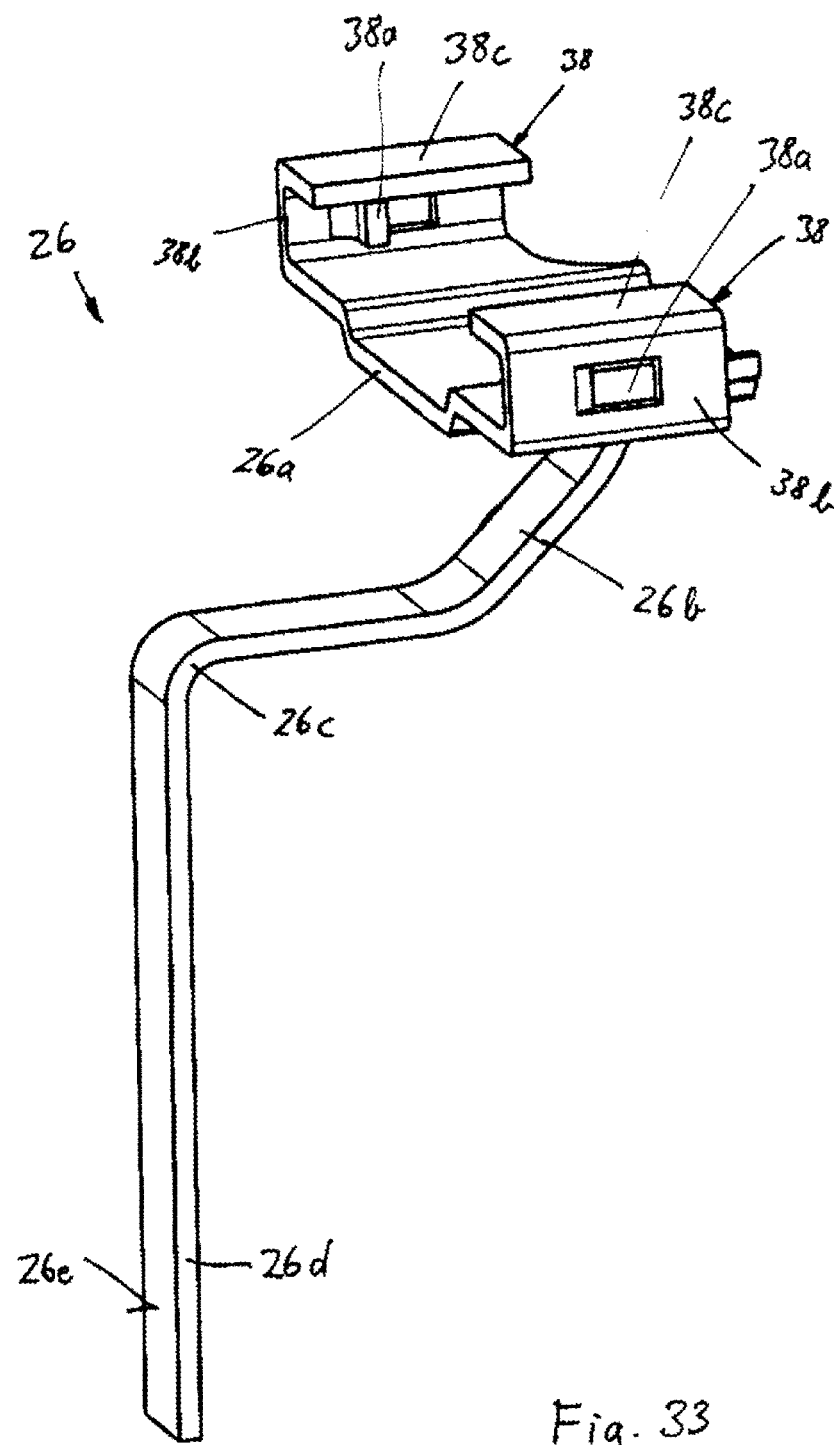
Figure 34:
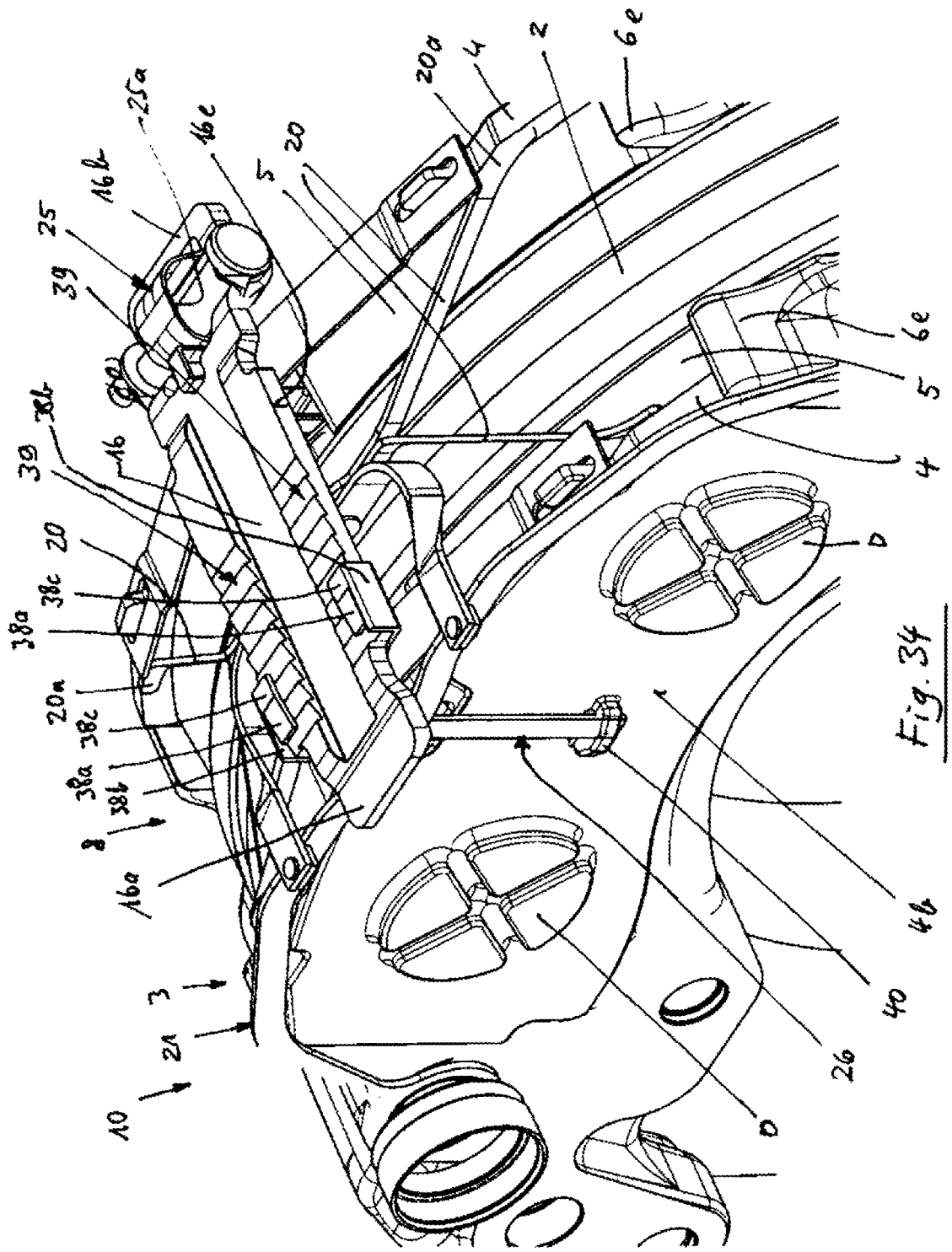
Figure 35:
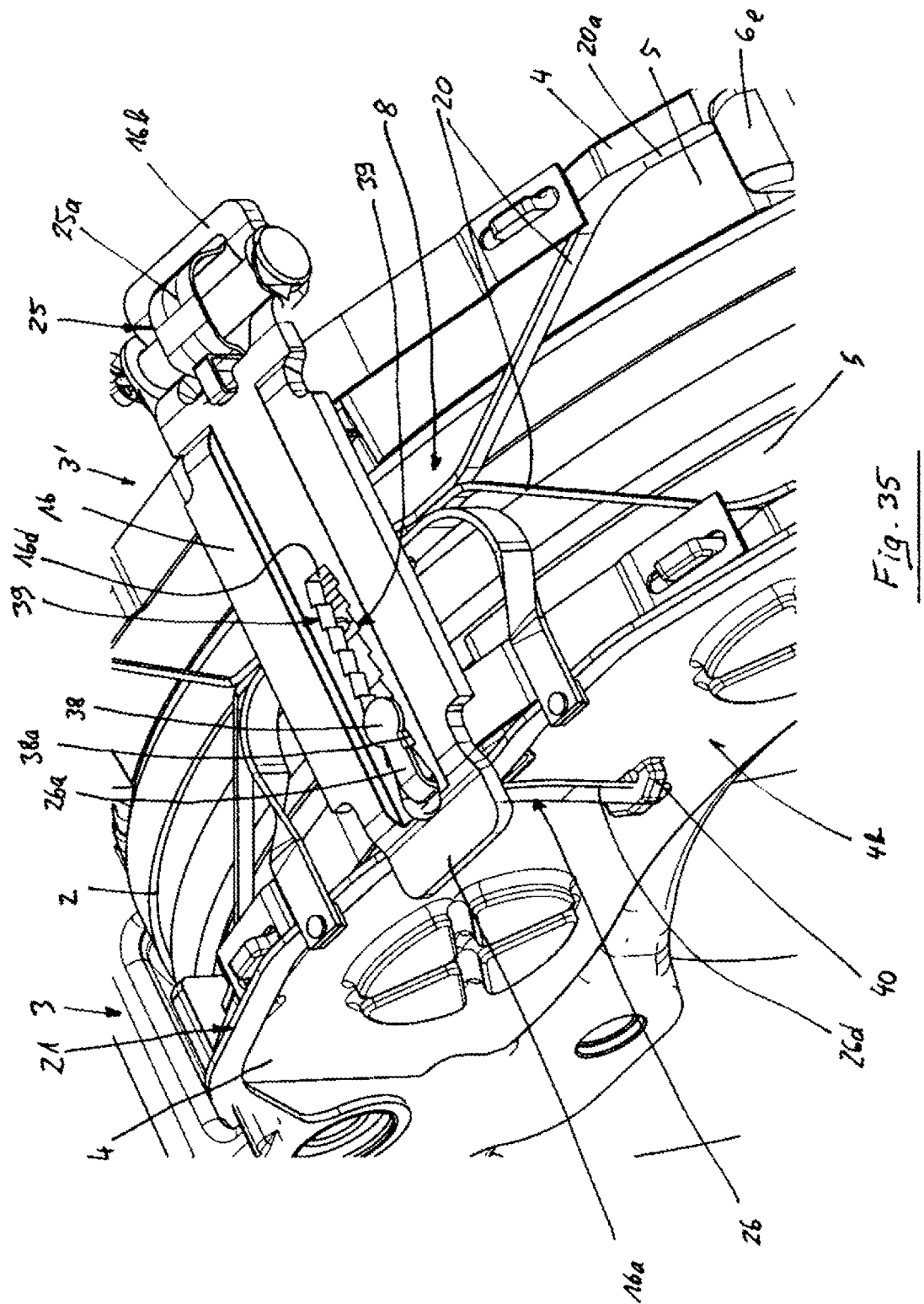
Figure 36:
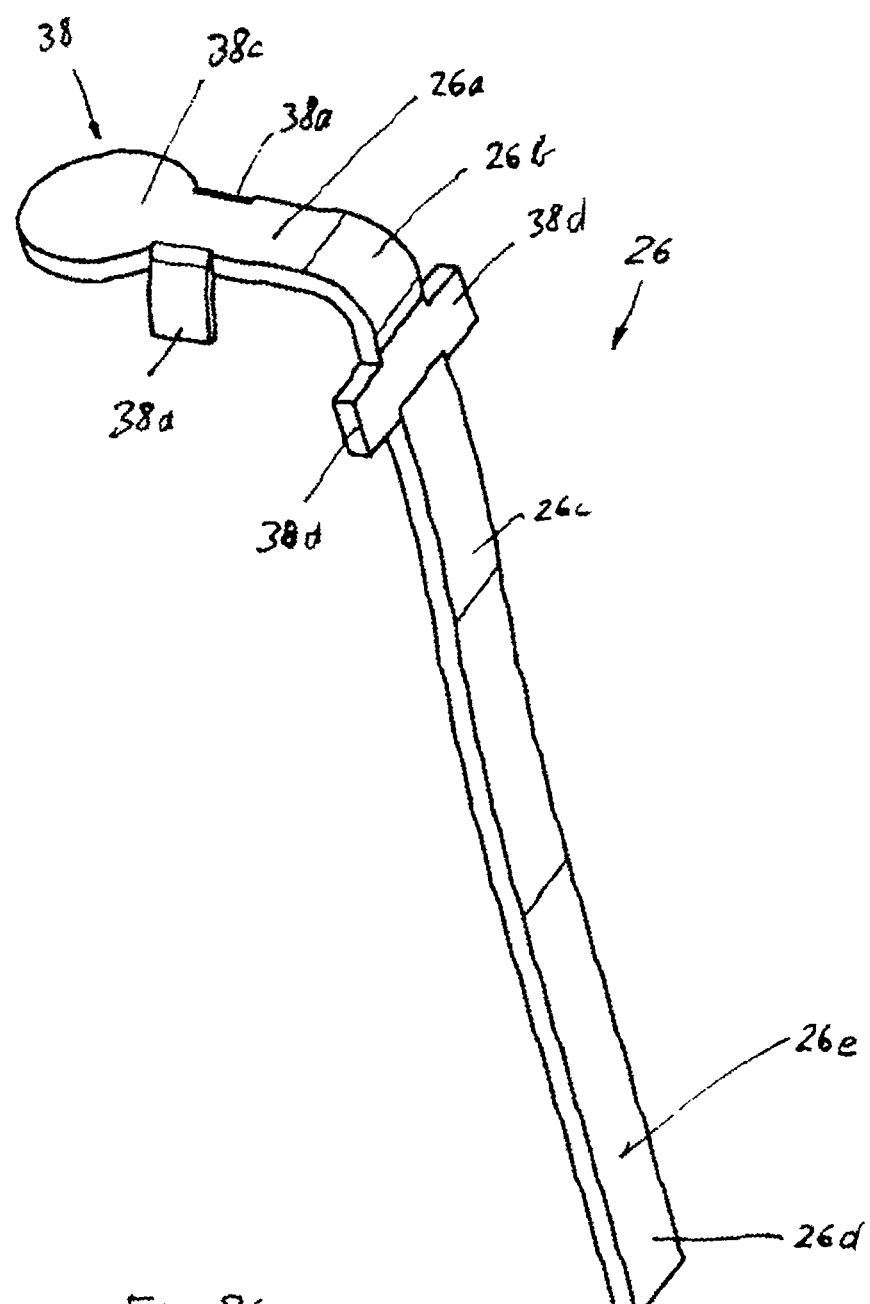
Figure 37:
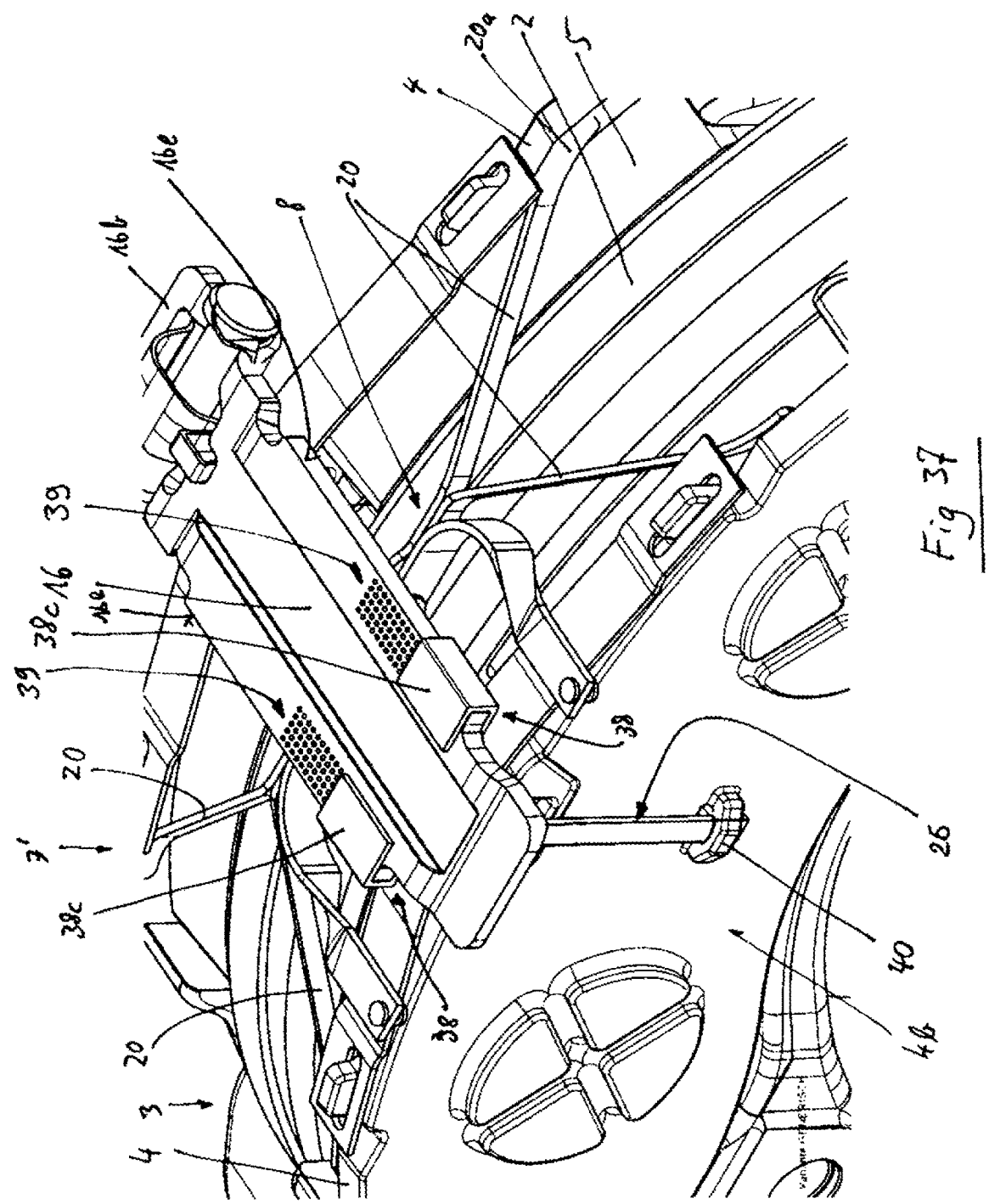

FIGS. 29-37 illustrate perspective views of self-adjusting resetting elements 26 of the second function group of the resetting device as per FIGS. 7-13. FIGS. 29 and 30 show a first self-adjusting resetting element 26 in perspective views, wherein FIG. 31 illustrates a horizontal section through a detent device 38. In this regard, FIG. 32 shows a further section in a longitudinal direction of the pad retaining stirrup 16. FIG. 33 illustrates the self-adjusting resetting element 26 in a perspective view. A further self-adjusting resetting element 26 is shown in a perspective view in the installed state in FIG. 35, wherein FIG. 36 shows a perspective view of the resetting element itself. FIG. 37 shows a variant in a perspective plan view.

To prevent a residual rubbing torque, a spring is used as resetting element 26, which moves the thrust-piece-side, that is to say application-side, brake pad 3 in the direction of the thrust pieces or of the application section 11. The resetting element 26 engages for example on an eyelet of the retaining section 40 on the thrust side 4b of the pad carrier plate 4 and is designed so as to impart the required restoring force for moving the brake pad 3 away from the brake disc 2.

The functionality must ideally be ensured over the entire wear travel of the brake pad 3, and therefore the resetting element 26 may deform only elastically even at maximum deflection.

For this purpose, the resetting element 26 is in this case designed such that, with increasing wear, it automatically moves with the brake pad 3 in the direction of the brake disc 2, that is to say in the direction of the brake disc axis of rotation 2. The very high stresses that arise in the event of intense spring deflection can thereby be avoided.

The resetting element 26 is mounted with the fastening section 26a, which is equipped with a detent device 38, on the pad retaining stirrup 16. The pad retaining stirrup 26 has, in each case laterally, that is to say on at least one side surface 16e, a detent section 39 with a toothing into which two spring arms as detent tongues 38a of the detent device 38 engage. This is illustrated on an enlarged scale in FIG. 31. The two detent tongues 38a are designed such that, in the event of a considerable exceedance of a pad resetting force, they "slip" over the next tooth and subsequently engage with a wedging action again.

The detent device 38 is formed with in each case one vertical side plate 38b on the edge of the plate-like fastening section 26a, which in this case has a central recess. This is clearly illustrated in FIG. 33. At least one detent tongue 38a is provided in each side plate 38b. A horizontal guide plate 38c is attached to the upper edge of each side plate 38b. The resetting element 26 can thus be pushed onto the pad retaining stirrup 16 in the longitudinal direction thereof, as shown for example in FIGS. 29-30. Here, the pad retaining stirrup 16 is received between the plate-like fastening section 26a and the horizontal guide plates 38c parallel thereto.

The embodiment as per FIG. 34 differs from that of FIGS. 29-33 in that the detent device 39 is formed in on the top side of the lateral regions of the pad retaining stirrup 16, wherein the detent tongues 38a are arranged in the guide plates 38c.

FIG. 35 shows a variant of the detent device 38 of the resetting element 26, and FIG. 36 shows the resetting element. The detent section 39 is a slot 16d formed centrally in the longitudinal direction of the pad retaining stirrup 16 with a toothing on both sides. At the application-side end of the slot 16d, there is formed a widened portion for the threading-in of the detent device 38 of the resetting element 26.

The fastening section 26a of the resetting element 26 is equipped on its end with an in this case circular guide plate 38c. In each case one obliquely downwardly bent detent tongue 38a is attached laterally to the end of the fastening section 26a. A widened portion 38d is formed on both sides on the upper end of the spring arm 26c. The pad retaining stirrup 16 is received between said widened portion 38d and the guide plate 38c.

The detent section 39 in the version as per FIG. 37 is formed on the top side of the pad retaining stirrup 16 in the form of studs, and the detent device 38 is designed correspondingly thereto below the guide plates 38c.

FIGS. 38 and 39 show a variant of a rear-side resetting element 41, which is attached on both sides to the rear-side retaining end 16b of the pad retaining stirrup 16. Below, only one side of the resetting element 41 will be described; this self-evidently also applies in mirror-inverted form to the other side. The resetting element 41 has in each case one clamping end 41a on a relatively horizontal spring arm 41b. Here, the expression "horizontally" means tangentially relative to the brake disc 2. The spring arm 41b is fastened by way of the clamping end 41a to the rear-side retaining end 16b of the pad retaining stirrup. The other end of the spring arm 41b is bent downward through 90° and is formed as a vertical lever arm 41c, which engages by way of an outwardly bent spring end 41d with a lateral retaining section 40 on the thrust side 4b of the rear-side pad carrier plate 4, as can be seen in FIG. 39.

FIGS. 40 to 48 show perspective views of connections of resetting elements of the second function group to brake pads 3, 3'.

In the case of the brake pads 3, 3', on the respective thrust side 4b, the retaining section 40 is provided for the engagement of the resetting element 23, 24, 25, 26. Said retaining section forms an eyelet, for example by means of a stirrup shape. Production of the pad rear plate 4 in a casting mold would, owing to the vertical position, necessitate a casting process with a core or additional finish machining, which in both cases entails additional costs.

With the embodiment of the retaining section 40 shown in FIGS. 40-44, said retaining section can be easily produced by casting in conjunction with the pad carrier plate 4, without a core or finish machining.

Figure 40:
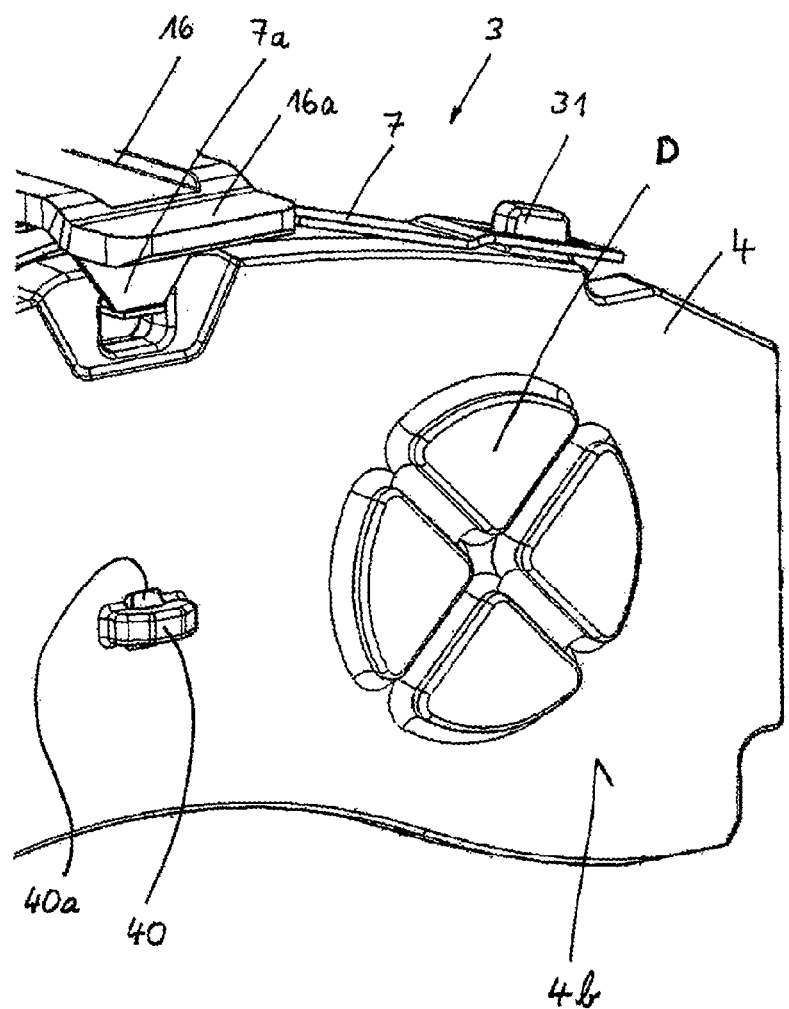
FIGS. 40-48 show perspective views of connections of resetting elements of the second function group to brake pads.
Figure 41:
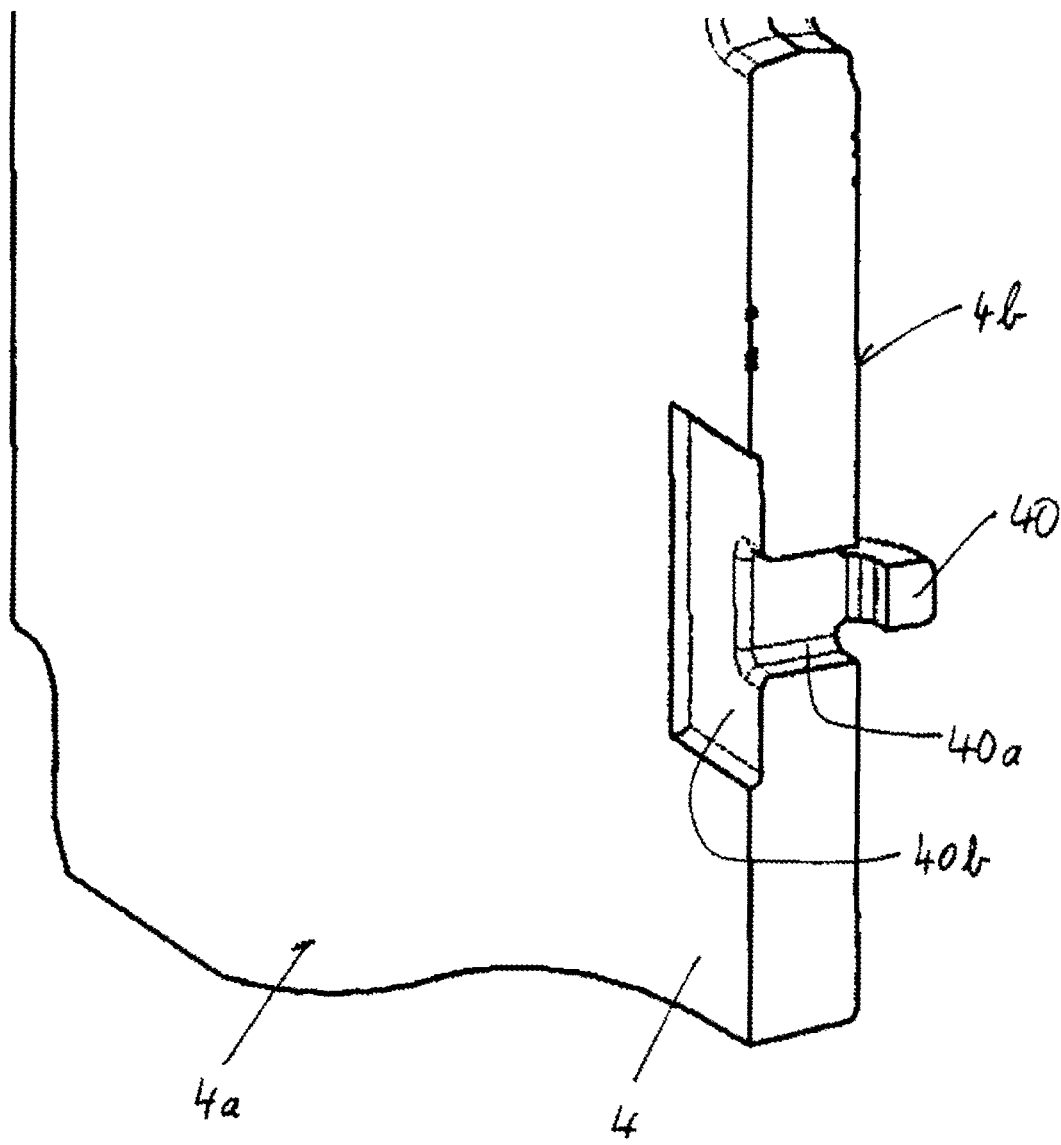
Figure 42:
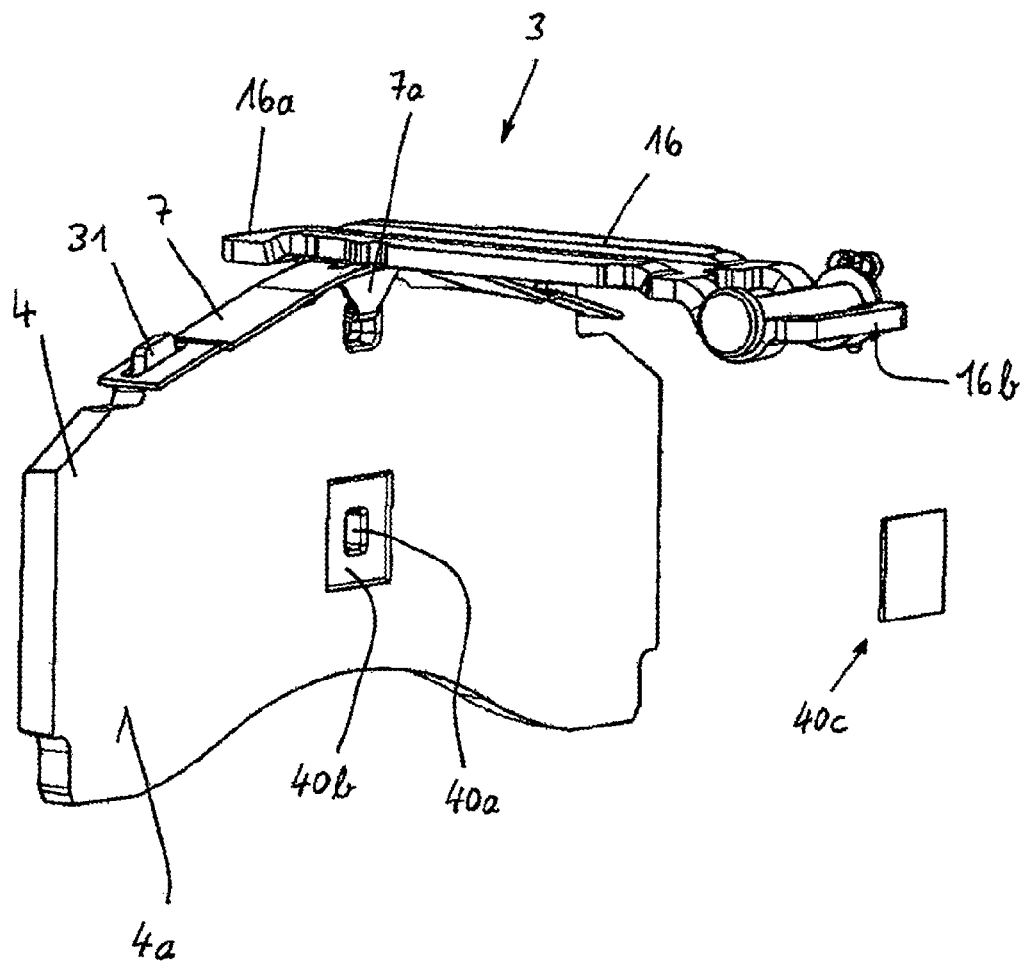
Figure 43:
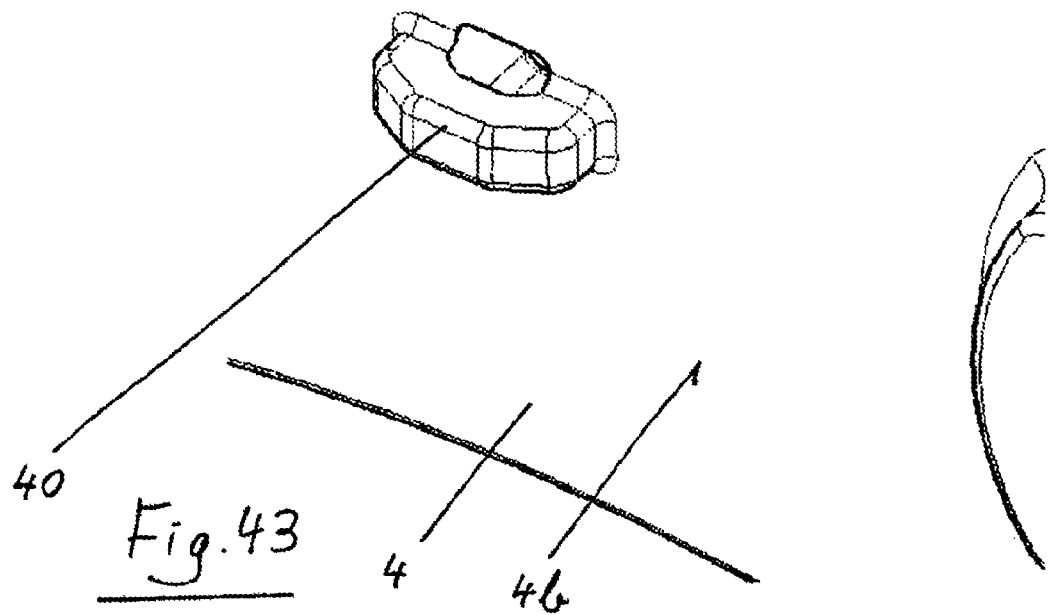

FIG. 40 illustrates the retaining section 40 as a stirrup on the thrust side 4b of the application-side pad carrier plate 4. No undercuts are provided. An opening 40a is provided under the retaining section 40 in the pad carrier plate 4. An additional, in this case square, recess 40b is jointly formed on the pad side 4a during the casting process. Said recess 40b is shown in a sectional illustration in FIG. 41. Before the friction pad 5 is pressed onto the pad side 4a of the pad carrier plate 4, a plate 40c corresponding to the recess 40b is inserted into the recess (FIG. 42) and is aligned flush with the surface of the pad side 4a. The plate 40c prevents the pad compound from penetrating through the opening 40a during the pressing and baking of the friction pad 5.

A minimum wall thickness, for example 4 mm, must be ensured in the case of the stirrup-like retaining section 40 as eyelet (FIG. 43), because the casting material could otherwise, during the production of the pad carrier plate 4 by casting, at this point have a so-called cold shut and thus become unstable.

Figure 44:
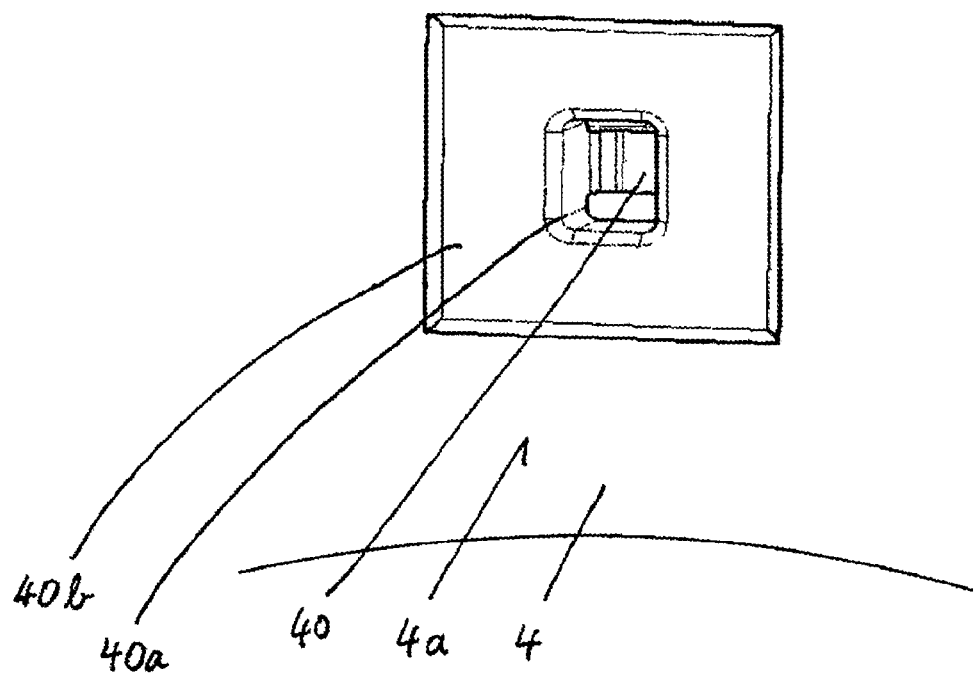

FIG. 44 shows, in an enlarged illustration, a view of the pad side 4a of the pad carrier plate 4 with the recess 40b, the opening 40a and the stirrup-like retaining section 40 before the insertion of the plate 40c.

Figure 45:
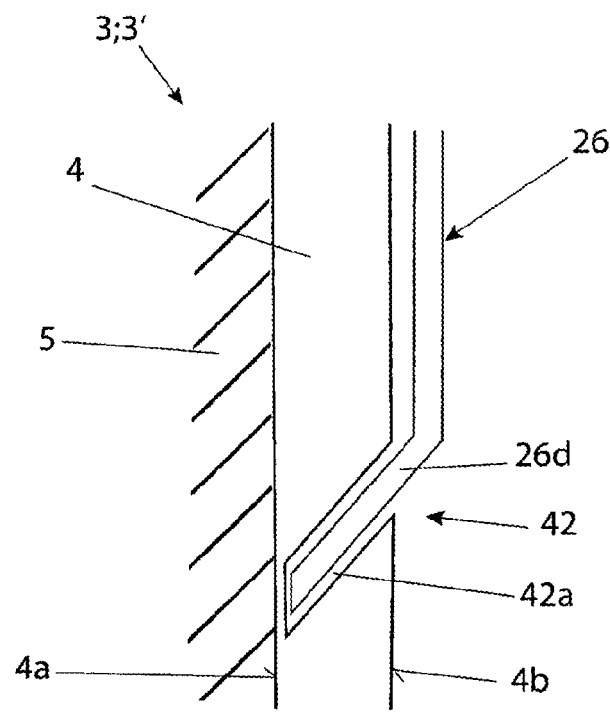
Figure 46:
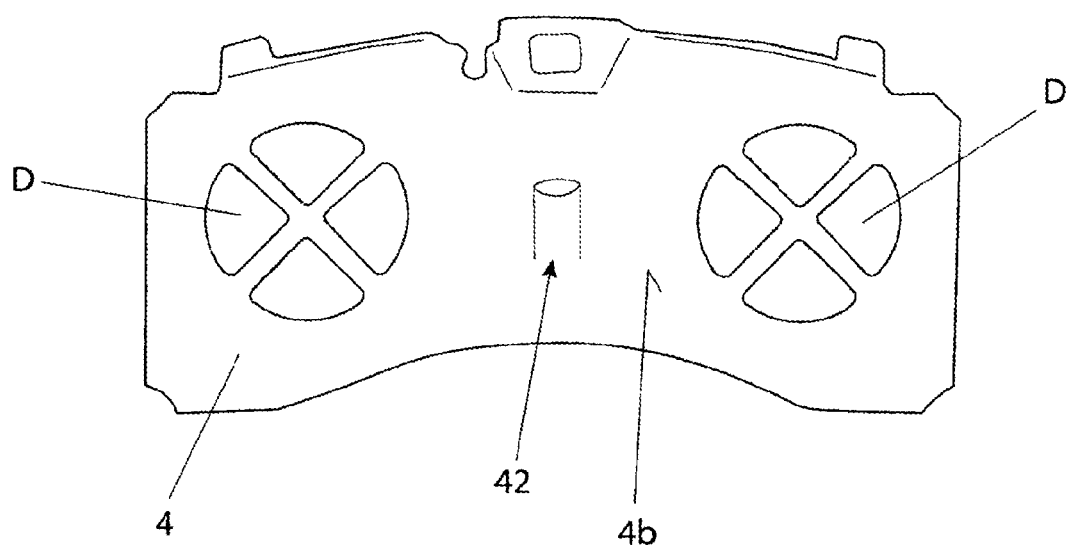

Further possibilities for the fastening or articulation of the resetting elements 23, 24, 25, 26 on the pad carrier plate 4 are shown in FIGS. 45 to 48. FIGS. 45 and 46 show a connection 42 which has an oblique connecting section 42a which is formed into the pad carrier plate 4 from the thrust side 4b. This may for example be a bore which runs in obliquely.

Figure 47:
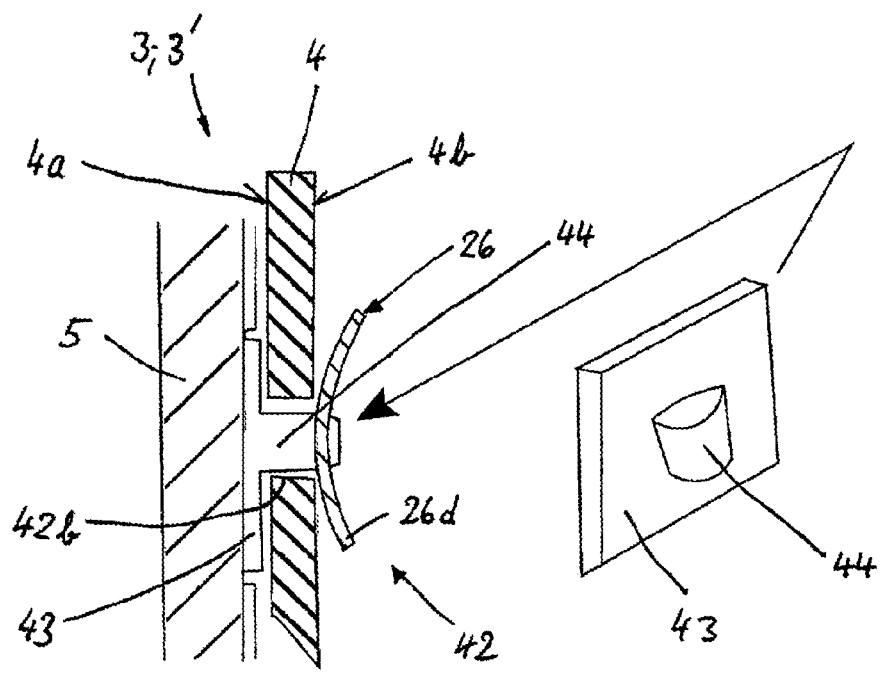

In FIG. 47, the pad carrier plate 4 has a passage opening 42b. A retaining plate 43 with an eyelet 44 protruding from the retaining plate 43 is arranged on the pad side 4a in the region of the opening 42a such that the eyelet 44 protrudes through the opening 42a on the thrust side 4b and forms a connection 42, for example for the thrust section 26d of the resetting element 26. Here, the retaining plate 43 is fixed between the friction pad 5 and the pad side 4a of the pad carrier plate 4. It is also possible for the retaining plate 43, like the plate 40c, to be inserted into a corresponding recess as per FIGS. 40 and 41.

Figure 48:
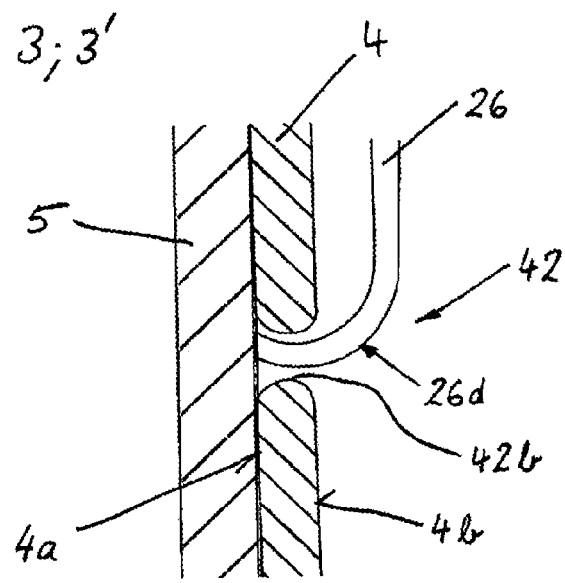

In the embodiment as per FIG. 48, an opening 42b to a shaped correspondingly thrust section 26d of the resetting element 26 (to be regarded merely as an example) is formed into the pad carrier plate 4 from the thrust side 4b. The opening 42b forms the connection 42 to the resetting element, for example resetting element 26.

FIGS. 49 to 56 illustrate views of a further function group of the resetting device.

Figure 49:
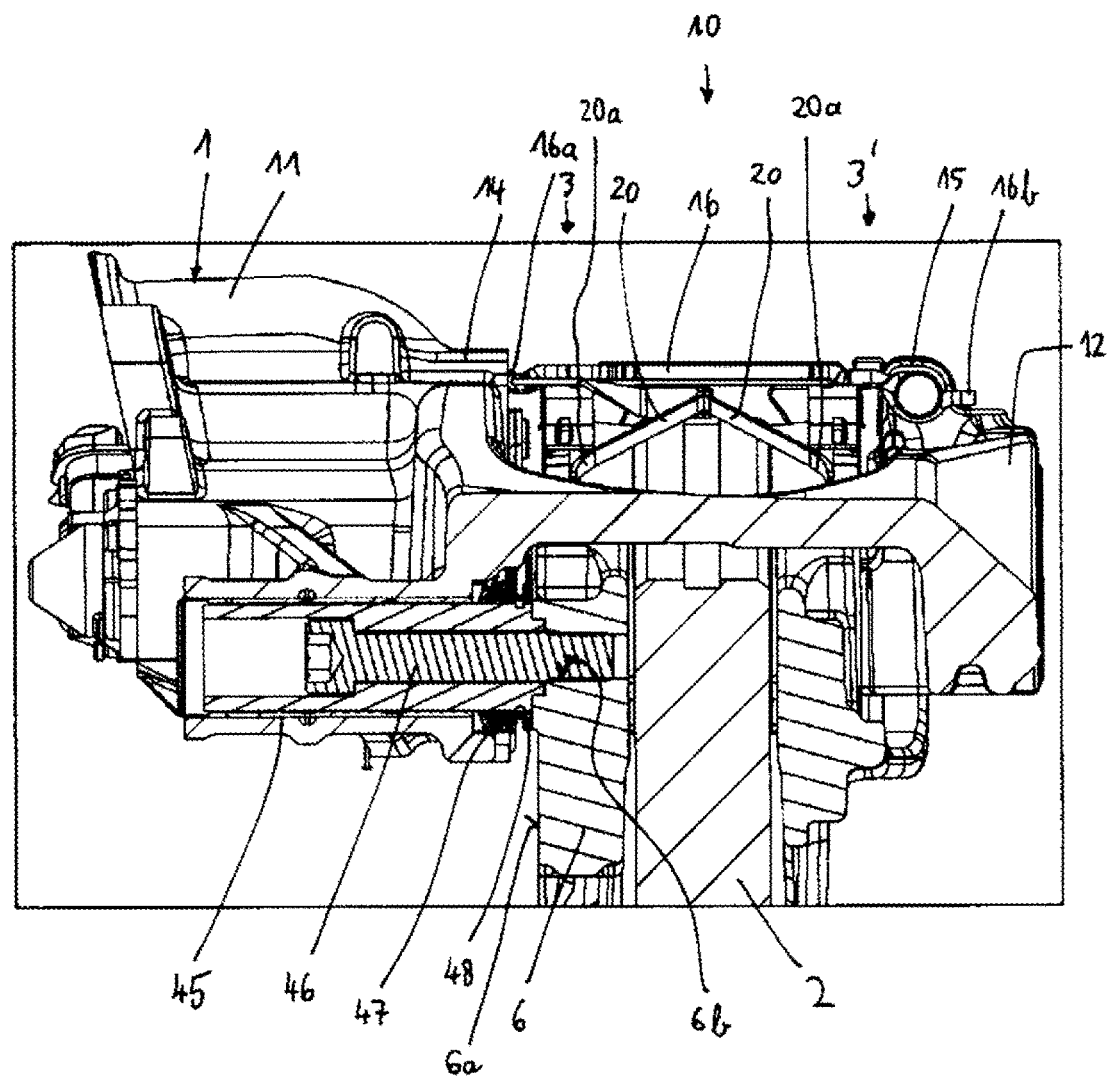
FIGS. 49-54 show views of a further function group of the resetting device.
Figure 50:
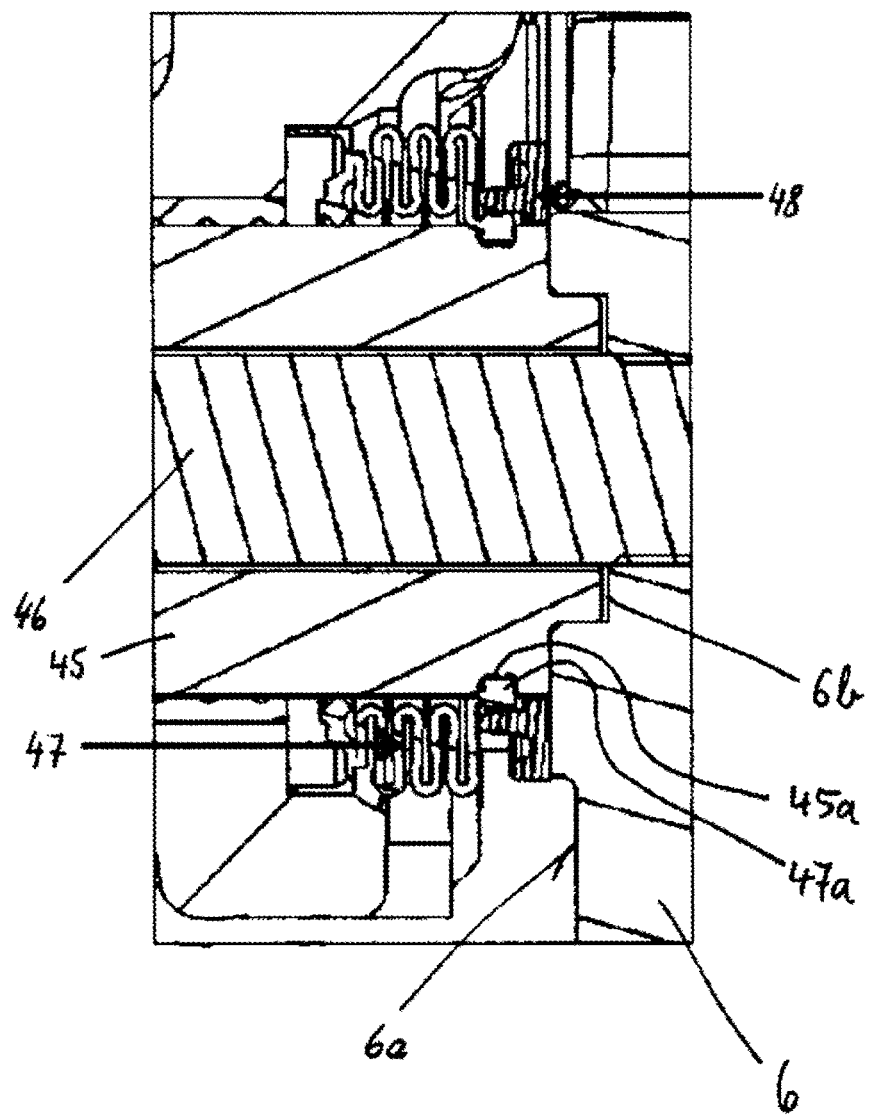

FIG. 49 shows a sectional view of a disc brake 10 with a corrugated bellows 47 fixed in series between brake caliper 6 and bearing beam 45. FIG. 50 shows an enlarged illustration of the fixing of the corrugated bellows 47.

In the case of disc brakes for commercial vehicles, the corrugated bellows 47, which act as a flexible seal between brake caliper 6 and bearing beam 45, are normally fixed in an encircling groove 45a in the bearing beam 45. As an additional means for securing the corrugated bellows 47, in particular a collar 47a of the corrugated bellows 47, in the groove 45a, a securing ring 48 composed of plastic is installed, which ensures that the corrugated bellows 47 does not move out of the groove 45a.

Figure 51:
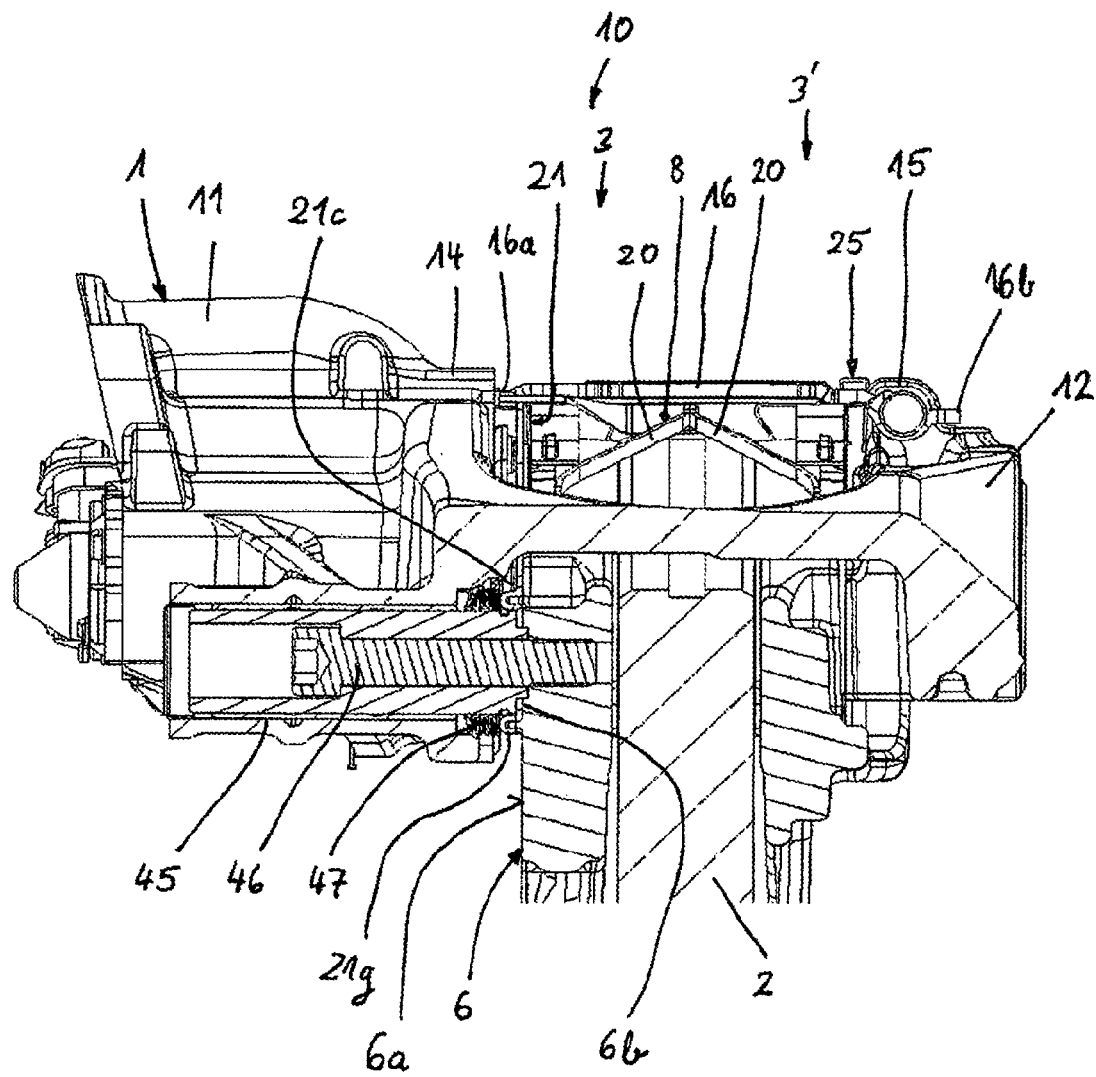
Figure 52:
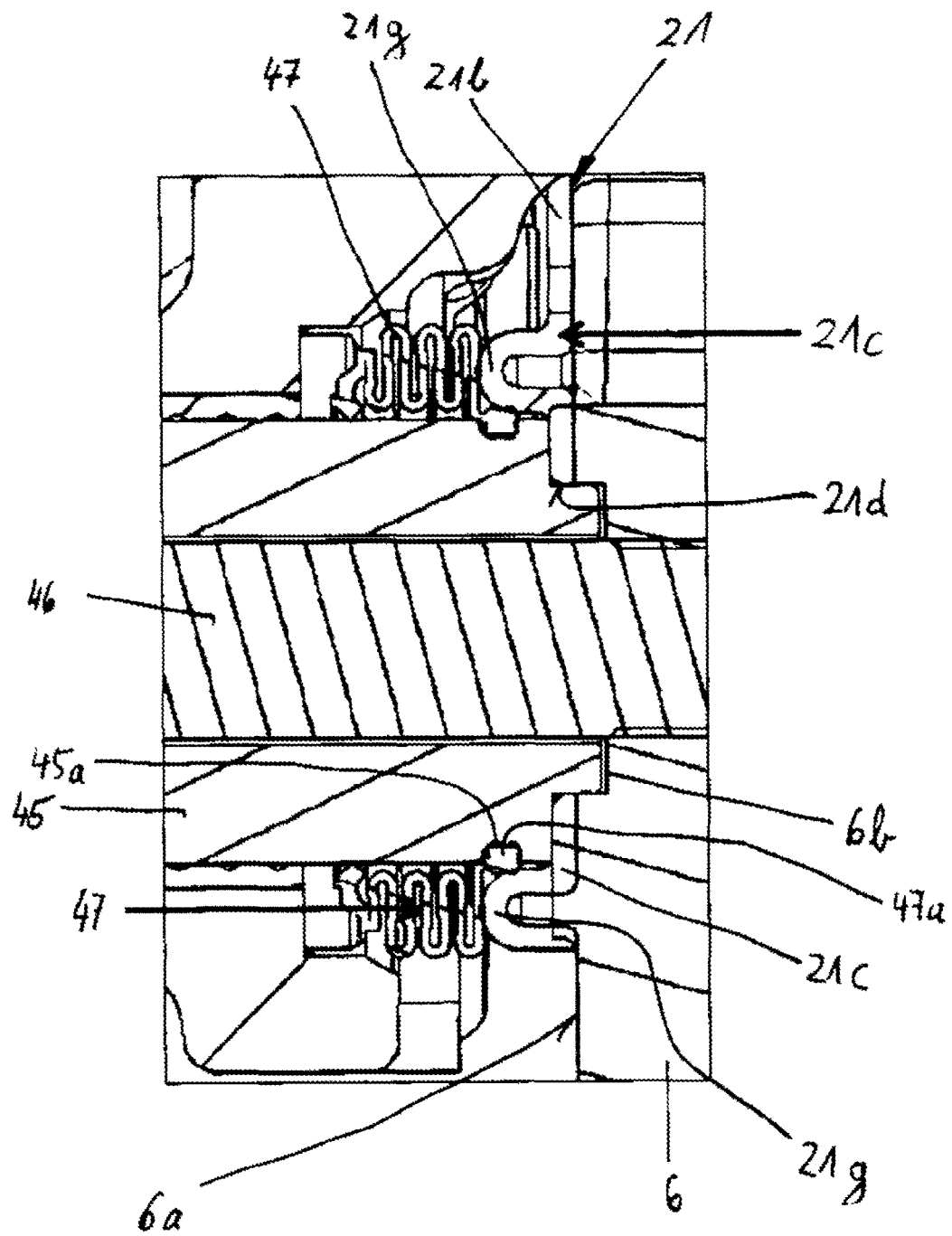
Figure 53:
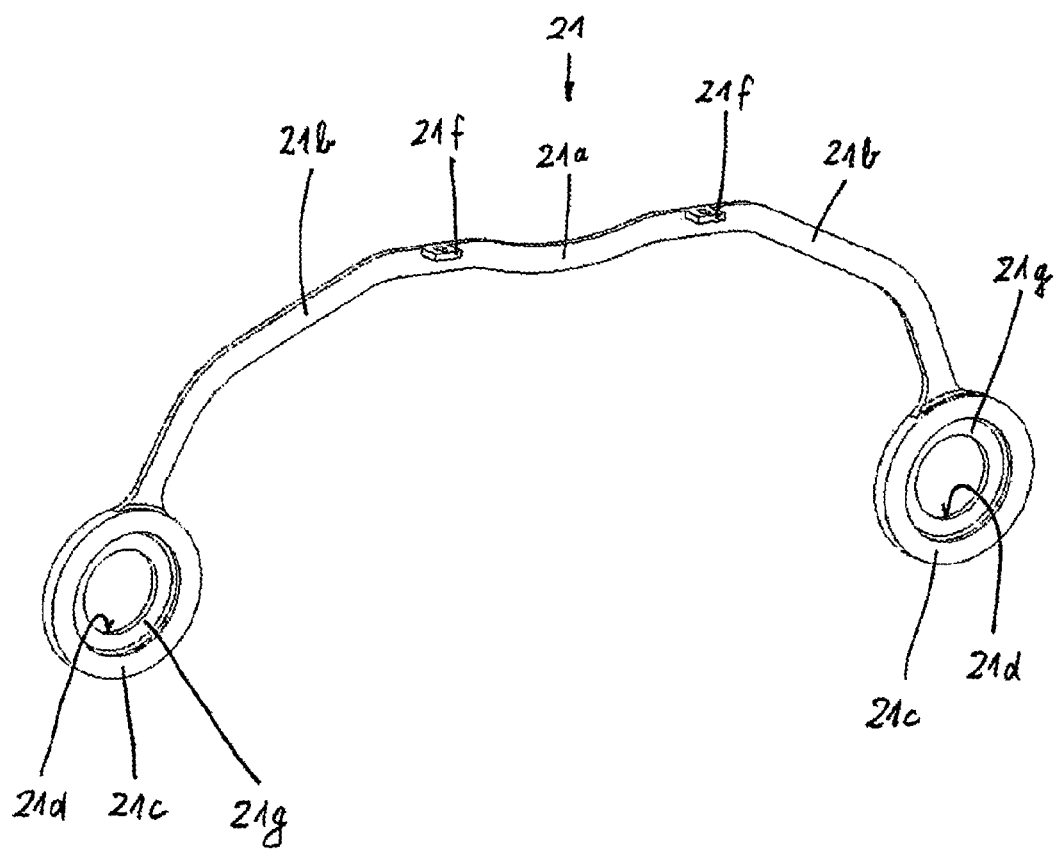
Figure 54:
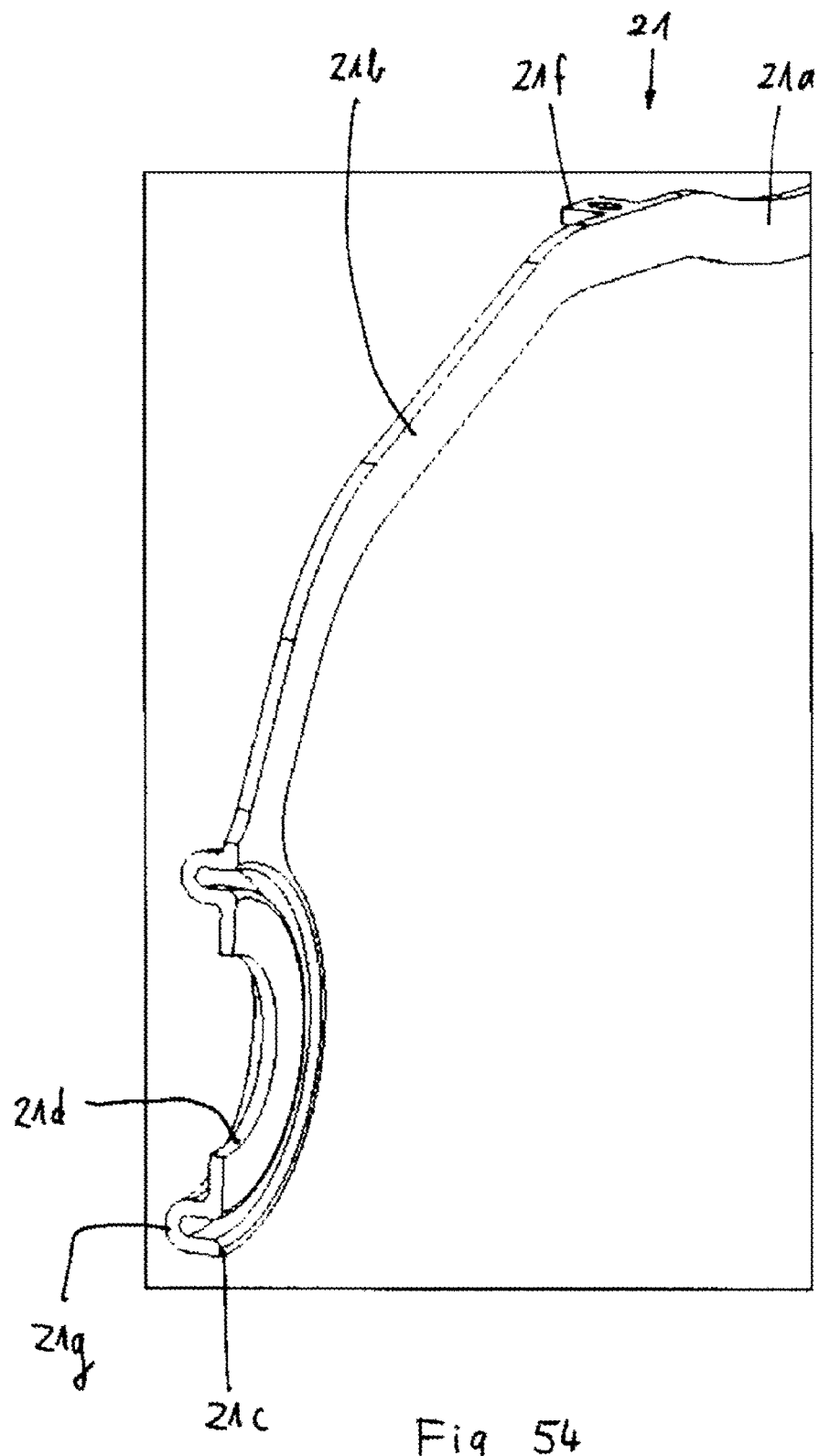

FIG. 51 shows a sectional view of a disc brake 10 with a corrugated bellows 47 fixed between brake caliper 6 and bearing beam 45 by means of the retaining bow 21 of the resetting device. FIG. 52 shows an enlarged illustration of the fixing of the corrugated bellows 47. FIG. 53 shows the retaining bow in a perspective illustration. FIG. 54 illustrates an enlarged view of a fastening section 21c of the retaining bow 21.

The retaining bow 21 is, as already mentioned above, arranged with its fastening sections 21c and the openings 21d coaxially with respect to the bearing receptacles 6b for the fastening of the bearing beams 45 by way of fastening elements 46 between the bearing beams 45 and the fastening side 6a of the brake carrier 6. The openings 21d of the fastening sections 21c are formed in each case with a fold section 21g. In the installed state, the fold section 21g protrudes in each case from the fastening section 21c into the bearing beam 45, such that the respective fold section 21g lies over the associated collar 47a of the corrugated bellows 47 and secures the latter in the groove 45a. The conventional securing ring 48 is thus omitted.

The resetting device with the spreading device 8 and the retaining bow 21 may also be installed as a retrofit part into a disc brake 10, for example during pad changes and/or maintenance. This is easily possible because the retaining bow 21 with the spreading device 8 as per FIG. 3 merely has to be retroactively inserted, without modifications having to be made.

For retroactive installation of the spreading device 8 with resetting elements, for example as per FIG. 3b, the corresponding brake pads 3, 3' may be used in the event of a change. It is likewise possible here for corresponding pad retaining stirrups 16 with the resetting elements fastened thereto to be used.

LIST OF REFERENCE DESIGNATIONS

1 Brake caliper
2 Brake disc
2a Brake disc axis of rotation
3, 3' Brake pad
4 Pad carrier plate
4a Pad side
4b Thrust side
4c Contact surface
4d Projection
5 Friction pad
5a Slot
6 Brake carrier
6a Fastening side
6b Bearing receptacle
6c Bridge connector
6d Pad slot base
6e Brake carrier horn
7 Pad retaining spring
7a Clip element
8 Spreading device
9 Opening
10 Disc brake
11 Application section
11a Bore
12 Caliper rear section
12a Retaining section
13 Tension strut
14, 15 Retaining section
15a Wall
16 Pad retaining stirrup
16a, 16b Retaining end
16c Opening
16'c Wall
16d Slot
16e Side surface
17 Securing element
18 Clip element
19 Base plate
19a Fastening element
19b Top side
19c Bottom side
19d, 19e Opening
20 Spring arm
20a Thrust section
20b Connecting section
20c Fastening element 20d Elongated hole
21 Retaining bow
21a Central section
21b Stirrup arm
21c Fastening section
21d Opening
21e Reinforcement
21f Bearing
21g Fold section
22 Retaining stirrup
22a Connecting section
22b Retaining arm
22c Fastening element
22d Elongated hole
23 Resetting element
23a Connecting section
23b Retaining arm
23c Spring arm
23d Thrust section
24 Resetting element
24a Fastening section
24b Arm
24c Spring arm
24d Thrust section
24e Thrust surface
25 Resetting element
25a Fastening section
25b Arm
25c Spring arm
25d Thrust section
25e Thrust surface
25f Lug
25g Connection
26 Resetting element
26a Fastening section
26b Arm
26c Spring arm
26d Thrust section
26e Thrust surface
27 Arm
27a Fastening section
27b Opening
28 Resetting element
28a Spring stirrup
28b Retaining end
28c Bearing section
28d Thrust section
28e Thrust surface
29 Resetting element
29a Fastening stirrup
29b Spring coil
29c Spring arm
29d Clamping end
30 Spring element
30a Coil
30b, 30c Spring end
31 Projection
32 Connecting plate
32a Body
32b, 32c Arm
32d Lug section
32e Opening
32f Lug
32g, 32h Gripping section
33, 34 Retaining plate
33a, 34a Opening
35, 36 Spring unit 35a, 36a Spring wire
35b, 36b Spring end
35c, 36c Spring end
37 Tension spring
37a, 37b Spring end
38 Detent device
38a Detent tongue
38b Vertical plate
38c Guide plate
38d Widened portion
39 Detent section
40 Retaining section
40a Opening
40b Recess
40c Plate
41 Resetting element
41a Clamping end
41b, 41c Spring arm
41d Spring end
42 Connection
42a Connecting section
42b Passage opening
43 Retaining plate
44 Eyelet
45 Bearing beam
45a Groove
46 Fastening element
47 Corrugated bellows
47a Collar
48 Securing ring
AS Run-out side
B Stirrup
D Thrust section
DS Thrust plunger
ES Run-in side
S Securing means The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a commercial vehicle, comprising:
   a brake caliper which engages over a brake disc and which is in the form of a sliding caliper and which is fastened to a positionally static brake carrier and which has a central opening over the brake disc,
   two brake pads which are arranged in the brake caliper and which are movable in opposite directions, each of the two brake pads having a pad carrier plate and a friction pad fastened thereto, wherein an action-side or application-side brake pad is pressable against the brake disc by way of an application device via at least one brake plunger, and
   at least one resetting device by which the brake caliper is resettable after a braking-induced displacement and release of the brake, wherein
   the resetting device has a spreading device which engages on the opposite brake pads and which acts equally counter to the respective application direction and which has resilient spring arms which engage on the respective pad carrier plates,
   the spreading device is arranged in the central opening, the spring arms engage, outside the friction pads, directly or indirectly, on at least two abutment regions of each pad carrier plate, which abutment regions are arranged spaced apart from one another relative to the center, so as to reset the two brake pads counter to an application direction,
the spring arms, in a central region of the central opening, are connected to one another and to a retaining bow which is attached to the brake carrier,
the spring arms are connected by a retaining stirrup to the retaining bow, and
the retaining stirrup has two retaining arms, each of which extends beyond the retaining bow and is fixedly connected to the retaining bow.

2. The disc brake as claimed in claim 1, wherein
the spring arms extend, proceeding from the central region in the central opening, from the inside to the outside to the abutment regions which are arranged spaced apart from one another uniformly relative to the center.

3. The disc brake as claimed in claim 2, wherein
the central region of the central opening extends to both sides of a virtual center of the opening approximately parallel to the plane of the brake disc over a length in a range from 30 to 50% of a longitudinal axis of the opening.

4. The disc brake as claimed in claim 1, wherein
in each case, two spring arms bear against an associated pad carrier plate by way of in each case one thrust section of each spring arm.

5. The disc brake as claimed in claim 1, wherein
the retaining bow is arranged in the region of an application-side edge of the opening.

6. The disc brake as claimed in claim 5, wherein
the retaining bow is attached in a positionally static manner between the brake carrier and bearing beams of the brake caliper.

7. The disc brake as claimed in claim 6, wherein
the retaining bow has at least one fastening section with an opening which is arranged coaxially with respect to a bearing receptacle of the brake carrier, to which the brake caliper is fastened by a bearing beam.

8. The disc brake as claimed in claim 1, wherein
the spring arms are formed as two pairs of spring arms, the pairs are arranged opposite one another in a longitudinal direction of the opening such that they are fastened by way of inner ends, which are in each case connected by a connecting section, in the central region of the central opening to the retaining stirrup, wherein their outer free ends interact with the pad carrier plates of the brake pads.

9. The disc brake as claimed in claim 8, wherein
the retaining arms of the retaining stirrup have elongated holes at fastening points to the retaining bow.

10. The disc brake as claimed in claim 4, wherein
each spring arm is formed, at the end, with a thrust section which, in its longitudinal direction, is formed with an elongated hole which is a guide section of the spring arm of the spreading device.

11. The disc brake as claimed in claim 10, wherein
each thrust section lies in each case on a bearing surface of a respective pad carrier plate, and
the elongated holes of each thrust section interact in each case with a projection of the pad rear plate.

12. The disc brake as claimed in claim 1, wherein
the spreading device has at least one additional resetting element which, in addition to the engagement point/the engagement points of the spring arms, engages at a further engagement point on the respective pad carrier plate of a brake pad.

13. The disc brake as claimed in claim 12, wherein
the at least one additional resetting element is fastened by the retaining stirrup to the retaining bow.

14. The disc brake as claimed in claim 12, wherein
the at least one additional resetting element is attached to a pad retaining stirrup.

15. The disc brake as claimed in claim 14, wherein
the at least one additional resetting element makes contact, by way of a thrust section, with a pad side of the pad carrier plate of a brake pad.

16. The disc brake as claimed in claim 15, wherein
the at least one additional resetting element makes contact, by way of its thrust section, with the pad side of the pad carrier plate of the brake pad in a lower region of the pad carrier plate.

17. The disc brake as claimed in claim 16, wherein
the at least one additional resetting element makes contact, by way of its thrust section, with the pad side of the pad carrier plate of the brake pad in a slot in the friction pad.

18. The disc brake as claimed in claim 14, wherein
the at least one additional resetting element, by way of a thrust section, makes contact with a thrust side of the pad carrier plate of a brake pad or engages with a retaining section of said thrust side.

19. The disc brake as claimed in claim 18, wherein
the at least one additional resetting element has a spring arm which forms a spring in a plane parallel to the brake disc.

20. The disc brake as claimed in claim 14, wherein
the at least one additional resetting element is arranged with an upper retaining end in an opening of the pad retaining stirrup on an application-side wall of the opening, and makes contact, by way of a lower thrust section, with a thrust side of the pad carrier plate of a rear-side brake pad.

21. The disc brake as claimed in claim 14, wherein
the at least one additional resetting element is a spring arm, the upper end of which is attached via a spring coil with a fastening section to an application-side retaining end of the pad retaining stirrup, and a lower end of the spring arm, which is connected via a further spring coil with a clamping end, and
the clamping end engages with a retaining section on the thrust side of the pad carrier plate of the application-side brake pad.

22. The disc brake as claimed in claim 21, wherein
the spring coils are formed as spiral springs with parallel longitudinal axes which run tangentially with respect to the brake disc.

23. The disc brake as claimed in claim 14, wherein
the at least one additional resetting element is attached to an application-side retaining end of the pad retaining stirrup and has a spring arm which is connected to a spring unit which in turn engages with a retaining section on the thrust side of the pad carrier plate of the application-side brake pad.

24. The disc brake as claimed in claim 14, wherein
the at least one additional resetting element is a spring unit which is attached to a base plate of an application section and which engages with a retaining section on the thrust side of the pad carrier plate of the application-side brake pad.

25. The disc brake as claimed in claim 23, wherein the spring unit is formed as an evolute spring.

26. The disc brake as claimed in claim 12, wherein the at least one additional resetting element is formed from at least two spring units, of which both spring units engage, by way of in each case one spring end, with a retaining section on the thrust side of the pad carrier plate of the application-side brake pad, and wherein the at least two spring units are arranged in a plane.

27. The disc brake as claimed in claim 26, wherein the other spring ends of the at least two spring units are in each case attached to a base plate of an application section of the brake caliper.

28. The disc brake as claimed in claim 26, wherein the other spring end of one spring unit of the at least two spring units is attached to a pad retaining stirrup, and the other spring end of the other spring unit of the at least two spring units is attached to a base plate of an application section of the brake caliper.

29. The disc brake as claimed in claim 12, wherein the at least one additional resetting element is at least one tension spring which is received in a bore in the application section of the brake caliper and which is fixed with one spring end in the bore, and the other spring end engages with a retaining section on the thrust side of the pad carrier plate of an application-side brake pad.

30. The disc brake as claimed in claim 14, wherein the at least one additional resetting element attached to the pad retaining stirrup is provided as a self-adjusting resetting element with a detent device which interacts with a detent section of the pad retaining stirrup.

31. The disc brake as claimed in claim 14, wherein the at least one additional resetting element attached to the pad retaining stirrup is attached at both sides, by way of in each case one clamping end, to a rear-side retaining end of the pad retaining stirrup, the clamping ends are connected in each case to a spring arm extending tangentially with respect to the brake disc, the other respective end of which spring arm, in the region of the sides of the pad carrier plate, is bent downwardly through 90° and is formed as a vertical spring arm and engages in each case by way of an outwardly bent spring end in each case with a lateral retaining section on the thrust side of a pad carrier plate of a rear-side brake pad.

32. The disc brake as claimed in claim 7, wherein at least one fastening section of the retaining bow is equipped with a fold section which makes contact with a collar of a corrugated bellows of a guide beam of the brake caliper such that the collar is fixed in a groove of the guide beam of the brake caliper.

33. A brake pad set for a disc brake as claimed in claim 1, comprising:
at least two brake pads with in each case one pad carrier plate and with a friction pad attached to the pad carrier plate, and
a spreading device, wherein
a retaining section of a pad carrier plate of a brake pad on a thrust side of the pad carrier plate is produced, in the manner of a stirrup, without undercuts with an opening and with a recess on a pad side of the pad carrier plate for a plate, in one piece with the pad carrier plate as a cast part.

34. The brake pad set as claimed in claim 32, wherein a connection for a resetting element to the pad carrier plate of a brake pad has a retaining plate with an eyelet, the retaining plate is arranged between a friction pad and a pad side of the pad carrier plate, and the eyelet extends through a passage opening through the pad carrier plate and protrudes from a thrust side of the pad carrier plate.

35. A disc brake for a commercial vehicle, comprising:
a brake caliper which engages over a brake disc and which is in the form of a sliding caliper and which is fastened to a positionally static brake carrier,
two brake pads which are arranged in the brake caliper and which are movable in opposite directions, each of the two brake pads having a pad carrier plate and a friction pad fastened thereto, wherein an action-side or application-side brake pad is pressable against the brake disc by way of an application device via at least one brake plunger, and
at least one resetting device by which the brake caliper is resettable after a braking-induced displacement and release of the brake, wherein
the resetting device is composed of a spreading device which engages on the mutually oppositely situated brake pads and which acts equally counter to the respective application direction,
the spreading device has spring arms which engage, outside the friction pads, at at least two abutment regions of each pad carrier plate so as to reset the two brake pads counter to an application direction,
in each case, two spring arms lie against an associated pad carrier plate, and
the spring arms, in a central region thereof, are connected to one another and to a retaining bow which is connected to two mutually oppositely situated stirrups which are connected to the brake carrier.

* * * * *